US012562948B2

(12) United States Patent
Kamiya et al.

(10) Patent No.: US 12,562,948 B2
(45) Date of Patent: Feb. 24, 2026

(54) RADIO TRANSMISSION DEVICE AND RADIO RECEPTION DEVICE

(71) Applicant: NEC Corporation, Tokyo (JP)

(72) Inventors: Norifumi Kamiya, Tokyo (JP);
Mamoru Sawahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 18/204,686

(22) Filed: Jun. 1, 2023

(65) Prior Publication Data

US 2023/0396476 A1 Dec. 7, 2023

(30) Foreign Application Priority Data

Jun. 7, 2022 (JP) ................................. 2022-092200

(51) Int. Cl.
*H04L 27/26* (2006.01)
(52) U.S. Cl.
CPC ...... *H04L 27/2613* (2013.01); *H04L 27/2636* (2013.01)
(58) Field of Classification Search
CPC ........................ H04L 27/2613; H04L 27/2636
See application file for complete search history.

(56) References Cited

U.S. PATENT DOCUMENTS

2022/0190894 A1 6/2022 Kamiya et al.

FOREIGN PATENT DOCUMENTS

| JP | 2009038841 A | * | 2/2009 |
| JP | 2012-161058 A | | 8/2012 |
| JP | WO2020/217941 A1 | | 11/2021 |

(Continued)

OTHER PUBLICATIONS

D. Falconer, S. L. Ariyavisitakul, A. Benyamin-Seeyar, and B. Eidson, "Frequency domain equalization for single-carrier broadband wireless systems," IEEE Commun. Mag., vol. 40, No. 4, pp. 58-66, Apr. 2002.

(Continued)

*Primary Examiner* — Samina F Choudhry
(74) *Attorney, Agent, or Firm* — Sughrue Mion, PLLC

(57) ABSTRACT

In a radio transmission device, an orthogonal frequency division multiplexing (OFDM) signal forming unit forms an OFDM signal by arranging pilot signals according to a pilot arrangement pattern. According to the pilot arrangement pattern, among a plurality of pilot arrangement subcarriers with an $N_{Pilot\_Freq}$-subcarrier interval, in a plurality of first pilot arrangement subcarriers with an $N_{Pilot\_SP4}$-subcarrier interval, pilot signals for phase noise estimation are arranged in all resource elements. An information symbol and a pilot symbol are mapped to different resource elements. Among the plurality of pilot arrangement subcarriers with the $N_{Pilot\_Freq}$-subcarrier interval, in a plurality of second pilot arrangement subcarriers excluding the plurality of first pilot arrangement subcarriers, the pilot signals for phase noise estimation are arranged in a cycle of $N_{Pilot\_Time}$ resource elements in the time domain.

6 Claims, 34 Drawing Sheets

- *T*: SAMPLE LENGTH (SYMBOL LENGTH)
- $w_k$: EQUALIZATION WEIGHT
- *K*: NUMBER OF TAPS

(56) References Cited

FOREIGN PATENT DOCUMENTS

KR    20090026723 A  *  3/2009  .......... H04L 1/0003

OTHER PUBLICATIONS

"3rd Generation Partnership Project; Technical Specification Group Radio Access Network; NR; Physical channels and modulation (Release 16)", 3GPP TS 38.211 V16.7.0, Sep. 2021.

C.-T. Lam, D. D. Falconer, F. Danilo-Lemoine, and R. Dinis, "Channel Estimation for SC-FDE Systems Using Frequency Domain Multiplexed Pilots," Proc. IEEE VTC2006—Fall, Sep. 2006.

R. A. Casas, S. L. Biracree, and A. E. Youtz, "Time domain phase noise correction for OFDM signals," IEEE Transactions on Broadcasting, vol. 48, No. 3, pp. 230-236, Sep. 2002.

U. Sorger, I. De Broeck, and M. Schnell, "Interleaved FDMA—a new spread-spectrum multiple-access scheme," Proc. 1998 IEEE International Conference on Communications. Conference, ICC '98, Jun. 1998.

D. C. Chu, "Polyphase codes with good periodic correlation properties," IEEE Trans. Inform. Theory, vol. IT-18, pp. 531-532, Jul. 1972.

S. Suyama, J. Onodera, H. Suzuki, and K. Fukawa, "Decision-directed phase noise compensation for millimeter-wave single carrier transmission systems with frequency-domain equalization," Proc. 2009 European Wireless Technology Conference.

N. Kamiya and E. Sasaki, "Pilot-Symbol Assisted and Code-Aided Phase Error Estimation for High-Order QAM Transmission," IEEE Trans. on Commun., vol. 61, No. 10, pp. 4369-4380, Oct. 2013.

S. Wu and Y. Bar-Ness, "A phase noise suppression algorithm for OFDM-based WLANs," IEEE Commun. Lett., vol. 6, No. 12, pp. 535-537, Dec. 2002.

Denis Petrovic et al., "Effects of Phase Noise on OFDM Systems With and Without PLL: Characterization and Compensation", IEEE Transactions on Communications, vol. 55, No. 8, pp. 1607-1616, Aug. 2007.

JP Office Action for JP Application No. 2022-092200, mailed on Dec. 23, 2025 with English Translation.

* cited by examiner

DFT : DISCRETE FOURIER TRANSFORM
FFT : FAST FOURIER TRANSFORM
FDE : FREQUENCY DOMAIN EQUALIZATION
IDFT : INVERSE DISCRETE FOURIER TRANSFORM
IFFT : INVERSE FAST FOURIER TRANSFORM

: INFORMATION SYMBOL

:PILOT SIGNAL

Fig. 13

DIVIDING $N_{FFT}$ SAMPLES OF OFDM SYMBOL OR $N_{FFT}$ SYMBOLS OF SINGLE-CARRIER SYMBOL BLOCK INTO $N_{Blk}$ BLOCKS

IN-PHASE ADDITION AVERAGING PHASE NOISE VALUES OF $N_{FFT}/N_{Blk}$ SAMPLES (SYMBOLS)

AVERAGE VALUE IN BLOCK OF PHASE NOISE

AVERAGE VALUE IN BLOCK OF PHASE NOISE

INTERPOLATION (EXAMPLE OF PRIMARY INTERPOLATION)

300

RADIO TRANSMISSION DEVICE AND RADIO RECEPTION DEVICE

INCORPORATION BY REFERENCE

This application is based upon and claims the benefit of priority from Japanese patent application No. 2022-092200, filed on Jun. 7, 2022, the disclosure of which is incorporated herein in its entirety by reference.

TECHNICAL FIELD

The present disclosure relates to a radio transmission device and a radio reception device.

BACKGROUND ART

With the rapid spread of 4G long term evolution (LTE) and LTE-Advanced, it is possible to provide a full-blown mobile broadband service. In order to cope with rapidly increasing traffic in a cellular network, in a fifth generation (5G) new radio (NR) system, it is necessary to further increase the speed, capacity and frequency utilization efficiency as compared with LTE. In addition to a heterogeneous network overlaying a small cell that efficiently accommodates non-uniform traffic in a macro cell, a highly efficient radio access technology is required. In addition to an ultra-high speed and large capacity radio access network that implements a gigabit-class service for user equipment (UE), a further increase in speed and capacity of a back-haul between a base station and a serving-gateway (S-GW) of an evolved packet core (EPC) network is required. A back-haul link includes an E1/T1-specific line, an optical fiber network, a microwave wireless back-haul, and the like. The wireless back-haul has an advantage that a network cost can be reduced as compared with a wired back-haul. The same applies to a fronthaul that connects remote radio equipment (RRE) and a centralized base station in a configuration including a base station implemented by the RRE and the centralized base station that executes processing of a baseband physical layer and a higher layer.

In the wireless back-haul, a frequency spectrum of a millimeter wave band is applied. In the 5G NR system, application of a frequency spectrum of a millimeter wave band capable of securing a broadband frequency also in an access link has been considered. In Japan, a frequency spectrum of a 28 GHz band is allocated. In a frequency spectrum of a millimeter wave band, a phase noise caused by frequency fluctuations of local oscillators of a base station and a user terminal may cause deterioration of an error rate. A local oscillator (frequency synthesizer) having very high frequency stability is costly. For this reason, a method of estimating and compensating for a phase noise caused in a local oscillator of a transmitter by executing transmission or reception signal processing is generally used. In addition, a method of estimating and compensating for a phase noise caused in a local oscillator of a receiver by executing reception signal processing is generally used.

The phase noise caused in the local oscillator is modeled by a discrete time Wiener process. A phase noise at a sample timing k is represented by $\theta_k = \theta_{k-1} + \Delta_k$. $\Delta_k$ is a random variable of a Gaussian distribution with a mean of 0 and a variance of $$\sigma_{\Delta_k}^2.$$ [Mathematical Formula 1]

A pilot signal is required to estimate the phase noise. The phase and amplitude of modulation of the pilot signal are known by the receiver. The phase noise varies for each sample timing in the time domain. Therefore, a method of consecutively multiplexing the pilot signal onto all symbols in the time domain is desirable. Meanwhile, as the pilot signal is consecutively multiplexed onto all the symbols, an insertion loss (that is, overhead) of the pilot signal increases, and frequency utilization efficiency deteriorates.

A main deterioration factor of an error rate in the frequency spectrum of the millimeter wave band includes waveform distortion due to multipath fading in addition to the phase noise. A radio access link is mainly characterized by a none-line-of-sight (NLOS) propagation path. In the NLOS propagation path, paths having different delay times are modeled by a propagation path that receives independent Rayleigh fading. The amplitude and phase of a signal subjected to Rayleigh fading randomly vary. It is known that the amplitude can be approximated by a Rayleigh distribution and the phase can be approximated by a uniform distribution. When a plurality of paths with different delay times are combined, frequency-selective fading with time-varying frequency selectivity occurs. On the other hand, a wireless back-haul link generally becomes a line-of-sight (LOS) propagation path in which a direct wave exists. In a wireless back-haul link having a high antenna height and a long inter-site distance, a delay wave generated by reflection from the ground or the like is received in addition to the direct wave. The multipath fading (that is, frequency-selective fading) occurs due to the delayed wave. In a case where the inter-site distance is long, a delay time of the delay wave caused by reflection from the ground is shorter than a symbol length. Therefore, a large notch is generated in the frequency domain. Further, in a back-haul link between a macro cell site and a small cell site in a heterogeneous network (HetNet), an antenna height of the small cell site is low. For this reason, in addition to the direct wave, the delay wave having a long delay time is received due to reflection from a building and the like around the small cell site and scattering, and the multipath fading caused by the delay wave occurs. As described above, the multipath fading with frequency selectivity occurs in both the radio access link and the wireless back-haul link. Therefore, in order to compensate for waveform distortion caused by inter-symbol interference (ISI), the receiver needs an equalizer. The equalizer is classified into a time domain equalizer (TDE) and a frequency domain equalizer (FDE).

In the wireless back-haul, generally, the TDE has been often used. The TDE can be implemented by a transversal filter or a finite impulse response (FIR) filter illustrated in FIG. 1. The transversal filter having the number of taps equal to or more than the maximum delay time of the delay wave is used for discrete-time sample processing. A weighting coefficient (equalization weight) of the transversal filter is updated using an adaptive algorithm for a time-varying delay wave. The minimum mean square error (MMSE) standard or the like of an equalized signal is used for the control of the weighting coefficient. In the TDE, the number of taps in a sufficiently long time range is required as compared with the maximum delay time of the delay wave (multipath). As illustrated in FIG. 1, the TDE requires convolution processing including complex multiplication by the number of taps for each sample value. Therefore, the number of taps increases as the maximum delay time of the delay wave increases, and a computation amount of the convolution processing becomes enormous.

The FDE has been proposed in order to reduce the computation amount of the time domain equalizer (for example, Non-Patent Literature 1: D. Falconer, S. L. Ariyavisitakul, A. Benyamin-Seeyar, and B. Eidson, "Frequency domain equalization for single-carrier broadband wireless systems," IEEE Commun. Mag., vol. 40, no. 4, pp. 58-66, April 2002). FIG. 2 illustrates a configuration of the FDE. A received time-domain signal is converted into a frequency-domain signal by discrete Fourier transform (DFT) or fast Fourier transform (FFT). The number of samples of the FFT in the time domain corresponds to the number of subcarriers of the frequency-domain signal. In the present specification, a frequency component when a single carrier signal is converted into a frequency-domain signal by the FFT may be referred to as a "subcarrier". Then, each subcarrier component in the frequency domain is multiplied by an equalization weight (weighting coefficient). In a case where a complex channel response on a subcarrier k is expressed by $h_k$, the equalization weight of the minimum mean square error (MMSE) standard is expressed by the following Formula (1).

[Mathematical Formula 2]

$$W_k = \frac{h_k^*}{|h_k|^2 + \frac{\sigma_n^2}{\sigma_S^2}} \tag{1}$$

In Formula (1), * represents a complex conjugate, $\sigma_n^2$ represents noise power, and $\sigma_s^2$ represents desired wave signal power.

The equalized signal is converted into a time-domain signal by inverse discrete Fourier transform (IDFT) or inverse fast Fourier transform (IFFT). The FDE requires the FFT (DFT) and the IFFT (IDFT), but equalization processing of each subcarrier position is implemented by multiplication processing. Therefore, the overall calculation amount can be reduced as compared with the TDE. Therefore, in uplink single-carrier frequency division multiple access (FDMA) of LTE, a radio interface on the premise of application of the FDE is adopted.

Both the TDE and the FDE require the pilot signal for propagation path estimation. In the NR radio interface of 3GPP (registered trademark) using OFDMA, a reference signal for demodulation (including equalization) and a reference signal for reception quality measurement are defined. The reference signal for demodulation (including equalization) is called a demodulation reference signal (DM-RS), and the reference signal for reception quality measurement is called a channel state information reference signal (CSI-RS).

Further, in the NR radio interface, a phase tracking reference signal (PTRS) for estimating a phase noise and a frequency offset in the OFDMA is defined. FIG. 3 illustrates a PTRS multiplexing method in the NR radio interface. The PTRS multiplexing method is disclosed in Non-Patent Literature 2 (3GPP TS 38.211, NR; Physical channels and modulation (Release 16), V16.7.0, September 2021). In the frequency domain, the PTRS is multiplexed at a minimum of 12-subcarrier interval. The phase noise varies with time in units of OFDM samples. Therefore, the PTRS is densely multiplexed in the time domain. Four thresholds for determining a multiplexing density of the PTRS in the time domain are defined according to a modulation and coding scheme (MCS). In a case where an MCS index $I_{MCS}$ is smaller than ptrs-MCS1, the PTRS is not multiplexed. In a case where ptrs-MCS1≤$I_{MCS}$≤ptrs-MCS2, the PTRS is multiplexed every four OFDM symbols. In a case where ptrs- MCS2≤$I_{MCS}$≤ptrs-MCS3, the PTRS is multiplexed every two OFDM symbols. In a case where ptrs-MCS3≤$I_{MCS}$≤ptrs-MCS4, it is specified that the PTRS is consecutively multiplexed at all OFDM symbol positions in the time domain.

DFT-spread OFDM that performs frequency allocation (mapping) of a single-carrier FDMA signal by frequency domain processing is adopted in uplink of LTE. In the NR radio interface, the DFT-spread OFDM is adopted in a case of one-stream transmission in uplink. Since the DFT-spread OFDM is a single carrier scheme, there is an advantage that a peak-to-average power ratio (PAPR) can be lower than that in the OFDMA. Therefore, in the DFT-spread OFDM, since transmission backoff of a power amplifier (PA) can be set low, average power can be increased. Therefore, in the DFT-spread OFDM, in a case where PAs having the same peak power are used, an arrival distance of a radio wave is longer and a coverage area is wider than those in the OFDMA. In the DFT-spread OFDM, a pilot symbol is usually time division multiplexed (TDM) between information symbols to implement a low PAPR. Assuming that an insertion loss of the pilot symbol is about 10%, one pilot symbol is multiplexed onto 10 symbols. In a case where the symbol length is short, propagation path variation caused by the multipath fading can be sufficiently followed. Therefore, the time division multiplexing (TDM) is adopted as a DMRS of the LTE and NR radio interface. However, a TDM-type pilot symbol having an insertion loss of about 10% cannot follow estimation of the phase noise. In order to be able to follow the estimation of the phase noise, it is necessary to multiplex the pilot symbol more densely in the time domain. However, in TDM-type pilot symbol multiplexing, the insertion loss greatly increases, and the frequency utilization efficiency greatly deteriorates.

Therefore, in single-carrier DFT-spread OFDM, frequency division multiplexing (FDM) type pilot symbol multiplexing in which multiplexing is continuously performed in the time direction has been proposed (Non-Patent Literature 3: C.-T. Lam, D. D. Falconer, F. Danilo-Lemoine, and R. Dinis, "Channel Estimation for SC-FDE Systems Using Frequency Domain Multiplexed Pilots," Proc. IEEE VTC2006-Fall, September 2006). FIG. 4A illustrates a frequency domain superimposed pilot technique (FDSPT), and FIG. 4B illustrates a frequency expanding technique (FET). In the FDSPT, a pilot symbol is superimposed on information symbols at a regular tone interval in the frequency domain. Here, the tone corresponds to a subcarrier in the OFDMA. The pilot symbol is multiplexed onto consecutive symbols in the time domain. Because the pilot symbol is multiplexed onto the same resource element (RE) as the information symbol, efficiency of a band of the information symbol is not deteriorated. Meanwhile, interference from the pilot symbol causes slight degradation of the error rate of the information symbol and an increase in PAPR. The degradation of the error rate of the information symbol can be suppressed low by applying an error correction coding. For this reason, rather, the interference of the information symbol with the pilot symbol causes deterioration of the accuracy in estimation of the phase noise. Therefore, a method for reducing transmission power of the information symbol at a tone position on which the pilot symbol is superimposed has been proposed. In the FET, since the pilot symbol and the information symbol are orthogonally multiplexed, mutual interference is not caused, but the efficiency of the band of the information symbol is deteriorated by the insertion loss of the pilot symbol. In both the FDSPT and the FET, the PAPR increases as compared with the TDM-type pilot symbol multiplexing.

In the LTE radio interface, a system band (a transmission band or reception band in the base station) of up to 20 MHz is specified. In LTE-Advanced (3GPP release 11 specification) which is an advanced method of LTE, a system band of up to 100 MHz is specified by carrier aggregation (CA) in which a plurality of component carriers (CC) are combined with the system band of LTE as a CC.

In the NR radio interface, a subcarrier spacing of LTE is extended in a scalable manner, and a system band of up to 400 MHz is specified. Although a bandwidth allocated for each user terminal is narrower than a system bandwidth, the bandwidth allocated for each user terminal is also widened according to the widening of the system bandwidth. In the 5G system, the use of the frequency spectrum of the millimeter wave band that enables securing of a wide band frequency is assumed, and allocation of a frequency in a 28 GHz band to four carriers has already been performed in Japan. Furthermore, application of high frequencies is assumed, and application of a frequency spectrum up to 1 THz is assumed in the Beyond 5G (6G) system. In the wireless back-haul link, the frequency spectrum of the millimeter wave band has already been used, and application of a high frequency spectrum that enables securing of a wider band frequency is assumed.

Main factors of degradation of the error rate in the frequency spectrum of the millimeter wave band are the waveform distortion caused by multipath interference from the delay wave, and the phase noise caused by frequency fluctuation and jitter (fluctuation in the time domain) occurring in the local oscillators of the base station and the user terminal.

The pilot signal is used to estimate the phase noise occurring in the local oscillator. Since the phase noise varies in units of samples in a case of an OFDM signal and varies in units of single-carrier symbols in a case of the DFT-spread OFDM, the pilot signal needs to be densely multiplexed in the time domain. As a phase noise compensation method, many phase noise estimation/compensation methods of time domain or frequency domain processing have been disclosed (for example, Non-Patent Literature 4 (R. A. Casas, S. L. Biracree, and A. E. Youtz, "Time domain phase noise correction for OFDM signals," IEEE Transactions on Broadcasting, vol. 48, no. 3, pp. 230-236, September 2002), Non-Patent Literature 5 (U. Sorger, I. De Broeck, and M. Schnell, "Interleaved FDMA—a new spread-spectrum multiple-access scheme," Proc. 1998 IEEE International Conference on Communications. Conference, ICC '98, June 1998), Non-Patent Literature 6 (D. C. Chu, "Polyphase codes with good periodic correlation properties," IEEE Trans. Inform. Theory, vol. IT-18, pp. 531-532, July 1972), Non-Patent Literature 7 (S. Suyama, J. Onodera, H. Suzuki, and K. Fukawa, "Decision-directed phase noise compensation for millimeter-wave single carrier transmission systems with frequency-domain equalization," Proc. 2009 European Wireless Technology Conference), Non-Patent Literature 8 (N. Kamiya and E. Sasaki, "Pilot-Symbol Assisted and Code-Aided Phase Error Estimation for High-Order QAM Transmission," IEEE Trans. on Commun., vol. 61, no. 10, pp. 4369-4380, October 2013), Non-Patent Literature 9 (S. Wu and Y. Bar-Ness, "A phase noise suppression algorithm for OFDM-based WLANs," IEEE Commun. Lett., vol. 6, no. 12, pp. 535-537, December 2002), and Non-Patent Literature 10 (D. Petrovic, W. Rave, and G. Fettweis, "Effects of phase noise on OFDM systems with and without PLL: characterization and compensation," IEEE Trans. on Commun., vol. 55, no. 8, pp. 1607-1616, August 2007)).

Each symbol suffers from waveform distortion due to multipath interference from a preceding symbol, that is, inter-symbol interference. The time domain equalizer (TDE) or frequency domain equalizer (FDE) is used to equalize waveform distortion caused by inter-symbol interference. An LMS algorithm, an RLS algorithm, or the like is used as an update algorithm for an equalization weighting coefficient of the TDE. A determined value of the information symbol is used as a reference signal for generating an error signal of the LMS or RLS algorithm. However, since a decoding error occurs in the information symbol, it is necessary to periodically multiplex the pilot signal between the information symbols in order to operate the LMS or RLS algorithm with high accuracy. In the FDE, an MMSE equalization weight is used, but the MMSE equalization weight is generated from a channel response of each subcarrier (tone) position estimated by the pilot signal.

In a case of using a single carrier signal or a wideband pilot signal for phase noise estimation in OFDM with a large subcarrier spacing, the pilot signal suffers from the phase noise and frequency-selective multipath fading. In a case where the pilot signal subjected to the phase noise variation is used, the equalization weight cannot be generated with high accuracy. Conversely, in a case where the pilot signal subjected to the multipath fading is used, the phase noise cannot be estimated with high accuracy. Therefore, it is necessary to alternately repeat the phase noise estimation/compensation and the equalization processing a plurality of times. As a result, in order to suppress the phase noise and the residual equalization to a sufficiently low level, a computation amount of the repetitive processing of the phase noise estimation/compensation and the equalization increases.

SUMMARY

An example object of the present disclosure is to provide a radio transmission device and a radio reception device capable of separating phase noise estimation from multipath fading by using a narrowband pilot signal for phase noise estimation, and suppressing deterioration of an error rate.

A radio transmission device according to a first example aspect of the present disclosure includes:

a signal forming unit configured to form an orthogonal frequency division multiplexing (OFDM) signal or DFT-spread OFDM signal including pilot signals; and a transmission radio unit configured to form a radio signal from the formed OFDM signal or DFT-spread OFDM signal, wherein the signal forming unit arranges the pilot signals according to a pilot arrangement pattern, the pilot arrangement pattern arranging the pilot signals in a plurality of pilot arrangement subcarriers with an $N_{Pilot\_Freq}$-subcarrier interval among all subcarriers for the OFDM signal or DFT-spread OFDM signal, arranging the pilot signals in all resource elements each of which is defined by a combination of a subcarrier and an OFDM symbol, in a plurality of first pilot arrangement subcarriers with an $N_{Pilot\_SP4}$-subcarrier interval among the plurality of pilot arrangement subcarriers, and arranging the pilot signals in a cycle of $N_{Pilot\_Time}$ resource elements in a time domain, in a plurality of second pilot arrangement subcarriers excluding the plurality of first pilot arrangement subcarriers among the plurality of pilot arrangement subcarriers.

A radio transmission device according to a second example aspect of the present disclosure includes:

$N_{Tx\_Ant}$ transmit antennas;

a signal forming unit configured to form an orthogonal frequency division multiplexing (OFDM) signal or DFT-spread OFDM signal including pilot signals; and a transmission radio unit configured to form a radio signal from the formed OFDM signal or DFT-spread OFDM signal, wherein the signal forming unit arranges the pilot signals according to a pilot arrangement pattern, the pilot arrangement pattern arranging the pilot signals in a plurality of pilot arrangement subcarrier sets each including $N_{Tx\_Ant}$ consecutive subcarriers and an interval between two adjacent sets being $N_{Pilot\_Freq}$ subcarriers among all subcarriers for the OFDM signal or DFT-spread OFDM signal, arranging the pilot signals in all resource elements each of which is defined by a combination of a subcarrier and an OFDM symbol or a single-carrier symbol block, in a plurality of first pilot arrangement subcarrier sets with an $N_{Pilot\_SPA}$-subcarrier interval among the plurality of pilot arrangement subcarrier sets, and arranging the pilot signals in a cycle of $N_{Pilot\_Time}$ resource elements in a time domain, in a plurality of second pilot arrangement subcarrier sets excluding the plurality of first pilot arrangement subcarrier sets among the plurality of pilot arrangement subcarrier sets, and a plurality of the pilot signals respectively transmitted from the $N_{Tx\_Ant}$ transmission antennas are spread by spreading sequences unique to different transmission antennas.

A radio transmission device according to a third example aspect of the present disclosure includes:

a signal forming unit configured to form an orthogonal frequency division multiplexing (OFDM) signal or DFT-spread OFDM signal including pilot signals; and a transmission radio unit configured to form a radio signal from the formed OFDM signal or DFT-spread OFDM signal, wherein the signal forming unit arranges the pilot signals according to a pilot arrangement pattern, the pilot arrangement pattern arranging the pilot signals in a plurality of pilot arrangement subcarriers with an $N_{Pilot\_Freq}$-subcarrier interval among all subcarriers for the OFDM signal or DFT-spread OFDM signal, arranging the pilot signals in a cycle of $N_{Pilot\_Time}$ resource elements in a time domain in the respective pilot arrangement subcarriers, and arranging the pilot signals in such a way that the resource elements in which the pilot signals are arranged do not overlap in the time domain in two adjacent pilot arrangement subcarriers.

A radio transmission device according to a fourth example aspect of the present disclosure includes:

$N_{Tx\_Ant}$ transmission antennas;

a signal forming unit configured to form an orthogonal frequency division multiplexing (OFDM) signal or DFT-spread OFDM signal including pilot signals; and a transmission radio unit configured to form a radio signal from the formed OFDM signal or DFT-spread OFDM signal, wherein the signal forming unit arranges the pilot signals according to a pilot arrangement pattern, the pilot arrangement pattern arranging the pilot signals in a plurality of pilot arrangement subcarrier sets each including $N_{Tx\_Ant}$ consecutive subcarriers and an interval between two adjacent sets being $N_{Pilot\_Freq}$ subcarriers among all subcarriers for the OFDM signal or DFT-spread OFDM signal, arranging the pilot signals in a cycle of $N_{Pilot\_Time}$ resource elements in a time domain in the respective pilot arrangement subcarrier sets, and arranging the pilot signals in such a way that the resource elements in which the pilot signals are arranged do not overlap in the time domain in two adjacent pilot arrangement subcarrier sets, and a plurality of the pilot signals respectively transmitted from the $N_{Tx\_Ant}$ transmission antennas are spread by spreading sequences unique to different transmission antennas.

A radio reception device according to a fifth example aspect of the present disclosure includes:

a signal processing unit configured to execute signal processing on an orthogonal frequency division multiplexing (OFDM) signal or a DFT-spread OFDM signal, wherein the signal processing unit includes:

a phase noise compensation unit configured to estimate a phase noise of a received OFDM signal or DFT-spread OFDM signal based on a pilot signal included in the received OFDM signal or DFT-spread OFDM signal and compensate for the phase noise of the received OFDM signal or DFT-spread OFDM signal;

a transform unit configured to receive a first time-domain signal and convert the received first time-domain signal into a frequency-domain signal;

an equalization unit configured to execute equalization processing on the frequency-domain signal obtained by the transform unit;

a demapping unit configured to demap an information symbol included in the frequency-domain signal after the equalization processing and reproduce an information bit;

an extraction unit configured to extract a pilot signal included in the frequency-domain signal obtained by the transform unit;

a channel estimation unit configured to estimate a channel response by using the extracted pilot signal;

a symbol estimation unit configured to map the reproduced information bit to a symbol to obtain a reproduced symbol;

a first multiplication unit configured to multiply the obtained reproduced symbol by the estimated channel response;

an inverse transform unit configured to convert the reproduced symbol multiplied by the channel response into a second time-domain signal;

a phase noise compensation signal generation unit configured to estimate a phase noise by using the first time-domain signal and the second time-domain signal obtained by the inverse transform unit and output an inverse characteristic for the estimated phase noise; and a second multiplication unit disposed at an input stage of the transform unit and configured to compensate for the phase noise of the received OFDM signal or DFT-spread OFDM signal after the phase noise compensation by the phase noise compensation unit by multiplying the received OFDM signal or DFT-spread OFDM signal after the phase noise compensation by the phase noise compensation unit by the output inverse characteristic for the phase noise and output the received OFDM signal or DFT-spread OFDM signal after the phase noise compensation to the transform unit as the first time-domain signal.

A radio reception device according to a sixth example aspect of the present disclosure includes:

a signal processing unit configured to execute signal processing on an orthogonal frequency division multiplexing (OFDM) signal or DFT-spread OFDM signal, wherein the signal processing unit includes:

a phase noise compensation unit configured to estimate a phase noise of a received OFDM signal or DFT-spread OFDM signal based on a pilot signal included in the received OFDM signal or DFT-spread OFDM signal and compensate for the phase noise of the OFDM signal or DFT-spread OFDM signal;

a transform unit configured to receive a first time-domain signal and convert the received first time-domain signal into a frequency-domain signal;

an equalization unit configured to execute equalization processing on the frequency-domain signal obtained by the transform unit;

a demapping unit configured to demap an information symbol included in the frequency-domain signal after the equalization processing and calculate reliability information of each bit in each symbol;

a decoding unit configured to execute error correction decoding processing by using the reliability information of each bit and output an obtained decoded bit;

an extraction unit configured to extract a pilot signal included in the frequency-domain signal obtained by the transform unit;

a channel estimation unit configured to estimate a channel response by using the extracted pilot signal;

a symbol estimation unit configured to map the decoded bit output from the decoding unit to a symbol to obtain a reproduced symbol;

a first multiplication unit configured to multiply the obtained reproduced symbol by the estimated channel response;

an inverse transform unit configured to convert the reproduced symbol multiplied by the channel response into a second time-domain signal;

a phase noise compensation signal generation unit configured to estimate a phase noise by using the first time-domain signal and the second time-domain signal obtained by the inverse transform unit and output an inverse characteristic for the estimated phase noise; and a second multiplication unit disposed at an input stage of the transform unit and configured to compensate for the phase noise of the received OFDM signal or DFT-spread OFDM signal after the phase noise compensation by the phase noise compensation unit by multiplying the received OFDM signal or DFT-spread OFDM signal after the phase noise compensation by the phase noise compensation unit by the output inverse characteristic for the phase noise and output the received OFDM signal or DFT-spread OFDM signal after the phase noise compensation to the transform unit as the first time-domain signal.

A radio reception device according to a seventh example aspect of the present disclosure includes:

a signal processing unit configured to execute signal processing on an orthogonal frequency division multiplexing (OFDM) signal or DFT-spread OFDM signal, wherein the signal processing unit includes:

a phase noise compensation unit configured to estimate a phase noise of a received OFDM signal or DFT-spread OFDM signal based on a pilot signal included in the received OFDM signal or DFT-spread OFDM signal and compensate for the phase noise of the received OFDM signal or DFT-spread OFDM signal;

a first transform unit configured to receive a first time-domain signal and convert the received first time-domain signal into a first frequency-domain signal;

an equalization unit configured to execute equalization processing on the first frequency-domain signal obtained by the first transform unit;

a first inverse transform unit configured to convert the frequency-domain signal after the equalization processing into an information symbol that is a second time-domain signal;

a demapping unit configured to demap the information symbol and reproduce an information bit;

an extraction unit configured to extract a pilot signal included in the first frequency-domain signal obtained by the first transform unit;

a channel estimation unit configured to estimate a channel response by using the extracted pilot signal;

a symbol estimation unit configured to map the reproduced information bit to a symbol to obtain a reproduced symbol;

a second transform unit configured to convert the reproduced symbol into a symbol that is a second frequency-domain signal;

a mapping unit configured to map the symbol that is the second frequency-domain signal to a subcarrier;

a first multiplication unit configured to multiply the symbol mapped to the subcarrier by the estimated channel response;

a second inverse transform unit configured to convert the symbol multiplied by the channel response into a third time-domain signal;

a phase noise compensation signal generation unit configured to estimate a phase noise by using the first time-domain signal and the third time-domain signal obtained by the second inverse transform unit and output an inverse characteristic for the estimated phase noise; and a second multiplication unit disposed at an input stage of the first transform unit and configured to compensate for the phase noise of the received OFDM signal or DFT-spread OFDM signal after the phase noise compensation by the phase noise compensation unit by multiplying the received OFDM signal or DFT-spread OFDM signal after the phase noise compensation by the phase noise compensation unit by the output inverse characteristic for the phase noise and output the received OFDM signal or DFT-spread OFDM signal after the phase noise compensation to the first transform unit as the first time-domain signal.

A radio reception device according to an eighth example aspect of the present disclosure includes:

a signal processing unit configured to execute signal processing on an orthogonal frequency division multiplexing (OFDM) signal or DFT-spread OFDM signal, wherein the signal processing unit includes:

a phase noise compensation unit configured to estimate a phase noise of a received OFDM signal or DFT-spread OFDM signal based on a pilot signal included in the received OFDM signal or DFT-spread OFDM signal and compensate for the phase noise of the received OFDM signal or DFT-spread OFDM signal;

a first transform unit configured to receive a first time-domain signal and convert the received first time-domain signal into a first frequency-domain signal;

an equalization unit configured to execute equalization processing on the first frequency-domain signal obtained by the first transform unit;

a first inverse transform unit configured to convert the frequency-domain signal after the equalization processing into an information symbol that is a second time-domain signal;

a demapping unit configured to demap the information symbol and calculate reliability information of each bit in each symbol;

a decoding unit configured to execute error correction decoding processing by using the reliability information of each bit and output an obtained decoded bit;

an extraction unit configured to extract a pilot signal included in the first frequency-domain signal obtained by the first transform unit;

a channel estimation unit configured to estimate a channel response by using the extracted pilot signal;

a symbol estimation unit configured to map the decoded bit output from the decoding unit to a symbol to obtain a reproduced symbol;

a second transform unit configured to convert the reproduced symbol into a symbol that is a second frequency-domain signal;

a mapping unit configured to map the symbol that is the second frequency-domain signal to a subcarrier;

a first multiplication unit configured to multiply the symbol mapped to the subcarrier by the estimated channel response;

a second inverse transform unit configured to convert the symbol multiplied by the channel response into a third time-domain signal;

a phase noise compensation signal generation unit configured to estimate a phase noise by using the first time-domain signal and the third time-domain signal obtained by the second inverse transform unit and output an inverse characteristic for the estimated phase noise; and a second multiplication unit disposed at an input stage of the first transform unit and configured to compensate for the phase noise of the received OFDM signal or DFT-spread OFDM signal after the phase noise compensation by the phase noise compensation unit by multiplying the received OFDM signal or DFT-spread OFDM signal after the phase noise compensation by the phase noise compensation unit by the output inverse characteristic for the phase noise and output the received OFDM signal or DFT-spread OFDM signal after the phase noise compensation to the first transform unit as the first time-domain signal.

A radio reception device according to a ninth example aspect of the present disclosure includes:

a signal processing unit configured to execute signal processing on an orthogonal frequency division multiplexing (OFDM) signal or DFT-spread OFDM signal, wherein the signal processing unit includes:

a phase noise compensation unit configured to estimate a phase noise of a received OFDM signal or DFT-spread OFDM signal based on a pilot signal included in the received OFDM signal or DFT-spread OFDM signal and compensate for the phase noise of the received OFDM signal or DFT-spread OFDM signal;

a transform unit configured to receive the received OFDM signal or DFT-spread OFDM signal after the phase noise compensation by the phase noise compensation unit and convert the received OFDM signal or DFT-spread OFDM signal into a frequency-domain signal;

an equalization unit configured to execute equalization processing on the frequency-domain signal obtained by the transform unit;

a demapping unit configured to demap an information symbol included in the frequency-domain signal after the equalization processing and calculate reliability information of each bit in each symbol;

a decoding unit configured to execute error correction decoding processing by using the reliability information of each bit and output an obtained decoded bit;

a detection unit configured to detect a phase difference between the frequency-domain signal after the equalization processing and a reference signal;

a loop filter configured to output a phase difference obtained by reducing a noise component of the detected phase difference;

a phase noise compensation processing unit disposed at an input stage of the demapping unit and configured to compensate for a phase noise of the frequency-domain signal after the equalization processing by using the output phase difference; and a symbol estimation unit configured to map the decoded bit to a symbol to obtain a reproduced symbol and output the reproduced symbol as the reference signal.

A radio reception device according to a tenth example aspect of the present disclosure includes:

a signal processing unit configured to execute signal processing on an orthogonal frequency division multiplexing (OFDM) signal or DFT-spread OFDM signal, wherein the signal processing unit includes:

a phase noise compensation unit configured to estimate a phase noise of a received OFDM signal or DFT-spread OFDM signal based on a pilot signal included in the received OFDM signal or DFT-spread OFDM signal and compensate for the phase noise of the received OFDM signal or DFT-spread OFDM signal;

a transform unit configured to receive the received OFDM signal or DFT-spread OFDM signal after the phase noise compensation by the phase noise compensation unit and convert the received OFDM signal or DFT-spread OFDM signal into a frequency-domain signal;

an equalization unit configured to execute equalization processing on the frequency-domain signal obtained by the transform unit;

an extraction unit configured to extract a pilot signal included in the frequency-domain signal obtained by the transform unit;

a channel estimation unit configured to estimate a channel response by using the extracted pilot signal;

a demapping unit configured to demap an information symbol included in the frequency-domain signal obtained by the transform unit and reproduce an information bit;

a symbol estimation unit configured to map the reproduced information bit to a symbol to obtain a reproduced symbol;

a calculation unit configured to calculate a discrete Fourier transform coefficient for a phase noise by a minimum mean square error standard based on the information symbol included in the frequency-domain signal obtained by the transform unit, the estimated channel response, and the reproduced symbol; and an inter-carrier interference compensation unit disposed at an input stage of the equalization unit and configured to execute convolution processing by using the frequency-domain signal obtained by the transform unit and the calculated discrete Fourier transform coefficient to compensate for the phase noise of the received OFDM signal or DFT-spread OFDM signal after the phase noise compensation by the phase noise compensation unit.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 13 is a diagram for explaining an example of a code division multiplexing (CDM) pilot signal multiplexing method in single-carrier DFT-spread OFDM;

EXAMPLE EMBODIMENTS

Figure 1:
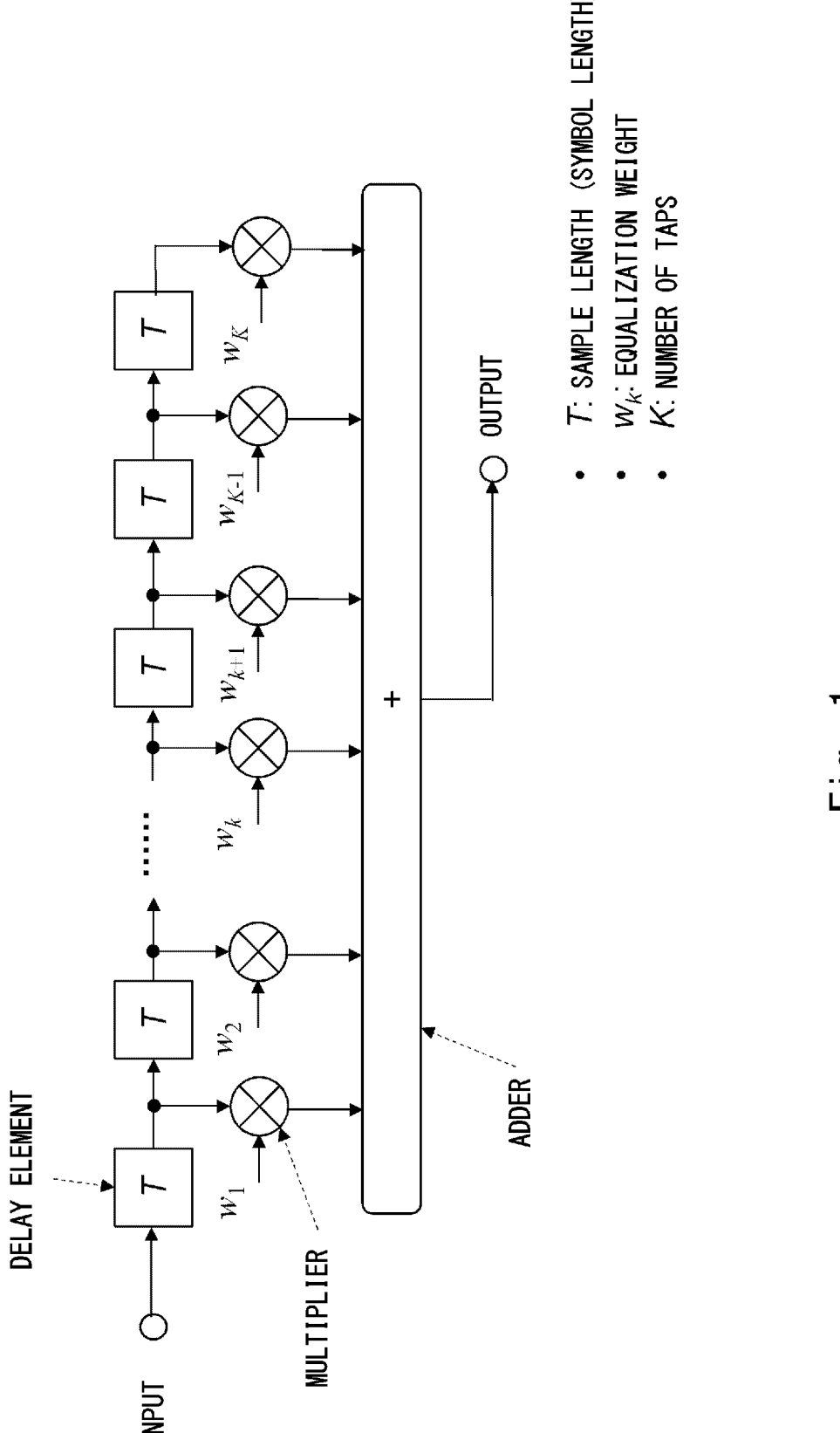
FIG. 1 is a diagram illustrating a configuration of a transverse filter.
Figure 2:
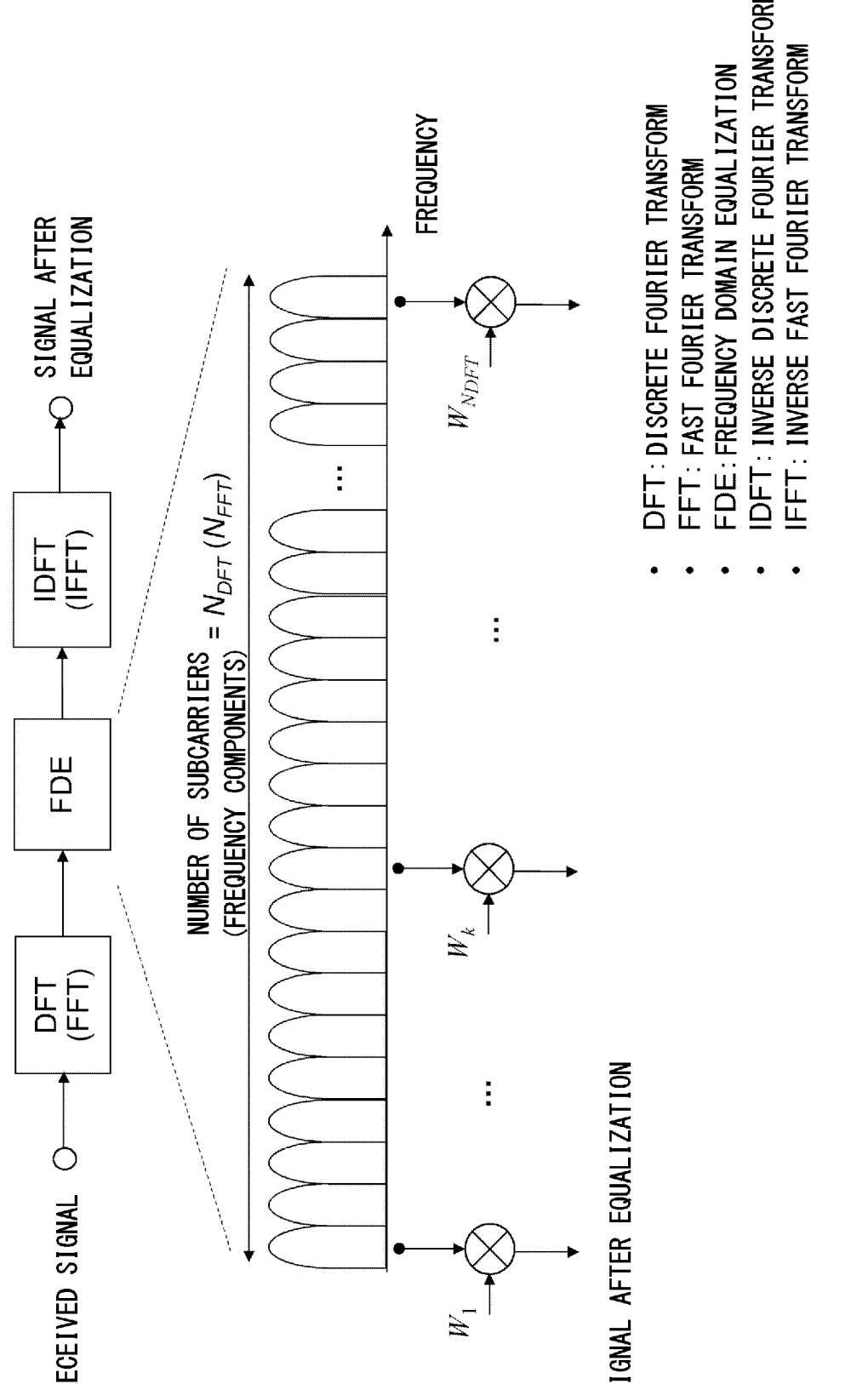
FIG. 2 is a diagram illustrating a configuration of a frequency domain equalizer.
Figure 3:
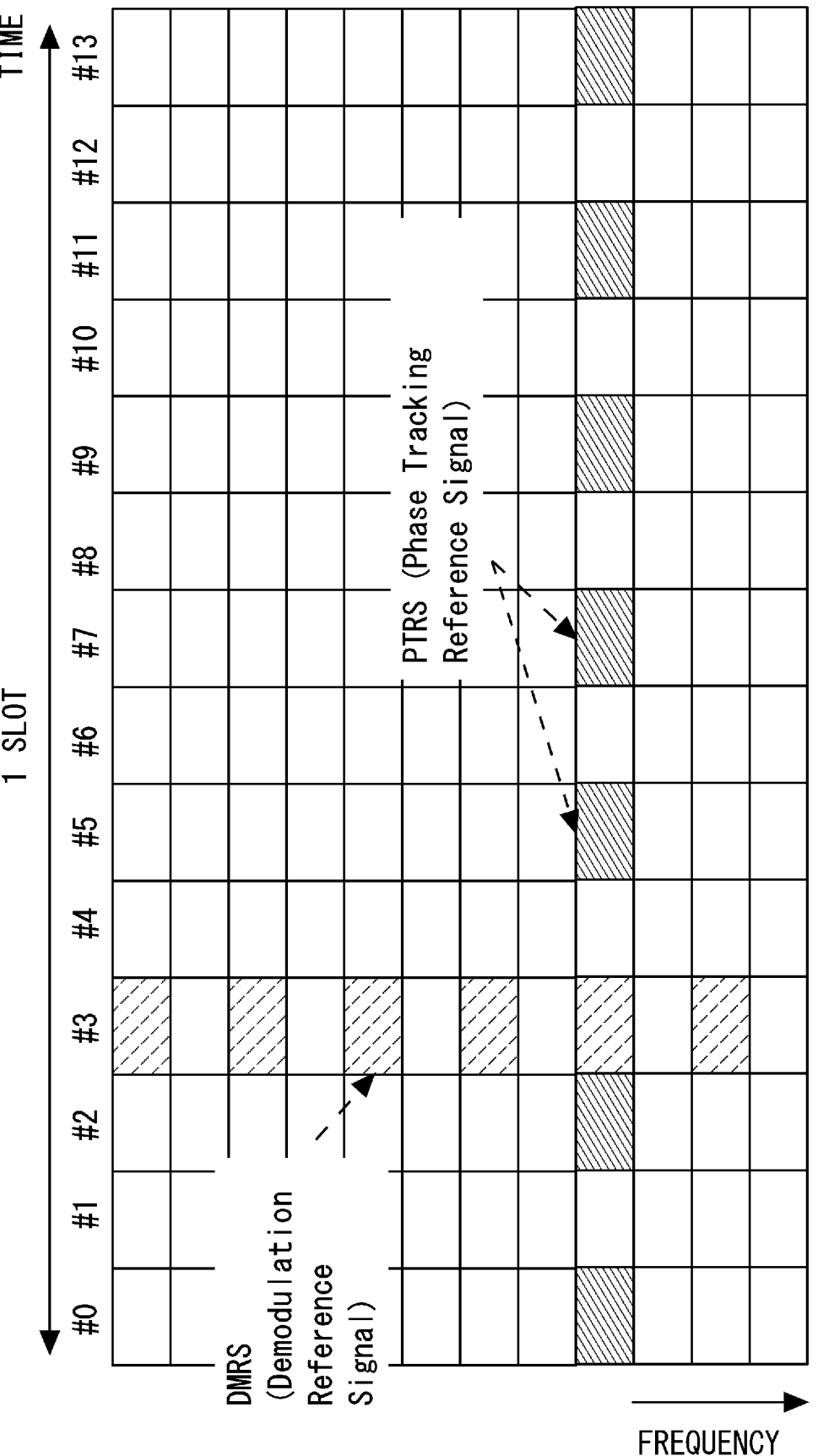
FIG. 3 is a diagram illustrating a phase tracking reference signal multiplexing method in a NR radio interface.
Figure 4A:
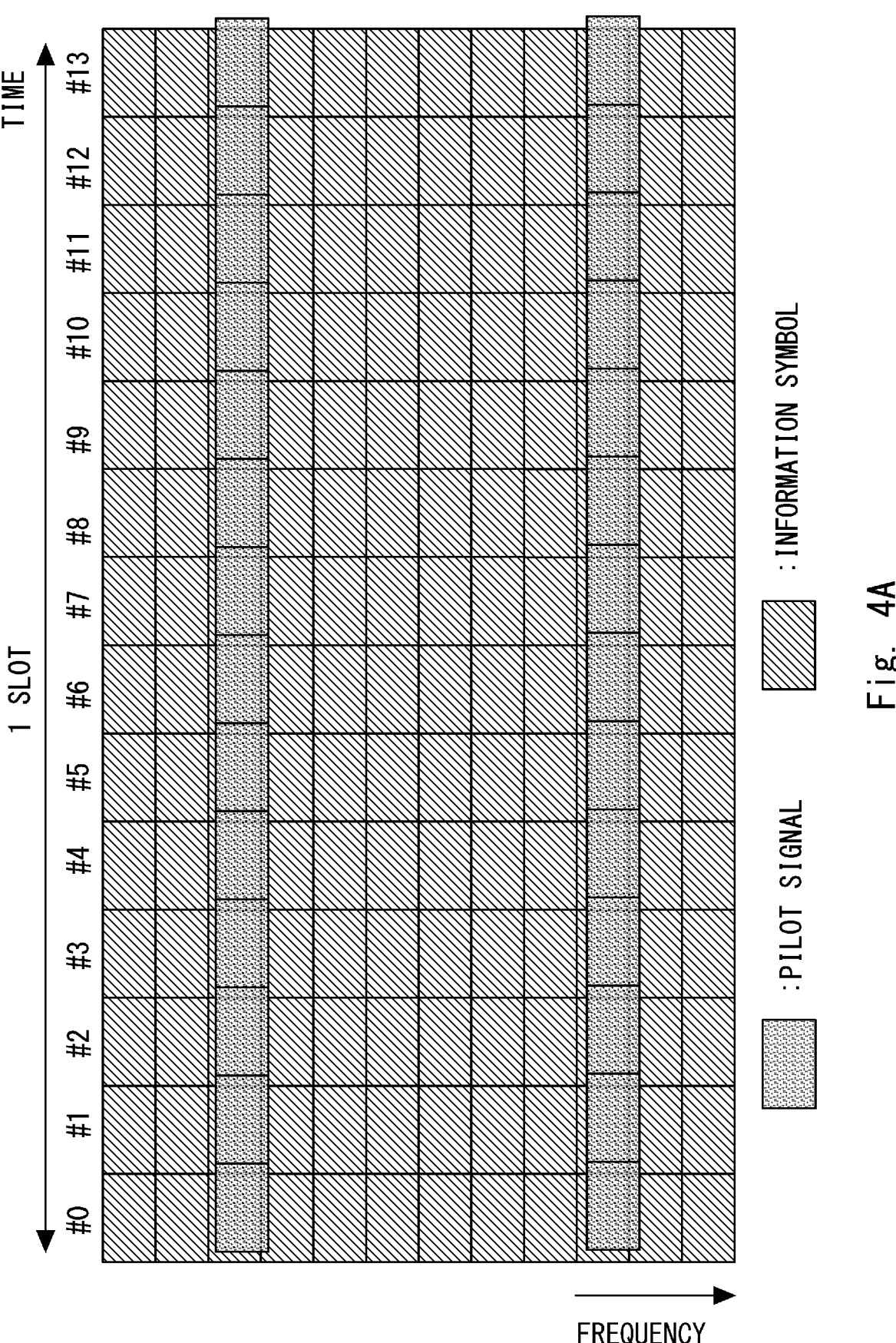
FIG. 4A is a diagram illustrating a frequency domain superimposed pilot technique.
Figure 4B:
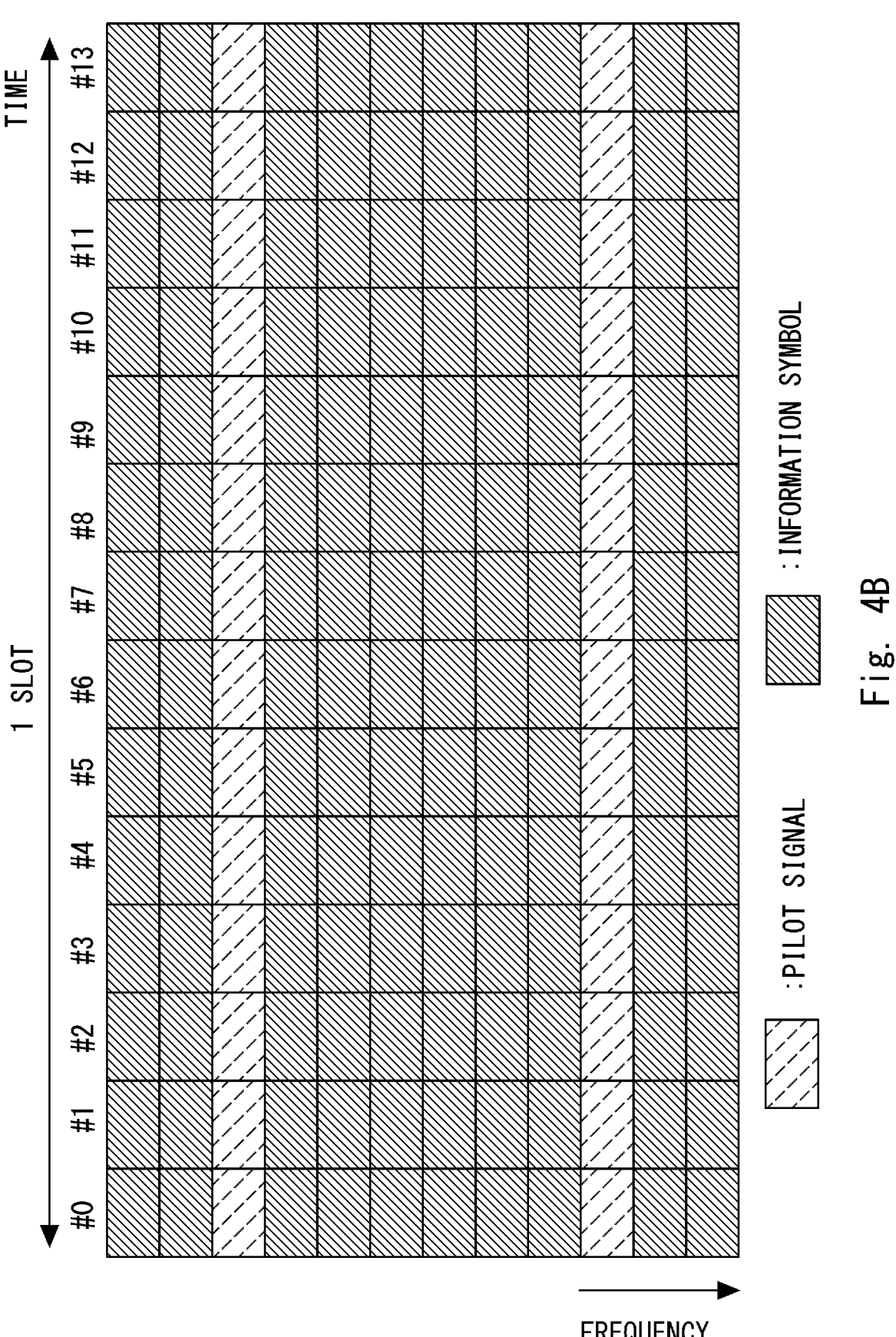
FIG. 4B is a diagram illustrating a frequency expanding technique.

Hereinafter, example embodiments will be described with reference to the drawings. In the drawings according to the present disclosure, connection between blocks is indicated by an arrow, but the arrow is illustrated for convenience of description, and the connection between the blocks does not necessarily follow the order of the arrow. In the description and drawings described below, omission and simplification are made as appropriate, for clarity of description. Furthermore, in each of the drawings described below, the same elements are denoted by the same reference signs, and a duplicate description is omitted as necessary. In the present disclosure, unless otherwise specified, "at least one of A or B (A/B)" may mean any one of A or B, or may mean both A and B. Similarly, in a case where "at least one of" is used for three or more elements, it may mean any one of these elements or any plurality of elements (including all elements).

First Example Embodiment

<Configuration Example of Radio Transmission Device>

Figure 5:
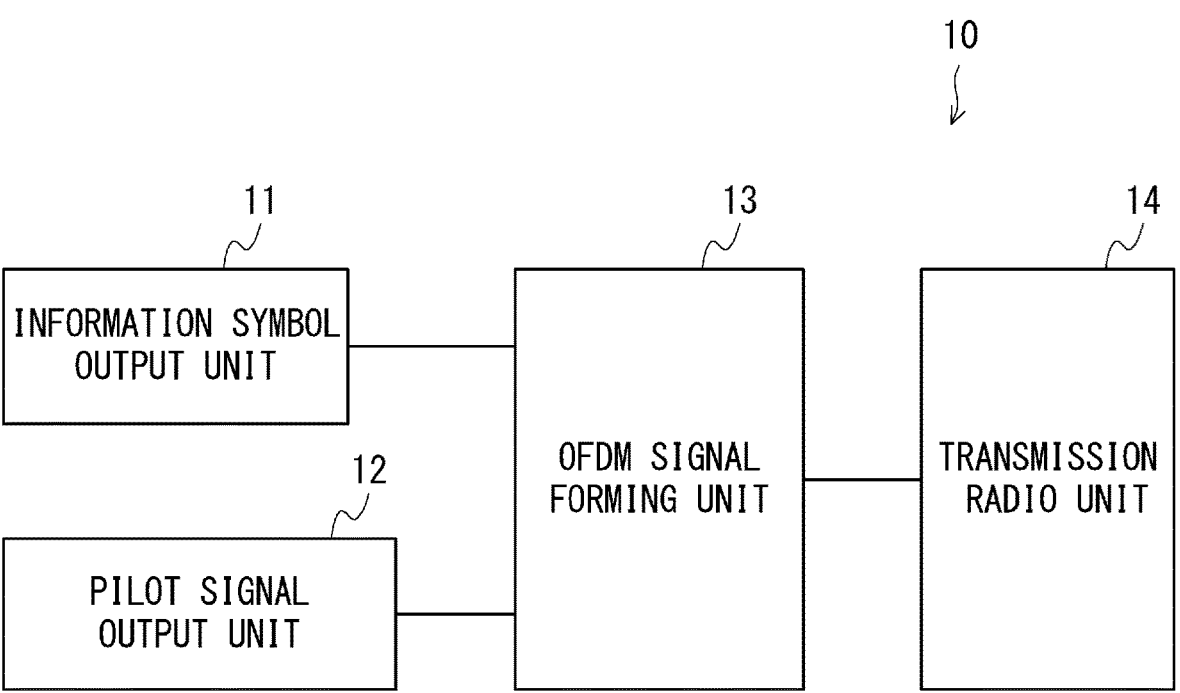
FIG. 5 is a block diagram illustrating an example of a radio transmission device according to a first example embodiment.

FIG. 5 is a block diagram illustrating an example of a radio transmission device according to a first example embodiment. In FIG. 5, a radio transmission device 10 includes an information symbol output unit 11, a pilot signal output unit 12, an OFDM signal forming unit 13, and a transmission radio unit 14. The radio transmission device 10 may include the same number of sets of the information symbol output unit 11, the pilot signal output unit 12, the OFDM signal forming unit 13, and the transmission radio unit 14 as the number of antennas of the radio transmission device 10. Then, a radio signal of an OFDM signal transmitted from a corresponding antenna may be formed in each set.

The information symbol output unit 11 forms an information symbol and outputs the information symbol to the OFDM signal forming unit 13. For example, the information symbol output unit 11 performs channel coding on an information bit sequence by using, for example, a low-density parity-check (LDPC) code. Then, the information symbol output unit 11 forms the information symbol by bit-mapping a coded bit obtained by bit-interleaving the channel-coded bit to signal space arrangement (constellation) of a modulation scheme allocated according to reception quality.

The pilot signal output unit 12 forms a pilot signal and outputs the pilot signal to the OFDM signal forming unit 13.

The OFDM signal forming unit 13 forms an OFDM signal including the information symbol and the pilot signal. For example, the OFDM signal forming unit 13 forms the OFDM signal by arranging the pilot signals according to a "pilot arrangement pattern". The "pilot arrangement pattern" is an arrangement pattern of a resource element in which the pilot signal is arranged in the OFDM signal. The resource element is defined (specified) by a combination of a subcarrier and an OFDM symbol. In the present disclosure, multi-carrier OFDM and single-carrier DFT-spread OFDM may be collectively referred to simply as "OFDM". Furthermore, in the description of the single-carrier DFT-spread OFDM, a subcarrier of the OFDM may be referred to as a "tone (frequency component)" for convenience. Further, in the description of the single-carrier DFT-spread OFDM, the OFDM symbol may be referred to as a "single-carrier symbol block" for convenience.

(Case of Multi-Carrier OFDM)

Figure 6:
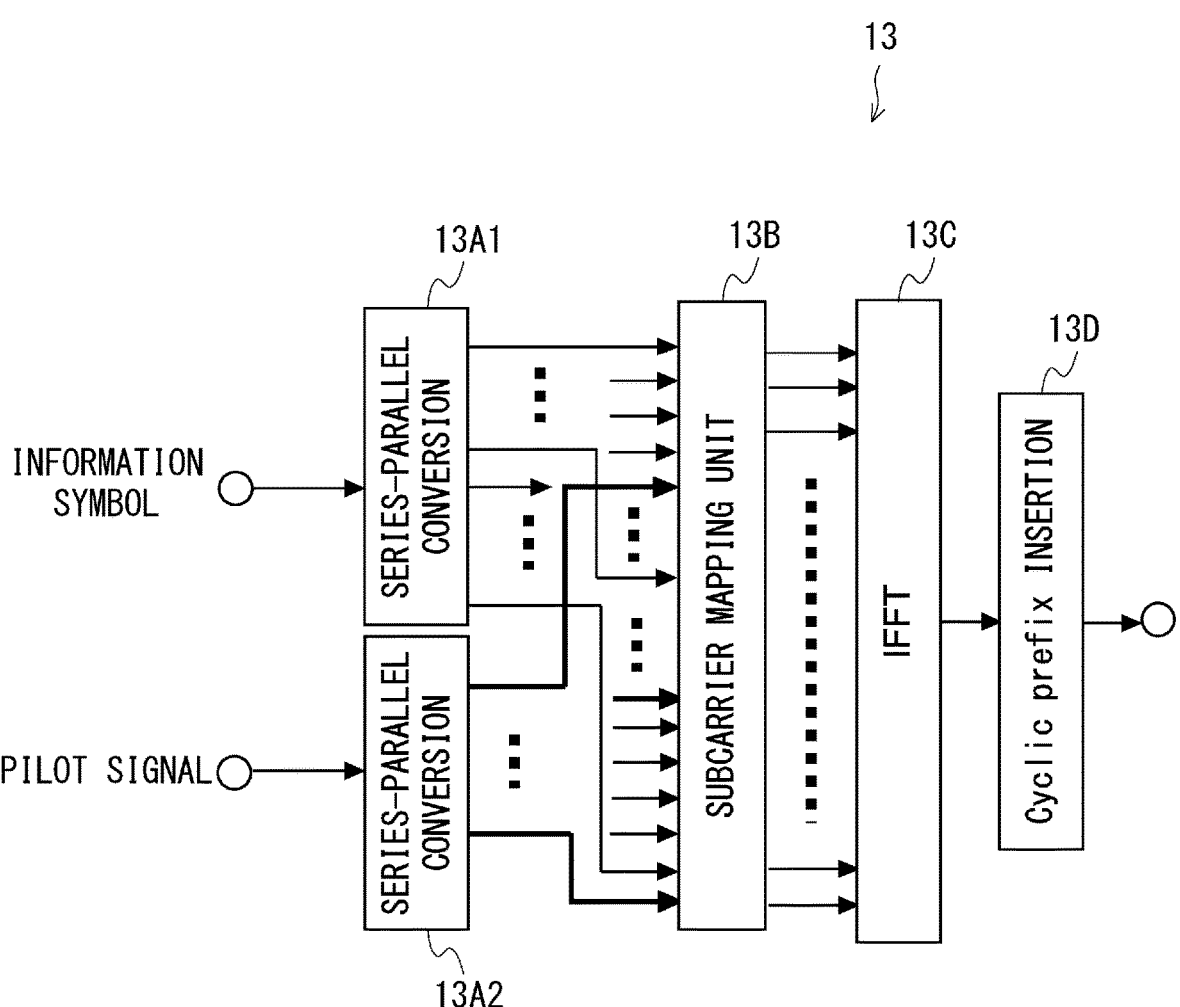
FIG. 6 is a block diagram illustrating an example of an OFDM signal forming unit.

FIG. 6 is a block diagram illustrating an example of the OFDM signal forming unit. In FIG. 6, the OFDM signal forming unit 13 includes series-parallel conversion units 13A1 and 13A2, a subcarrier mapping unit 13B, an inverse fast Fourier transform (IFFT) unit 13C, and a cyclic prefix (CP) insertion unit 13D.

The series-parallel conversion unit 13A1 performs series/parallel conversion (S/P conversion) on a plurality of serial information symbols into parallel information symbols.

The series-parallel conversion unit 13A2 performs S/P conversion on a plurality of serial pilot symbols into parallel pilot symbols.

The subcarrier mapping unit 13B maps the parallel information symbols received from the series-parallel conversion unit 13A1 and the parallel pilot symbols received from the series-parallel conversion unit 13A2 to subcarriers according to resource allocation. As a result, a frequency-domain OFDM signal (that is, OFDM symbol) of an $N_{FFT}$ size is formed. As described above, the subcarrier mapping unit 13B maps the pilot symbol to the subcarrier (resource element) according to the "pilot arrangement pattern".

The IFFT unit 13C converts the frequency-domain OFDM signal formed by the subcarrier mapping unit 13B into a time-domain OFDM signal by inverse fast Fourier transform (IFFT) of the $N_{FFT}$ size.

The CP insertion unit 13D adds, as a cyclic prefix (CP), a signal at the end of the OFDM symbol to the head of the OFDM symbol. In this manner, the OFDM signal is formed.

(Case of Single-Carrier DFT-Spread OFDM)

Figure 7:
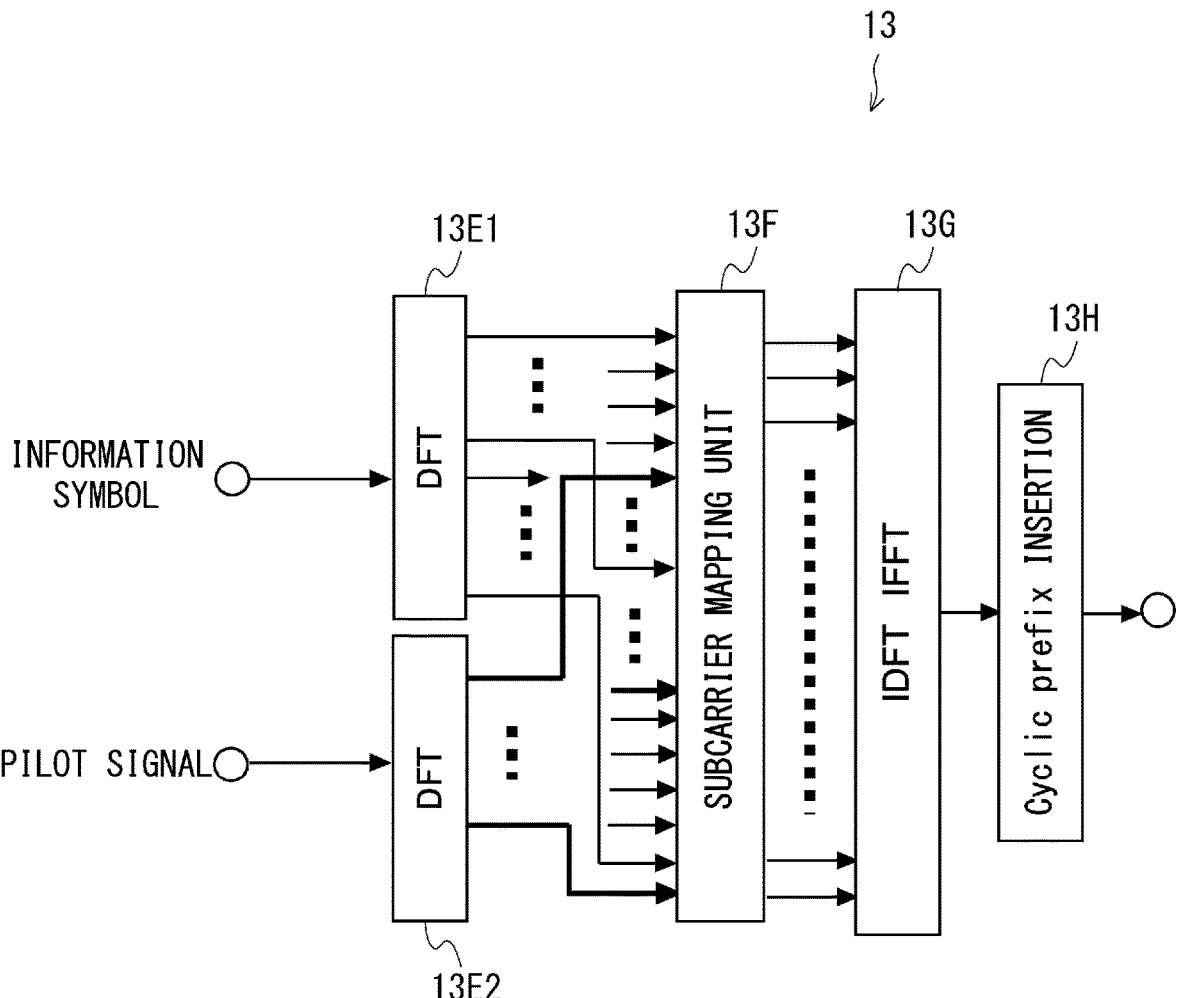
FIG. 7 is a block diagram illustrating another example of the OFDM signal forming unit.

FIG. 7 is a block diagram illustrating another example of the OFDM signal forming unit. In FIG. 7, the OFDM signal forming unit 13 includes discrete Fourier transform (DFT) units 13E1 and 13E2, a subcarrier mapping unit 13F, an inverse discrete Fourier transform (IDFT) unit 13G, and a CP insertion unit 13H.

The DFT unit 13E1 blocks the plurality of serial information symbols every $N_{DFT}$ symbols. The DFT unit 13E1 converts the single-carrier symbol block into a frequency-domain signal by DFT of an $N_{DFT}$ size.

The DFT unit 13E2 divides the plurality of serial pilot symbols every $N_{DFT}$ symbols. The DFT unit 13E1 converts the single-carrier symbol block into a frequency-domain signal by DFT of an $N_{DFT}$ size.

The subcarrier mapping unit 13F maps the frequency-domain signal (information symbol) received from the DFT unit 13E1 and the frequency-domain signal (pilot symbol) received from the DFT unit 13E2 to the tone according to the resource allocation. As a result, the frequency-domain OFDM signal (that is, the single-carrier symbol block) of the $N_{FFT}$ size is formed. As described above, the subcarrier mapping unit 13B maps the pilot symbol to the tone (resource element) according to the "pilot arrangement pattern".

The IDFT unit 13G converts the frequency-domain OFDM signal formed by the subcarrier mapping unit 13F into the time-domain OFDM signal by IFFT of the $N_{FFT}$ Size.

The CP insertion unit 13H adds, as a cyclic prefix (CP), a signal at the end of the OFDM symbol to the head of the OFDM symbol. In this manner, the OFDM signal is formed.

Returning to the description of FIG. 5, the transmission radio unit 14 executes transmission radio processing (analog/digital conversion, up conversion, or the like) on the OFDM signal formed by the OFDM signal forming unit 13 to form a radio signal. The radio signal is transmitted from an antenna (not illustrated) connected to the transmission radio unit 14.

Example 1 of Pilot Arrangement Pattern

Figure 8:
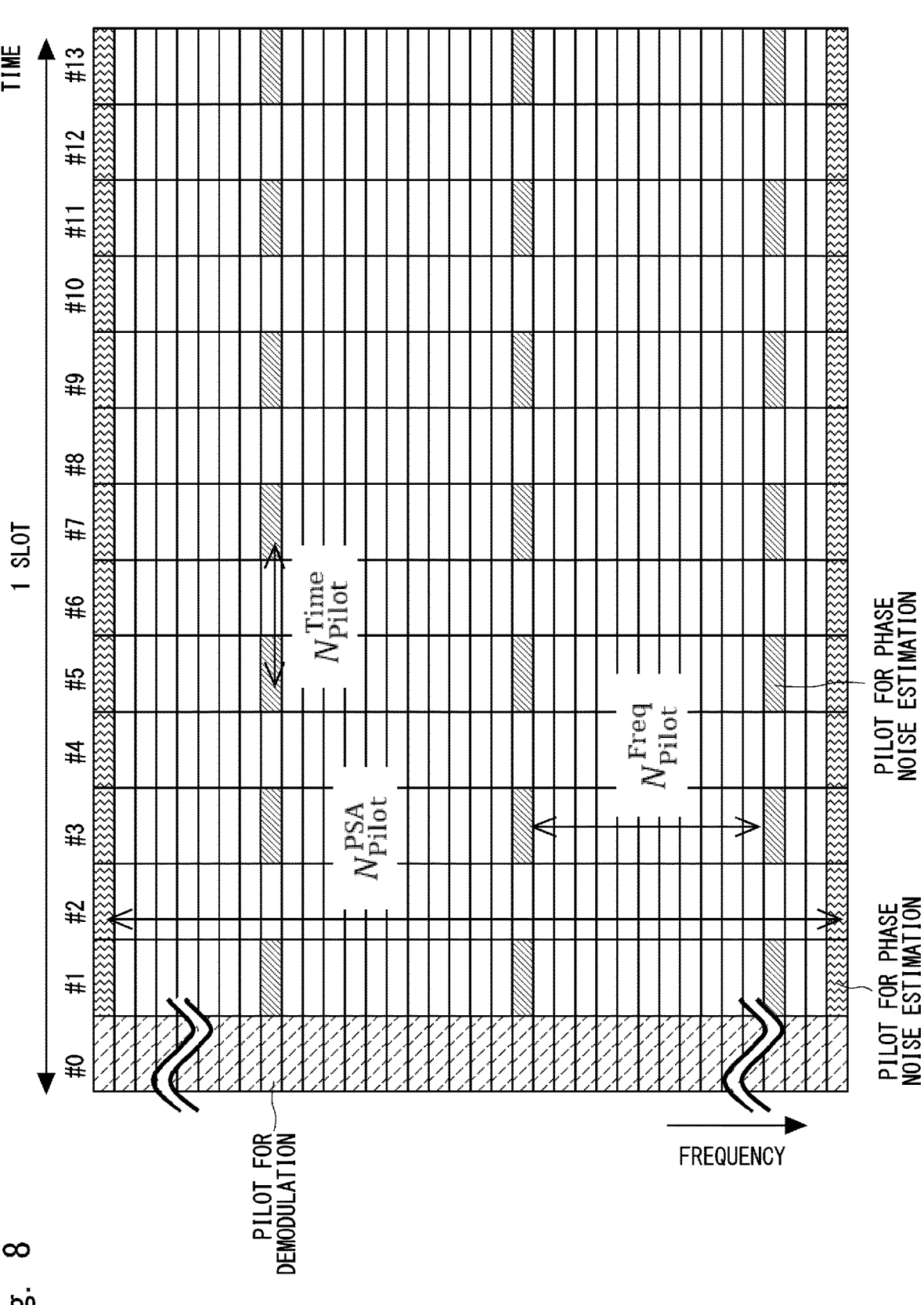
FIG. 8 is a diagram for explaining Example 1 of a pilot arrangement pattern.

FIG. 8 is a diagram for explaining Example 1 of the pilot arrangement pattern. The OFDM signal forming unit 13 may arrange the pilot signals according to the pilot arrangement pattern illustrated in FIG. 8. In a pilot arrangement pattern 1 illustrated in FIG. 8, pilot signals for phase noise estimation are arranged in a plurality of pilot arrangement subcarriers with an $N_{Pilot\_Freq}$-subcarrier (tone) interval among all subcarriers (tones) of the OFDM signal. In FIG. 8, $N_{Pilot\_Freq}$ is expressed as $$N_{Pilot}^{Freq} \qquad\qquad \text{[Mathematical Formula 3]}$$

but the meaning thereof is the same.

Further, in the pilot arrangement pattern 1 illustrated in FIG. 8, among the plurality of pilot arrangement subcarriers (tones) with the $N_{Pilot\_Freq}$-subcarrier (tone) interval, in a plurality of first pilot arrangement subcarriers (tones) with an $N_{Pilot\_SP4}$-subcarrier (tone) interval, pilot signals for phase noise estimation are arranged in all resource elements (OFDM symbols (single-carrier symbol blocks) #1 to #13 in FIG. 8) (excluding the head OFDM symbol (head single-carrier symbol block)). That is, in the plurality of first pilot arrangement subcarriers (tones) with the $N_{Pilot\_SP4}$-subcarrier (tone) interval, the pilot signals for phase noise estimation are arranged in a plurality of temporally consecutive resource elements.

In addition, in the pilot arrangement pattern 1 illustrated in FIG. 8, among the plurality of pilot arrangement subcarriers (tones) with the $N_{Pilot\_Freq}$-subcarrier (tone) interval, in a plurality of second pilot arrangement subcarriers (tones) excluding the plurality of first pilot arrangement subcarriers (tones), pilot signals for phase noise estimation are arranged in a cycle of $N_{Pilot\_Time}$ resource elements in the time domain. That is, the pilot signals are discretely arranged in the second pilot arrangement subcarriers (tones). $N_{Pilot\_Time}$ is an integer value of 2 or more, and is changed mainly according to a modulation scheme (that is, signal space arrangement for mapping the channel-coded bit). For example, in a case where a modulation order is small (that is, in a case where the number of signal points in the signal space arrangement is small), since a phase margin between adjacent signal points is large, the value of $N_{Pilot\_Time}$ is set large to reduce an insertion loss of the pilot signal. On the other hand, in a case where the modulation order is large (that is, in a case where the number of signal points is large), since the phase margin between adjacent signal points is small, the value of $N_{Pilot\_Time}$ is reduced so that phase noise estimation using the pilot signal can be performed at a short time interval. There may be a mode in which the pilot signal is not multiplexed onto subcarriers (tones) other than the plurality of first pilot arrangement subcarriers (tones) with the $N_{Pilot\_SPA}$-subcarrier (tone) interval (that is, a mode in which $N_{Pilot\_Time} = \infty$).

Here, in the DFT-spread OFDM, when the pilot signal is subjected to frequency division multiplexing (FDM) onto a single-carrier signal of the information symbol, a peak-to-average power ratio (PAPR) increases because it corresponds to multi-carrier OFDM. However, in the pilot signal multiplexing of the pilot arrangement pattern 1, the tone interval of the pilot signal subjected to FDM onto each single-carrier symbol block is constant. Therefore, since interleaved frequency division multiple access (FDMA) has a different signal bandwidth, an increase in PAPR can be suppressed to be low although the PAPR is increased as compared with a case of a complete single carrier.

As illustrated in FIG. 8, the pilot signal multiplexed onto the head OFDM symbol (alternatively, the head single-carrier symbol block) is a demodulation pilot signal for estimating a channel response of coherent detection. In the 5G and Beyond 5G systems, in order to implement a low transmission delay, the subcarrier interval is increased in a scalable manner from 15 kHz of LTE, and a slot length is decreased. Therefore, amplitude and phase fluctuations caused by multipath fading of a propagation path in a slot section are very small. Therefore, a channel response of each subcarrier (tone) position estimated at the head position of a slot can be used for all OFDM symbols (single-carrier symbol blocks) in the slot. In the example embodiment of FIG. 8, the demodulation pilot signal is continuously multiplexed at all subcarrier (tone) positions of the OFDM symbol (or single-carrier symbol block).

According to the pilot arrangement pattern 1 described above, among the plurality of pilot arrangement subcarriers (tones) with the $N_{Pilot\_Freq}$-subcarrier (tone) interval, in the plurality of first pilot arrangement subcarriers (tones) with the $N_{Pilot\_SPA}$-subcarrier (tone) interval, the pilot signals for phase noise estimation are arranged in all the resource elements (excluding the head OFDM symbol (single-carrier symbol block)). That is, in the plurality of first pilot arrangement subcarriers (tones) with the $N_{Pilot\_SPA}$-subcarrier (tone) interval, the pilot signals for phase noise estimation are arranged in a plurality of temporally consecutive resource elements.

Further, according to the pilot arrangement pattern 1, the information symbol and the pilot symbol are mapped to different resource elements. Therefore, unlike the FDSPT, the pilot symbol is orthogonal to the information symbol. Therefore, it is possible to estimate the phase noise with high accuracy by using the pilot symbol that is free from interference of the information symbol.

Further, according to the pilot arrangement pattern 1, among the plurality of pilot arrangement subcarriers (tones) with the $N_{Pilot\_Freq}$-subcarrier (tone) interval, in a plurality of second pilot arrangement subcarriers (tones) excluding the plurality of first pilot arrangement subcarriers (tones), pilot signals for phase noise estimation are arranged in a cycle of $N_{Pilot\_Time}$ resource elements in the time domain. As a result, the insertion loss of the pilot signal can be reduced as compared with the FET.

Further, according to the pilot arrangement pattern 1, in the single-carrier symbol block of the DFT-spread OFDM, the pilot signal is multiplexed at a constant frequency interval between the information symbols in the frequency domain. For this reason, similarly to the interleaved FDMA and the FET, the peak-to-average power ratio (PAPR) increases as compared with a case of the complete single carrier, but an increase in PAPR can be suppressed to be low as compared with the OFDM.

Example 2 of Pilot Arrangement Pattern

Figure 9:
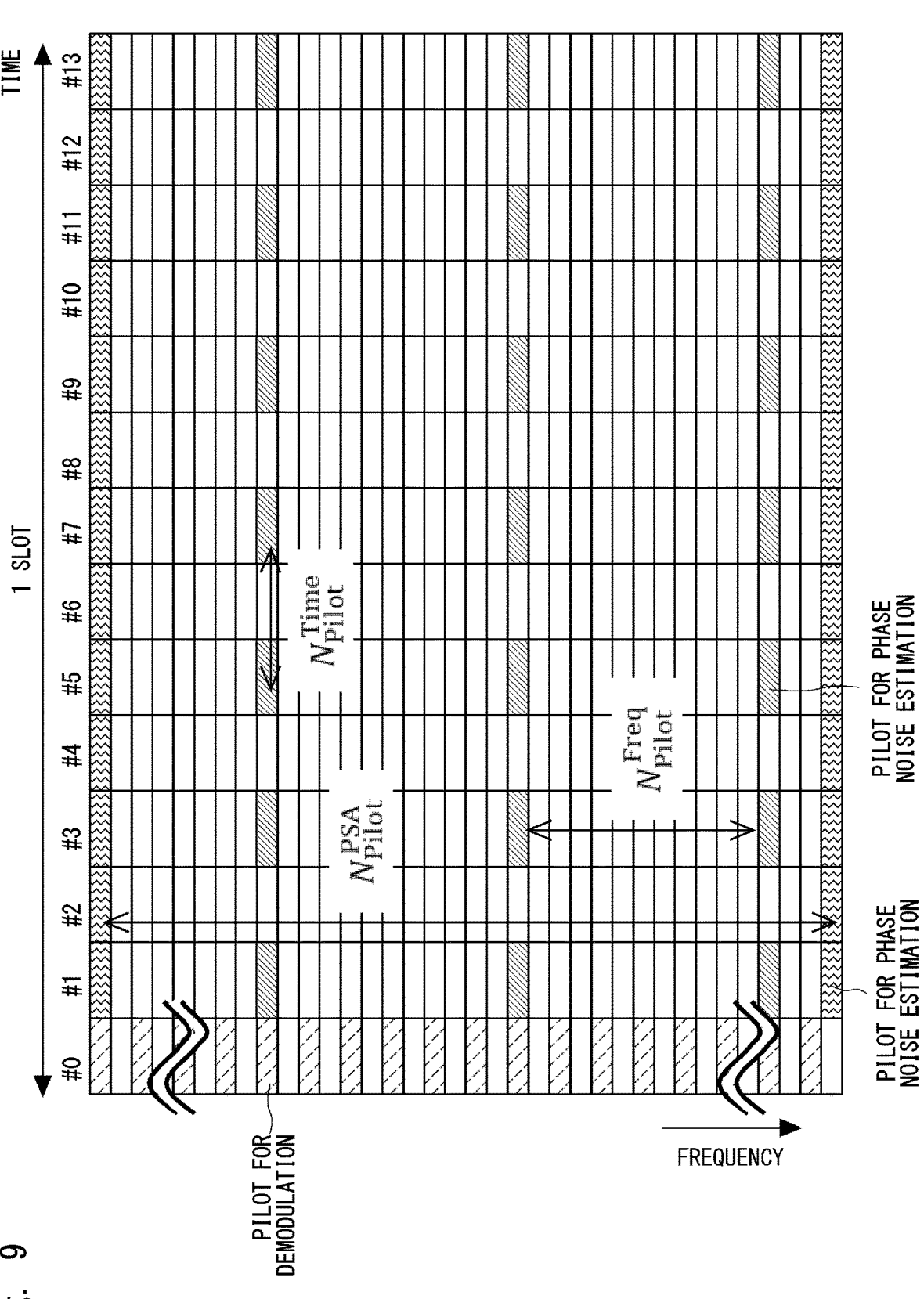
FIG. 9 is a diagram for explaining Example 2 of the pilot arrangement pattern.

FIG. 9 is a diagram for explaining Example 2 of the pilot arrangement pattern. A pilot arrangement pattern 2 illustrated in FIG. 9 is different from the pilot arrangement pattern 1 of FIG. 8 in arrangement of the demodulation pilot signals. That is, as illustrated in FIG. 9, the demodulation pilot signals are thinned out and multiplexed at discrete subcarrier (tone) positions in the frequency domain. When the demodulation pilot signals are thinned out and multiplexed in this manner, for example, control information can be multiplexed onto a resource element (RE) onto which the demodulation pilot signal is not multiplexed. In the single-carrier DFT-spread OFDM, in a case where the pilot signal and the control information symbol are subjected to interleaved FDMA multiplexing in a comb shape in the frequency domain, an increase in PAPR does not occur.

Example 3 of Pilot Arrangement Pattern

Figure 10:
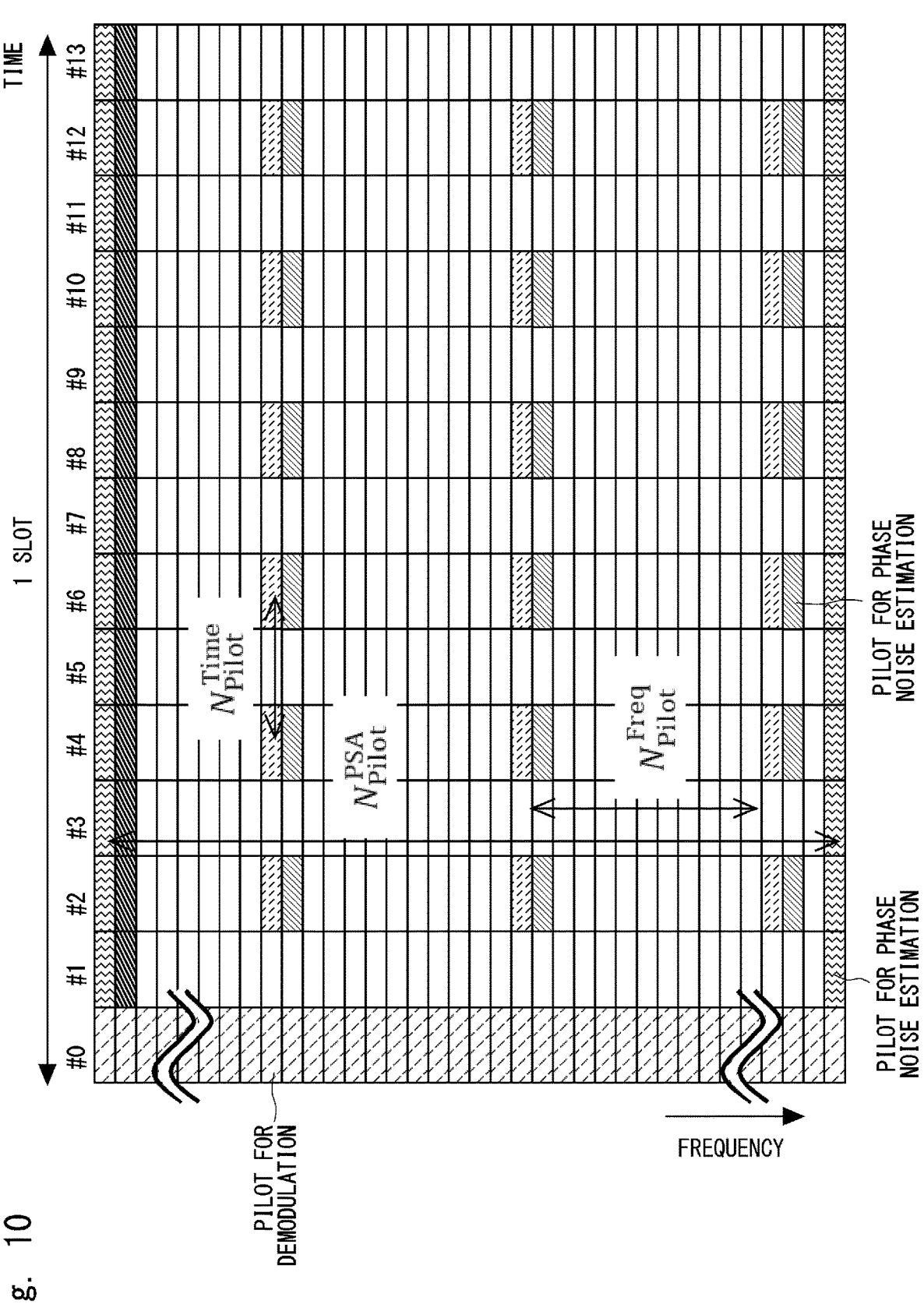
FIG. 10 is a diagram for explaining Example 3 of the pilot arrangement pattern.

FIG. 10 is a diagram for explaining Example 3 of the pilot arrangement pattern. A pilot arrangement pattern 3 illustrated in FIG. 10 is an example of the pilot arrangement pattern in a case of multi-antenna transmission. That is, it is assumed that the radio transmission device 10 includes $N_{TX\_Ant}$ (an integer of 2 or more) antennas including a first antenna and a second antenna. FIG. 10 particularly illustrates a case where $N_{TX\_Ant}=2$.

According to the pilot arrangement pattern 3 illustrated in FIG. 10, in the OFDM signal transmitted by the first antenna, the pilot signals for phase noise estimation are arranged with the same pattern as the pilot arrangement pattern 1. Further, according to the pilot arrangement pattern 3, in the OFDM signal transmitted by the second antenna, the pilot signals for phase noise estimation are arranged with the same pattern as the pilot arrangement pattern 1 in a plurality of pilot arrangement subcarriers (tones) shifted from the plurality of pilot arrangement subcarriers (tones) of the pilot arrangement pattern 1 by one subcarrier (tone) in the frequency direction. For third and subsequent antennas, it is sufficient if the pilot signals for phase noise estimation are arranged with the same pattern as the pilot arrangement pattern 1 in a plurality of pilot arrangement subcarriers (tones) sequentially shifted from a plurality of pilot arrangement subcarriers (tones) for the previous antenna by one subcarrier (tone) in the frequency direction. That is, according to the pilot arrangement pattern 3 illustrated in FIG. 10, the pilot signals of different transmission antennas are orthogonally multiplexed by the FDM. Pilot signals transmitted from $N_{TX\;Ant}$ (an integer of 2 or more) transmission antennas are orthogonal to each other. Therefore, in a case where a pilot signal transmitted from one transmission antenna is multiplexed onto a certain resource element, muting is performed in a resource element of an OFDM signal transmitted from another transmission antenna.

As for the demodulation pilot signal multiplexed onto the head OFDM symbol (alternatively, the head single-carrier symbol block), it is conceivable that the demodulation pilot signal is subjected to FDM every $N_{TX\;Ant}$ subcarriers in the frequency domain, and the demodulation pilot signal is subjected to code division multiplexing (CDM) between the antennas. In a case where the demodulation pilot signal is subjected to FDM, a channel response at a subcarrier position where the demodulation pilot signal is not multiplexed can be estimated by interpolating an estimated value of a channel response at a subcarrier position where the pilot signal is multiplexed.

Example 4 of Pilot Arrangement Pattern

Figure 11:
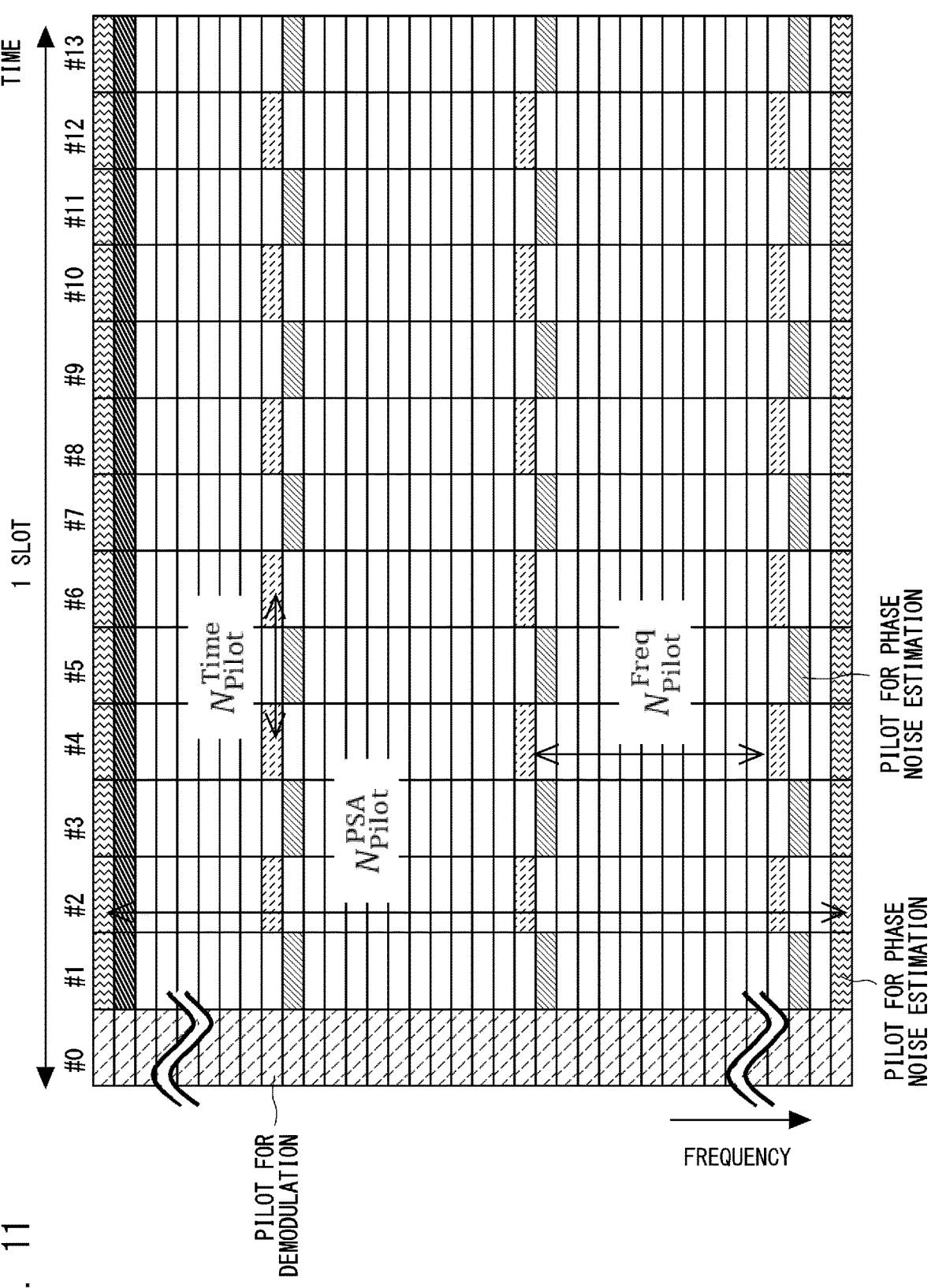
FIG. 11 is a diagram for explaining Example 4 of the pilot arrangement pattern.

FIG. 11 is a diagram for explaining Example 4 of the pilot arrangement pattern. A pilot arrangement pattern 4 illustrated in FIG. 11 is different from the pilot arrangement pattern 3 in FIG. 10 in that, for the resource elements in which the pilot signals are arranged in the plurality of second pilot arrangement subcarriers excluding the plurality of first pilot arrangement subcarriers among the plurality of pilot arrangement subcarriers with the $N_{Pilot\_Freq}$-subcarrier interval, the resource elements for the OFDM signal transmitted by the first antenna and the resource elements for the OFDM signal transmitted by the second antenna do not temporally overlap each other. Specifically, for the resource elements in which the pilot signals are arranged in the plurality of second pilot arrangement subcarriers excluding the plurality of first pilot arrangement subcarriers among the plurality of pilot arrangement subcarriers with the $N_{Pilot\_Freq}$-subcarrier interval, the resource elements for the OFDM signal transmitted by the first antenna are shifted in the time domain direction by one resource element from the resource elements for the OFDM signal transmitted by the second antenna. Even in a case where there are three or more transmission antennas, the pilot signals can be arranged according to the same rule. As the pilot signals are arranged according to such a rule, the pilot signals are continuously arranged (multiplexed) in the time domain with respect to all the OFDM signals transmitted from $N_{Tx\;Ant}$ (an integer of 2 or more) transmission antennas. The subcarrier described above may be read as a tone.

Example 5 of Pilot Arrangement Pattern

Figure 12:
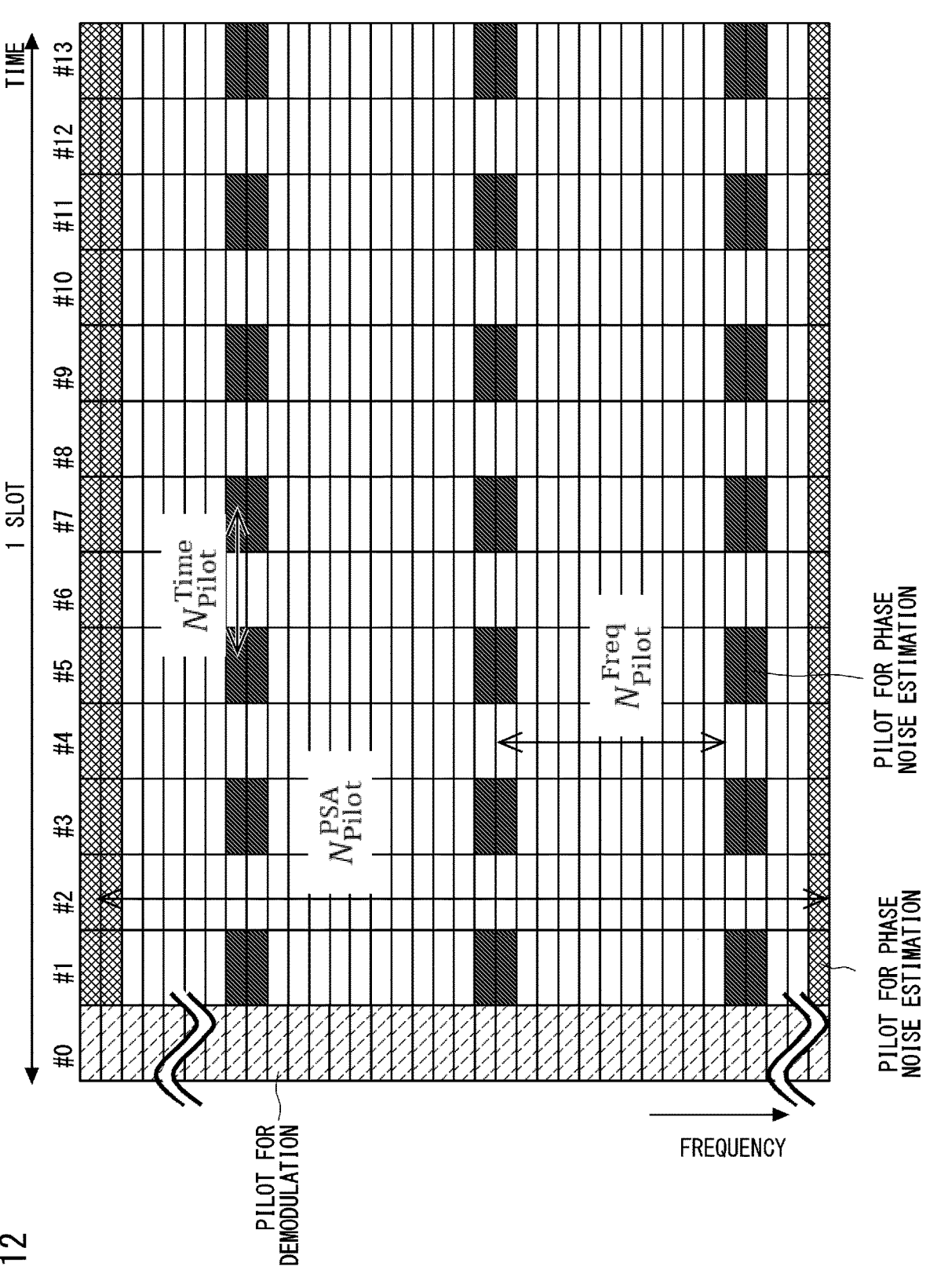
FIG. 12 is a diagram for explaining Example 5 of the pilot arrangement pattern.

FIG. 12 is a diagram for explaining Example 5 of the pilot arrangement pattern. A pilot arrangement pattern 5 illustrated in FIG. 12 is an example of the pilot arrangement pattern in a case of multi-antenna transmission. That is, it is assumed that the radio transmission device 10 includes $N_{TX\;Ant}$ (an integer of 2 or more) antennas including a first antenna and a second antenna. FIG. 12 particularly illustrates a case where $N_{TX\;Ant}=2$. In the pilot arrangement pattern 5 illustrated in FIG. 12, the pilot signals for phase noise estimation are arranged in a plurality of pilot arrangement subcarrier sets each including $N_{Tx\;Ant}$ consecutive subcarriers and an interval between two adjacent sets being $N_{Pilot\_Freq}$ subcarriers among all the subcarriers for the OFDM signal.

Further, in the pilot arrangement pattern 5 illustrated in FIG. 12, among the plurality of pilot arrangement subcarrier sets, in a plurality of first pilot arrangement subcarrier sets with the $N_{Pilot\_SPA}$-subcarrier interval, the pilot signals for phase noise estimation are arranged in all resource elements (OFDM symbols (single-carrier symbol blocks) #1 to #13 in FIG. 12).

In addition, in the pilot arrangement pattern 5 illustrated in FIG. 12, among the plurality of pilot arrangement subcarrier sets, in a plurality of second pilot arrangement subcarrier sets excluding the plurality of first pilot arrangement subcarrier sets, the pilot signals for phase noise estimation are arranged in a cycle of $N_{Pilot\_Time}$ resource elements in the time domain. That is, the pilot signals are discretely arranged in the second pilot arrangement subcarrier sets. $N_{Pilot\_Time}$ is an integer value of 2 or more, and is changed mainly according to a modulation scheme (that is, signal space arrangement for mapping the channel-coded bit).

The pilot signal transmitted from each transmit antenna is spread and then orthogonally multiplexed by CDM onto $N_{Tx\;Ant}$ consecutive subcarriers in the frequency domain. That is, the pilot signal output unit 12 may spread the pilot signal transmitted from each transmission antenna and output the spread pilot signal to the OFDM signal forming unit 13. The following two methods can be used as an orthogonal CDM method.

The first method is a method in which the pilot signal of each transmission antenna is spread with a different Walsh-Hadamard code of a sequence length $N_{Tx\;Ant}$, to map to a pilot arrangement subcarrier set of $N_{Tx\;Ant}$ subcarriers in the frequency domain.

The second method is a multiplexing method using a cyclic shift of a constant-amplitude Zadoff-Chu sequence shown in the following Formula (2).

[Mathematical Formula 4]

$$e^{-j\frac{\pi Mn(n+1)}{N_{seq}}} \tag{2}$$

In Formula (2), n represents a sequence index. $N_{seq}$ represents a sequence length. M represents a root index. It is essential that the root index has a disjoint relationship with the sequence length. It has already been reported that sequences obtained by cyclically shifting the Zadoff-Chu sequence have low cross-correlation characteristics. A pilot signal of a transmission antenna #0 is not cyclically shifted in a case where the number of transmission antennas is two, that is, $N_{CS}=2$ (where $N_{CS}$ represents the number of cyclic shifts). Then, a pilot signal of a transmission antenna #1 is cyclically shifted by the number of samples that is ½ of the sequence length. In this case, the pilot signals are orthogonally multiplexed onto two ($=N_{Tx\;Ant}=N_{CS}$) subcarriers in the frequency domain.

As for the demodulation pilot signal multiplexed onto the head OFDM symbol (alternatively, the head single-carrier symbol block), it is conceivable that the demodulation pilot signal is subjected to FDM every $N_{TX\;Ant}$ subcarriers in the frequency domain, and the demodulation pilot signal is subjected to CDM between the antennas onto $N_{Tx\_Ant}$ consecutive subcarriers. The subcarrier described above may be read as a tone.

Figure 13:
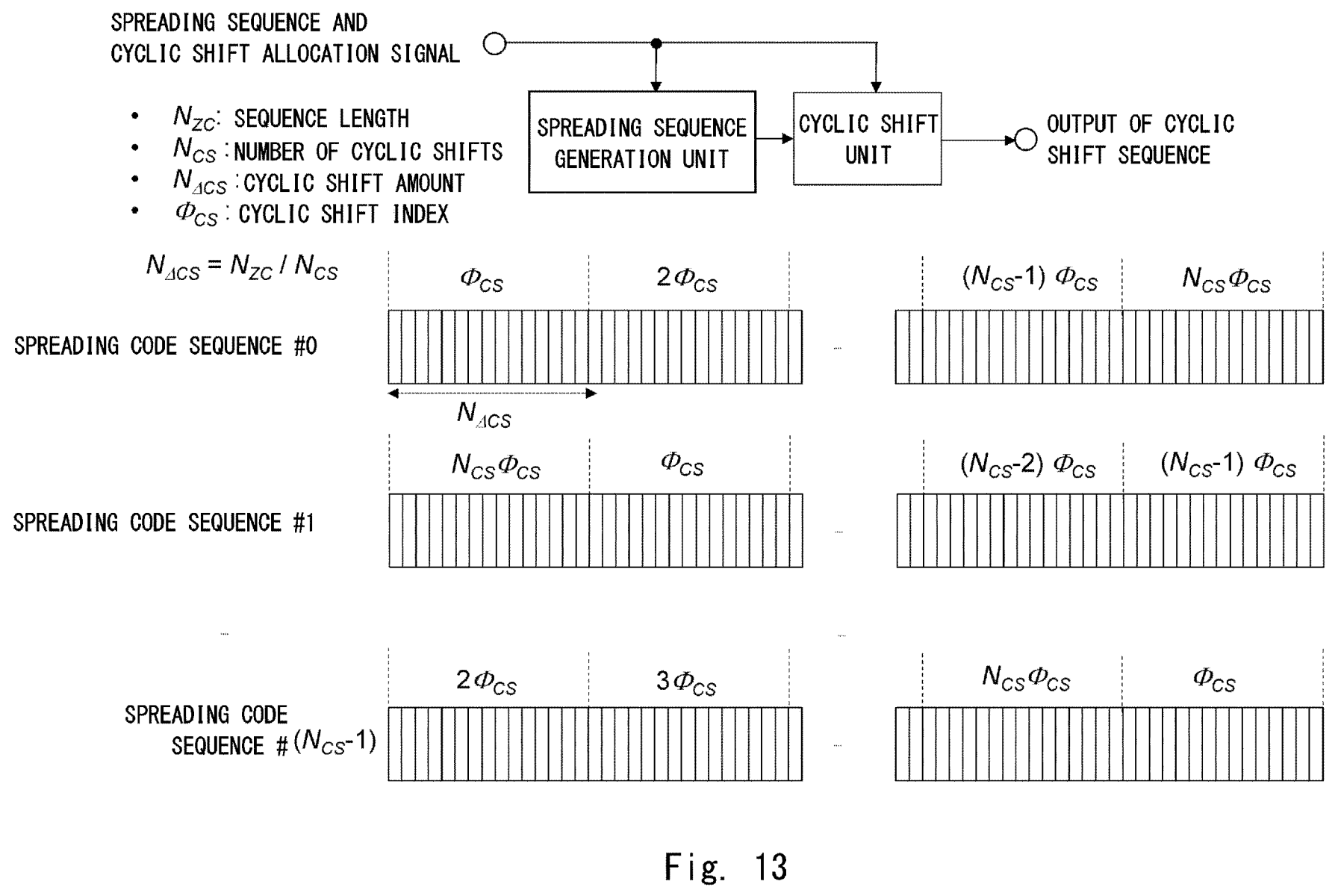

FIG. 13 is a diagram for explaining an example of a CDM pilot signal multiplexing method in the single-carrier DFT-spread OFDM. FIG. 13 illustrates a method corresponding to the above-described second method. Here, different cyclic shifts are given to Zadoff-Chu sequences with the same root index to generate pilot signals for phase noise estimation that are orthogonal to each other. In addition, the Zadoff-Chu sequence is assumed, and the sequence length is represented by $N_{ZC}$. The pilot signal output unit 12 may include a spreading sequence generation unit and a cyclic shift unit illustrated in FIG. 13.

A spreading code generation unit generates a spreading code such as a Zadoff-Chu sequence. A cyclic shift unit receives a spreading code from the spreading code generation unit, and generates the same number of cyclic shift sequences as the number of cyclic shifts, which is the number corresponding to the number $N_{Tx\_Ant}$ of transmission antennas, by using the spreading code. In a case where the number of cyclic shifts is $N_{CS}$, a cyclic shift sequence length (that is, a cyclic shift amount) of a cyclic shift index is $N_{ACS}=N_{ZC}/N_{CS}$. When the number of cyclic shifts increases as the value of $N_{Tx\_Ant}$ increases, the shift amount $N_{ACS}$ between different cyclic shift sequences, that is, the sequence length decreases. A time of the sequence length $N_{ACS}$ needs to be longer than the maximum delay times of multiple paths. If the delay times of multiple paths are longer than the cyclic shift amount $N_{ACS}$, inter-symbol interference between codes using different cyclic shifts occurs.

Example 6 of Pilot Arrangement Pattern

Figure 14:
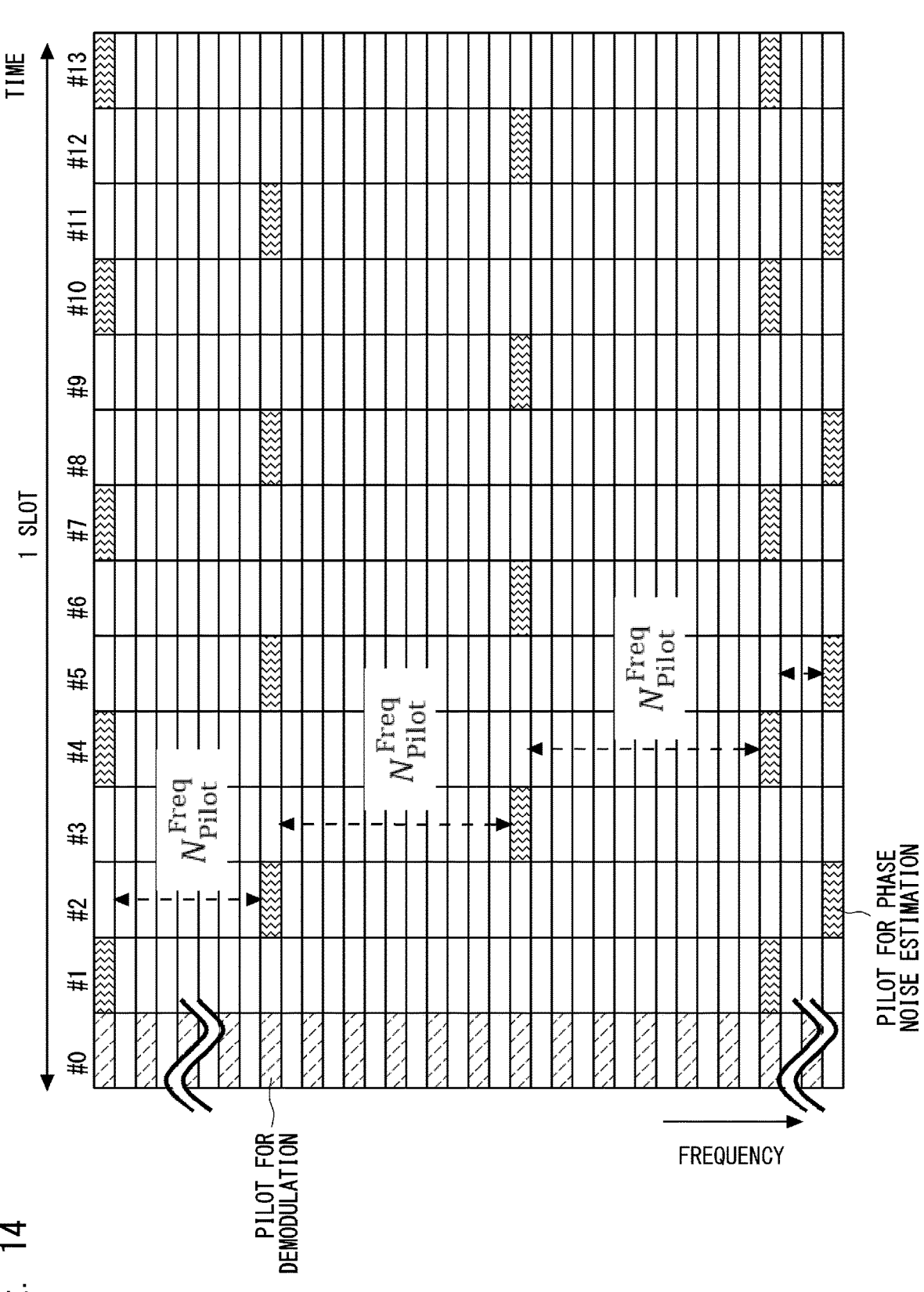
FIG. 14 is a diagram for explaining Example 6 of the pilot arrangement pattern.

FIG. 14 is a diagram for explaining Example 6 of the pilot arrangement pattern. In a pilot arrangement pattern 6 illustrated in FIG. 14, the pilot signals are arranged in a plurality of pilot arrangement subcarriers with the $N_{Pilot\_Freq}$-subcarrier interval among all subcarriers (tones) of the OFDM signal.

In addition, in the pilot arrangement pattern 6 illustrated in FIG. 14, the pilot signals are arranged in a cycle of $N_{Pilot\_Time}$ resource elements in the time domain in the respective pilot arrangement subcarriers.

In addition, in the pilot arrangement pattern 6 illustrated in FIG. 14, the pilot signals are arranged in such a way that the resource elements in which the pilot signals are arranged do not overlap in the time domain in two adjacent pilot arrangement subcarriers. In particular, in the pilot arrangement pattern 6 illustrated in FIG. 14, for a first pilot arrangement subcarrier and a second pilot arrangement subcarrier arranged in the frequency direction among two adjacent pilot arrangement subcarriers, the pilot signals are arranged in such a way that the time domain position of the first resource element in which the pilot is arranged in the second pilot arrangement subcarrier is adjacent to the time domain position of the first resource element in which the pilot is arranged in the first pilot arrangement subcarrier in the time domain. The subcarrier described above may be read as a tone.

Example 7 of Pilot Arrangement Pattern

Figure 15:
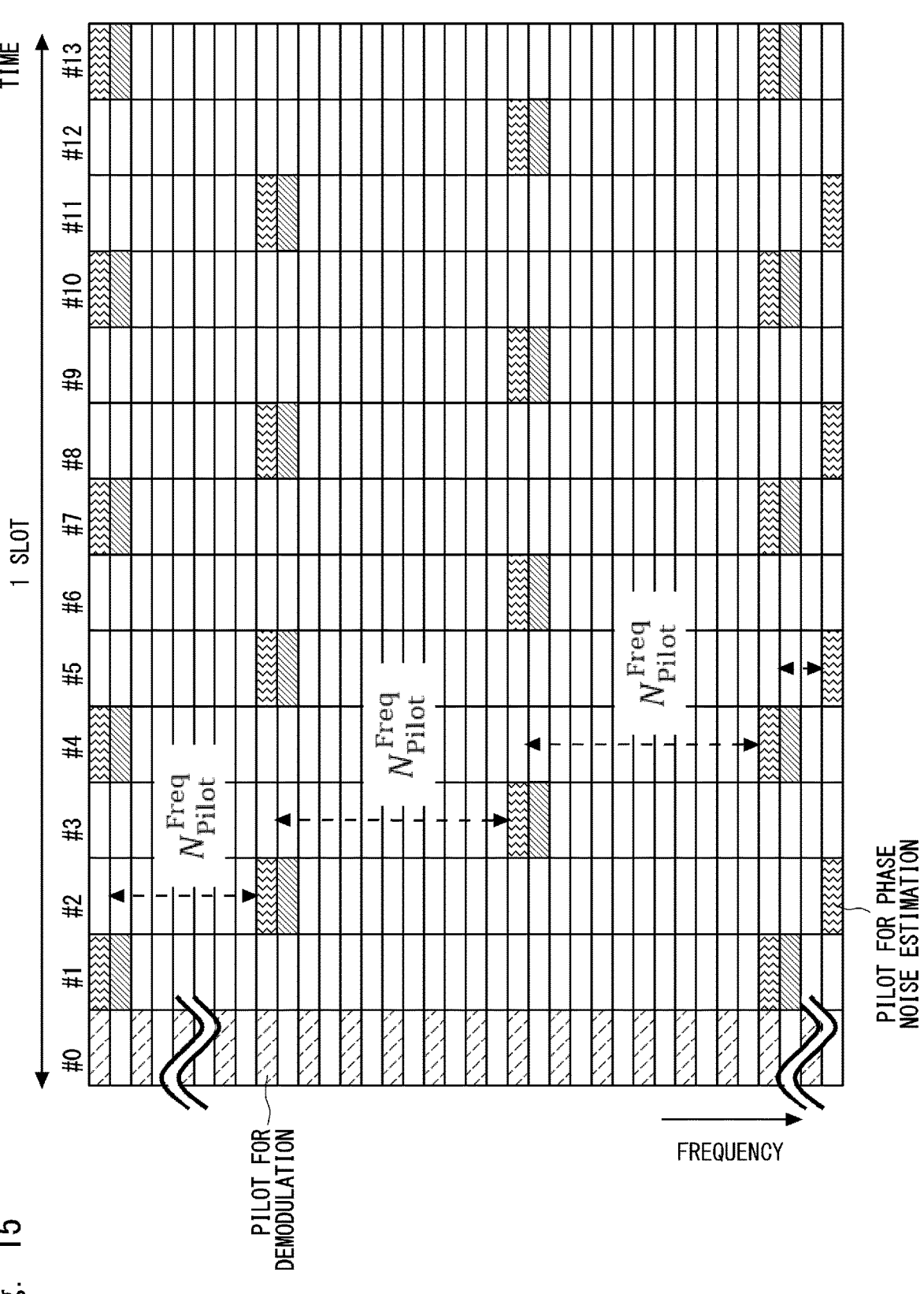
FIG. 15 is a diagram for explaining Example 7 of the pilot arrangement pattern.
Figure 16:
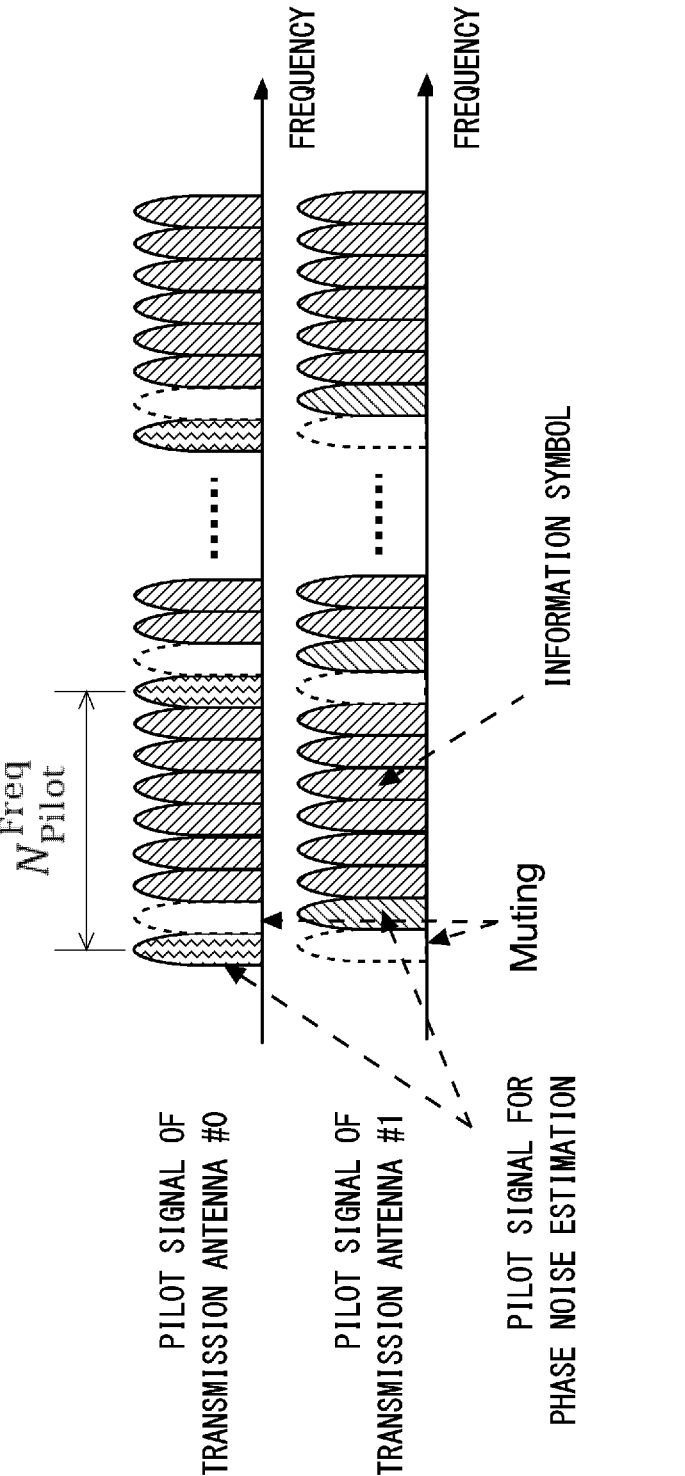
FIG. 16 is a diagram for explaining Example 7 of the pilot arrangement pattern.

FIGS. 15 and 16 are diagrams for explaining Example 7 of the pilot arrangement pattern. A pilot arrangement pattern 7 illustrated in FIGS. 15 and 16 is an example of the pilot arrangement pattern in a case of multi-antenna transmission. That is, it is assumed that the radio transmission device 10 includes $N_{TXAnt}$ (an integer of 2 or more) antennas including the first antenna (transmission antenna #0) and the second antenna (transmission antenna #1). FIGS. 15 and 16 particularly illustrate a case where $N_{TX\_Ant}=2$.

According to the pilot arrangement pattern 7 illustrated in FIGS. 15 and 16, in the OFDM signal transmitted by the first antenna, the pilot signals for phase noise estimation are arranged with the same pattern as the pilot arrangement pattern 6. Further, according to the pilot arrangement pattern 7, in the OFDM signal transmitted by the second antenna, the pilot signals for phase noise estimation are arranged with the same pattern as the pilot arrangement pattern 6 in a plurality of pilot arrangement subcarriers shifted from the plurality of pilot arrangement subcarriers of the pilot arrangement pattern 6 by one subcarrier in the frequency direction. For third and subsequent antennas, it is sufficient if the pilot signals for phase noise estimation are arranged with the same pattern as the pilot arrangement pattern 6 in a plurality of pilot arrangement subcarriers sequentially shifted from a plurality of pilot arrangement subcarriers for the previous antenna by one subcarrier in the frequency direction. That is, according to the pilot arrangement pattern 7 illustrated in FIGS. 15 and 16, the pilot signals of different transmission antennas are orthogonally multiplexed by the FDM. Pilot signals transmitted from $N_{Tx\_Ant}$ (an integer of 2 or more) transmission antennas are orthogonal to each other. Therefore, as illustrated in FIG. 16, in a case where a pilot signal transmitted from one transmission antenna is multiplexed onto a certain resource element, muting is performed in a resource element of an OFDM signal transmitted from another transmission antenna. The subcarrier described above may be read as a tone.

Example 8 of Pilot Arrangement Pattern

Figure 17:
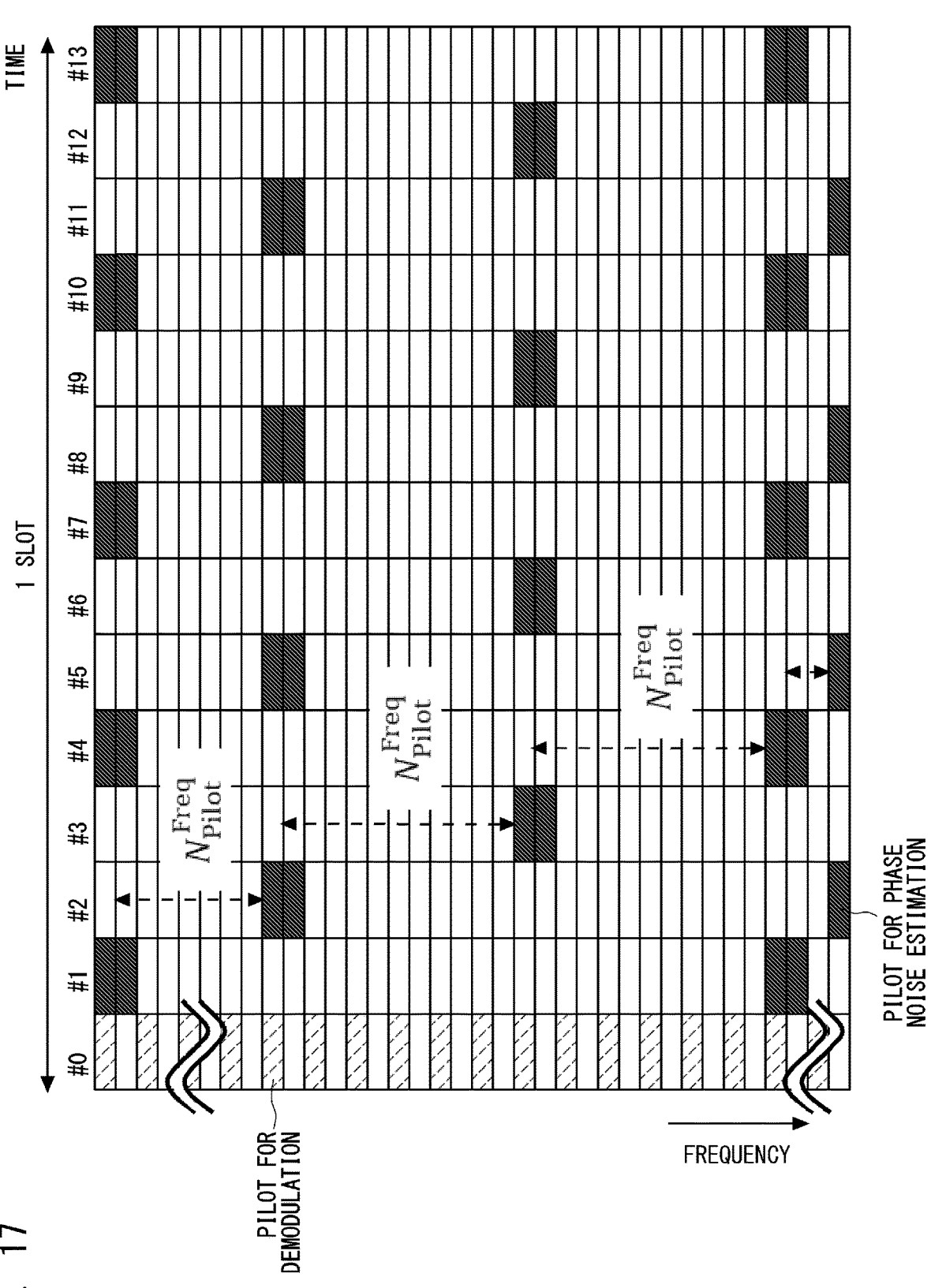
FIG. 17 is a diagram for explaining Example 8 of the pilot arrangement pattern.

FIG. 17 is a diagram for explaining Example 8 of the pilot arrangement pattern. A pilot arrangement pattern 8 illustrated in FIG. 17 is an example of the pilot arrangement pattern in a case of multi-antenna transmission. That is, it is assumed that the radio transmission device 10 includes $N_{TX\_Ant}$ (an integer of 2 or more) antennas including a first antenna and a second antenna. FIG. 17 particularly illustrates a case where $N_{TX\_Ant}=2$. In the pilot arrangement pattern 8 illustrated in FIG. 17, the pilot signals for phase noise estimation are arranged in a plurality of pilot arrangement subcarrier sets each including $N_{Tx\_Ant}$ consecutive subcarriers and an interval between two adjacent sets being $N_{Pilot\_Freq}$ subcarriers among all the subcarriers for the OFDM signal.

Further, according to the pilot arrangement pattern 8 illustrated in FIG. 17, the pilot signals are arranged in a cycle of $N_{Pilot\_Time}$ resource elements in the time domain in each pilot arrangement subcarrier set.

Further, according to the pilot arrangement pattern 8 illustrated in FIG. 17, the pilot signals are arranged in such a way that the resource elements in which the pilot signals are arranged do not overlap in the time domain in two adjacent pilot arrangement subcarrier sets. In particular, in the pilot arrangement pattern 8 illustrated in FIG. 17, the pilot signals are arranged in such a way that the resource elements in which the pilot signals are arranged in respective pilot arrangement subcarriers temporally overlap in each pilot arrangement subcarrier set. Then, for a first pilot arrangement subcarrier set and a second pilot arrangement subcarrier set arranged in the frequency direction among two adjacent pilot arrangement subcarrier sets, the pilot signals are arranged in such a way that the time domain position of the first resource element in which the pilot is arranged in the second pilot arrangement subcarrier set is adjacent to the time domain position of the first resource element in which the pilot is arranged in the first pilot arrangement subcarrier set in the time domain.

The pilot signal transmitted from each transmit antenna is spread and then orthogonally multiplexed by CDM onto $N_{Tx}$ $_{Ant}$ consecutive subcarriers in the frequency domain. That is, the pilot signal output unit 12 may spread the pilot signal transmitted from each transmission antenna and output the spread pilot signal to the OFDM signal forming unit 13. As the orthogonal CDM method, the above-described two methods in the description of Example 5 of the pilot arrangement pattern can be used.

Second Example Embodiment

Figure 18:
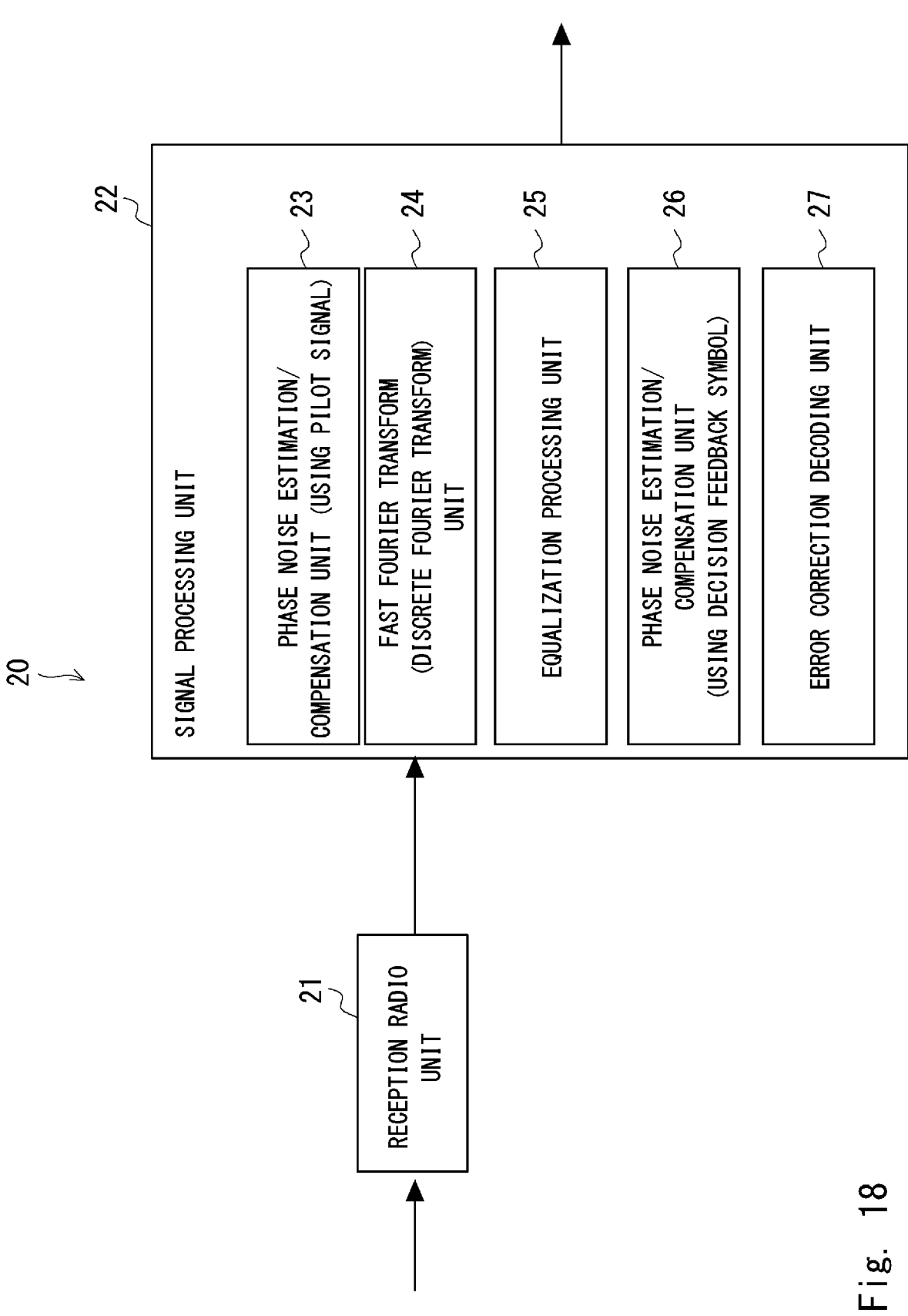
FIG. 18 is a diagram illustrating an example of a basic configuration of a radio reception device according to a second example embodiment.

A second example embodiment relates to an example of a radio reception device.
<Example of Basic Configuration of Radio Reception Device>
FIG. 18 is a diagram illustrating an example of a basic configuration of the radio reception device according to the second example embodiment. In FIG. 18, a radio reception device 20 includes a reception radio unit 21 and a signal processing unit 22. The signal processing unit 22 includes a phase noise estimation/compensation unit 23 using a pilot symbol, a fast Fourier transform (discrete Fourier transform) unit 24, an equalization processing unit 25, a phase noise estimation/compensation unit 26 using a decision feedback symbol, and an error correction decoding unit 27.

The reception radio unit 21 outputs a received signal (a time-domain OFDM signal) obtained by executing radio reception processing (down conversion, analog/digital conversion, or the like) on a radio signal received via an antenna (not illustrated) of the radio reception device 20 to the signal processing unit 22.

The phase noise estimation/compensation unit 23 receives the received signal (the time-domain OFDM signal) from the reception radio unit 21, and estimates and compensates for a phase noise of the received signal by using the pilot signal.

The fast Fourier transform (discrete Fourier transform) unit 24 converts the time-domain signal subjected to phase noise compensation into a frequency-domain signal.

The equalization processing unit 25 estimates a channel response of each subcarrier signal for the frequency-domain signal and executes equalization processing for compensating for variations in phase and amplitude of a propagation path. In a case of the OFDM, the equalization processing unit 25 can be implemented by a one-tap equalizer per subcarrier. That is, the equalization processing unit 25 can be implemented by a coherent detector/demodulator. Further, the equalization processing unit 25 demaps an equalized symbol and reproduces a hard decision bit before error correction decoding. The equalization processing unit 25 generates reliability information of each bit from the equalized symbol after phase noise compensation of the repetitive processing.

The phase noise estimation/compensation unit 26 remaps the hard decision bit to generate a symbol, multiplies the symbol by the estimated value of the channel response, and then converts the symbol into a time-domain signal by IFFT. Furthermore, the phase noise estimation/compensation unit 26 estimates and compensates for a residual phase noise from the received signal and the above-described time-domain signal. Therefore, the phase noise estimation/compensation unit 26 using the decision feedback symbol includes IFFT that converts the frequency-domain signal into the time-domain signal.

The error correction decoding unit 27 receives the reliability information of each bit from the equalized symbol after the phase noise compensation of the repetitive processing, and performs error correction decoding.

Figure 19:
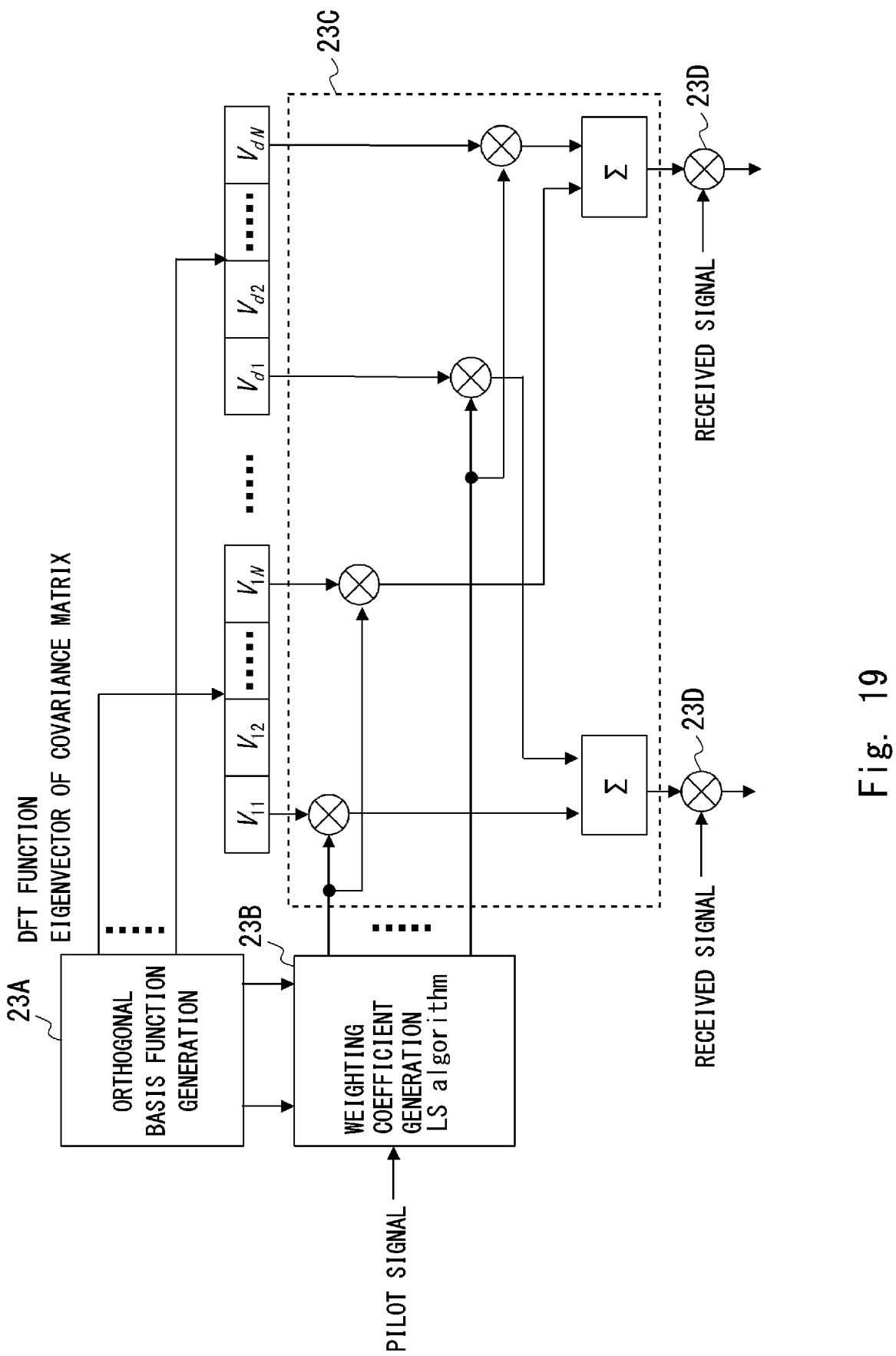
FIG. 19 is a block diagram illustrating an example of a phase noise estimation/compensation unit using a pilot symbol.

FIG. 19 is a block diagram illustrating an example of the phase noise estimation/compensation unit using the pilot symbol. In FIG. 19, the phase noise estimation/compensation unit 23 includes an orthogonal basis function generation unit (output unit) 23A, a weighting coefficient generation unit (weight generation unit) 23B, a phase noise calculation unit 23C, and a multiplication unit 23D.

The number of samples in the OFDM symbol section in the time domain is represented by $N_{FFT}$. Then, a phase noise at each sample position is expressed by the following formula. In this formula, T represents transposition.

$$e^{j\varphi} = \left[ e^{j\varphi_0}, e^{j\varphi_1} \ldots , e^{j\varphi_{N_{FFT}-1}} \right]^T \qquad \text{[Mathematical Formula 5]}$$

A case where discrete cosine transform (DCT) is used for basis functions will be described. In a case where D basis functions of the length of $N_{FFT}$ are expressed as $$v_0, v_1, \ldots, v_{D-1}, \qquad \text{[Mathematical Formula 6]}$$

the DCT is expressed by the following Formula (3).

[Mathematical Formula 7]

$$v_{l,i} = \cos\frac{\pi l}{N} i \qquad (3)$$

In Formula (3), $0 \leq l \leq N_{FFT}$ and $0 \leq i < D$.

For $V^{(D)} = [v_0, v_1, \ldots, v_{D-1}]$, a weighting coefficient $\gamma$ $(= [\gamma_0, \gamma_1, \ldots, \gamma_{D-1}]^T)$ is defined in such a way as to satisfy the following Formula (4).

[Mathematical Formula 8]

$$e^{-j\varphi} = V^{(D)}\gamma \qquad (4)$$

The weighting coefficient $\gamma$ can be obtained by the following Formula (5) according to the minimum mean square error (MMSE) (least squares (LS)) standard.

[Mathematical Formula 9]

$$\hat{\gamma} = \underset{\gamma}{\text{argmin}} \left\| e^{-j\varphi} - V^{(D)}\gamma \right\|^2 \qquad (5)$$

For example, the weighting coefficient $\gamma$ is estimated using the pilot symbols continuously multiplexed in the time domain. For example, the pilot signals arranged in the plurality of first pilot arrangement subcarriers with the $N_{Pilot\_SPA}$-subcarrier interval described in Example 1 of the pilot arrangement pattern and the like described above may be used for the estimation of the weighting coefficient $\gamma$. Further, in Example 6 of the pilot arrangement pattern and the like described above, the subcarrier in which the pilot signal for phase noise estimation is arranged differs depending on the OFDM symbol, but the pilot signal for phase noise estimation is arranged in any OFDM symbol. Therefore, the pilot signals are continuously multiplexed in the time domain with respect to all of the plurality of subcarriers. Therefore, for example, for Example 6 of the pilot arrangement pattern and the like described above, these pilot signals can be used for the weighting coefficient $\gamma$.

A matrix W is defined by the following Formula (6).

[Mathematical Formula 10]

$$W = \Lambda^{-1} \cdot F_{N_{FFT}} \cdot Z \cdot V^{(D)} \tag{6}$$

The number of rows of the matrix W corresponds to the number of subcarriers corresponding to the number of FFT samples, and the number of columns corresponds to the number of basis functions. Furthermore, $\Lambda$ represents a diagonal matrix having a channel coefficient corresponding to each subcarrier position as a diagonal component.

$$F_{N_{FFT}} \qquad \text{[Mathematical Formula 11]}$$

represents a DFT matrix. Further, Z represents a diagonal matrix in which a sample value of the received signal is mapped to the diagonal component.

$$\hat{\gamma} \qquad \text{[Mathematical Formula 12]}$$

which is the estimated value of the weighting coefficient $\gamma$ according to Formula (5) can be obtained by the following Formula (7) based on an LS algorithm.

[Mathematical Formula 13]

$$\hat{\gamma} = (W_P{}^H W_P)^{-1} W_P{}^H s_P \tag{7}$$

In Formula (7), $W_P$ represents a matrix obtained by extracting, from W, a row corresponding to a subcarrier position where a transmission pilot symbol $s_P$ subjected to FDM is multiplexed. Further, a superscript symbol $(\bullet)^H$ represents complex conjugate transposition. $(\bullet)^{-1}$ represents an inverse matrix.

The weighting coefficient generation unit 23B calculates the estimated value of the weighting coefficient $\gamma$ according to, for example, Formula (7) by using a pilot signal extracted by a pilot signal extraction unit 41.

The phase noise calculation unit 23C calculates an estimated value $e^{-j\Phi}$ of the phase noise according to Formula (4) by using the estimated value of the weighting coefficient $\gamma$ calculated by the weighting coefficient generation unit 23B and the basis function generated by the orthogonal basis function generation unit 23A. The estimated value $e^{-j\Phi}$ of the phase noise is calculated in units of samples and output to the multiplication unit 23D.

The multiplication unit 23D compensates for the phase noise by multiplying the received signal by the estimated value $e^{-j\Phi}$ of the phase noise in units of samples.

An eigenvector of a covariance matrix of the phase noise can also be used as the basis function. The complex representation of the phase noise is defined by $\psi(t) = e^{j\Phi(t)}$. A covariance $r_\psi(\tau)$ of $\psi(t)$ can be calculated by the following formula.

$$r_\psi(\tau) = E[\psi(t)\psi^*(t-\tau)] \qquad \text{[Mathematical Formula 14]}$$

Discrete $\psi(t)$ in a case where the number of samples (or symbols in the single-carrier symbol block) of the OFDM symbol is $N_{FFT}$ is expressed by the following formula.

$$\psi = [\psi_1, \psi_2, \ldots, \psi_{N_{FFT}}]^T \qquad \text{[Mathematical Formula 15]}$$

Here, the following formula in which $T_s$ represents a sampling interval is established.

$$\psi_m = \psi(mT_s) \qquad \text{[Mathematical Formula 16]}$$

The covariance matrix of the phase noise is defined by the following Formula (8).

[Mathematical Formula 17]

$$R_{\psi\psi} = \begin{bmatrix} E[\psi_1\psi_1^*] & \ldots & E[\psi_1\psi_{N_{FFT}}^*] \\ \ldots & \ldots & \ldots \\ E[\psi_{N_{FFT}}\psi_1^*] & \ldots & E[\psi_{N_{FFT}}\psi_{N_{FFT}}^*] \end{bmatrix} \tag{8}$$

The covariance matrix is estimated using a pilot signal whose modulation phase and modulation amplitude are known. The covariance matrix of Formula (8) is subjected to eigenvalue decomposition (singular value decomposition) as shown in the following Formula (9).

[Mathematical Formula 18]

$$R_{\psi\psi} = \Sigma_{i=0}^{N_{FFT}-1} \mu_i u_i u_i^* \tag{9}$$

In Formula (9), $$\mu_0, \mu_1, \ldots, \mu_{N_{FFT}-1} \qquad \text{[Mathematical Formula 19]}$$

is an eigenvalue.

$$u_0, u_1, \ldots, u_{N_{FFT}-1} \qquad \text{[Mathematical Formula 20]}$$

is an eigenvector.

It is sufficient if these eigenvectors are used as the basis functions.

As described above, since the calculation of the weighting coefficient $\gamma$ of Formula (7) is performed in units of samples of the OFDM symbol and the phase noise is estimated by Formula (4), the same processing is executed in units of symbols of the single-carrier symbol block, so that the method can be directly applied to a case of the single carrier.

<Configuration Example of Radio Reception Device>

Figure 20:
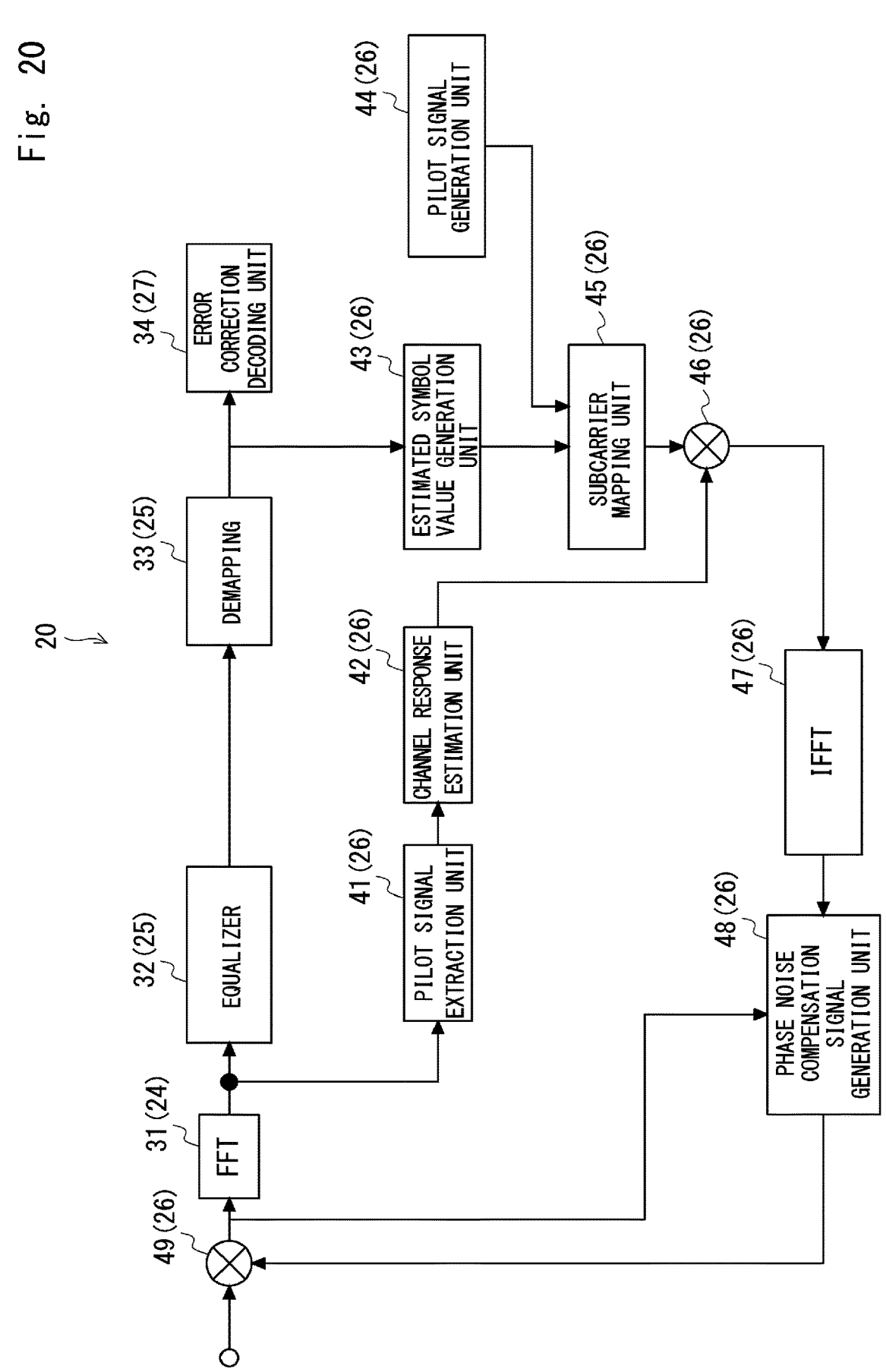
FIG. 20 is a block diagram illustrating an example of a radio reception device according to the second example embodiment.

FIG. 20 is a block diagram illustrating an example of the radio reception device according to the second example embodiment. In FIG. 20, the radio reception device 20 includes an FFT unit 31, an equalizer (coherent detector) 32, a demapping unit 33, and an error correction decoding unit 34. In addition, the radio reception device 20 includes the pilot signal extraction unit 41, a channel response estimation unit 42, an estimated symbol value generation unit 43, a pilot symbol generation unit 44, a subcarrier mapping unit 45, a multiplication unit 46, an IFFT unit 47, a phase noise compensation signal generation unit 48, and a multiplication unit 49. The FFT unit 31 corresponds to the fast Fourier transform (discrete Fourier transform) unit 24 described above. The equalizer (coherent detector) 32 and the demapping unit 33 correspond to the equalization processing unit 25 described above. The error correction decoding unit 34 corresponds to the error correction decoding unit 27. In addition, the pilot signal extraction unit 41, the channel response estimation unit 42, the estimated symbol value generation unit 43, the pilot symbol generation unit 44, the subcarrier mapping unit 45, the multiplication unit 46, the IFFT unit 47, the phase noise compensation signal generation unit 48, and the multiplication unit 49 correspond to the phase noise estimation/compensation unit 26 described above.

The FFT unit 31 receives the received signal (the time-domain OFDM signal (which may also hereinafter be referred to as a "first time-domain signal")) subjected to phase noise compensation by the phase noise estimation/compensation unit 23 using the pilot symbol, and converts the received first time-domain signal into the frequency-domain signal.

Here, a case where the radio transmission device 10 generates the OFDM signal by blocking the information symbols corresponding to the number of stages of the FFT unit 31 will be considered. An information symbol $s_k$ is subjected to IFFT processing to generate an OFDM signal $d_n$ ($0 \leq k$, and $n \leq N_{FFT}-1$). $d_n$ is expressed by the following Formula (10).

[Mathematical Formula 21]

$$d_n = \frac{1}{\sqrt{N_{FFT}}} \sum_{k=0}^{N_{FFT}-1} S_k \exp\left(\frac{j2\pi kn}{N_{FFT}}\right) \tag{10}$$

At this time, a received signal $r_n$ at a sample timing n in an FFT block is expressed by the following Formula (11).

[Mathematical Formula 22]

$$r_n = e^{j\Phi_n}\Sigma_{l=0}^{L-1}h_l d_{n-l} + w_n \tag{11}$$

In Formula (11), $h_l$ represents a channel impulse response in a path 1 ($0 \leq l \leq L-1$). Further, $W_n$ represents an additive white Gaussian noise (AWGN) component. $\Phi_n$ represents a residual phase noise. In Formula (11), a term of an information symbol subjected to multipath fading in $r_n$ is represented by $y_n$. That is, $y_n$ is expressed by the following formula.

[Mathematical Formula 23]

$$y_n = \sum_{l=0}^{L-1} h_l d_{n-l}$$

The FFT unit 31 converts the received signal $r_n$ into a frequency-domain signal $R_k$ by FFT. $R_k$ is expressed by the following Formula (12).

[Mathematical Formula 24]

$$R_k = \Sigma_{l=0}^{N_{FFT}-1}H_l S_l p_{k-l} + W_k \tag{12}$$

In Formula (12), $H_k$, $p_k$, and $W_k$ are the FFT transforms of $h_n$, $e^{j\Phi_n}$, and $w_n$, respectively. As shown in Formulas (11) and (12), a phase noise that causes a random phase rotation in the time domain is represented by a convolution of inter-subcarrier interference (ICI) in the frequency domain.

The pilot signal extraction unit 41 extracts the pilot signal included in the frequency-domain signal obtained by the FFT unit 31.

In a case of the OFDM, the equalizer 32 includes a one-tap equalizer and performs coherent detection/demodulation. The channel response at each subcarrier position is estimated using a demodulation pilot signal multiplexed at the OFDM symbol position at the head of the slot. Alternatively, in addition to the demodulation pilot signal multiplexed at the OFDM symbol position at the head of the slot, a pilot signal multiplexed between information symbols may be used.

The demapping unit 33 demaps each symbol of a symbol sequence after the coherent detection, and reproduces a transmitted bit. In a case of the use for phase noise estimation and compensation, the demapping unit 33 generates a hard decision bit. The demapping unit 33 generates a log-likelihood ratio (LLR) that is a logarithmic value of a ratio of probabilities that each bit is "1" or "0 (−1)" for the error correction decoding unit 35.

In a case where the receiver uses antenna diversity reception, output signals of the plurality of antennas, the reception radio unit, and the equalizer (coherent detector) are added independently for an in-phase component and a quadrature component.

The error correction decoding unit 34 inputs the log-likelihood ratio (LLR) generated by the demapping unit 33, the LLR being a logarithmic value of a ratio of probabilities that each bit is "1" or "0 (−1)", executes error correction decoding processing, and outputs an obtained decoded bit.

The estimated symbol value generation unit 43 maps the hard decision bit of the transmitted bit to generate $$\hat{s}_k^{(i)} \qquad \text{[Mathematical Formula 25]}$$

which is the estimated value of the information symbol. Here, the superscript index i represents the repeated loop count.

The subcarrier mapping unit 45 maps the estimated value of the information symbol obtained by the estimated symbol value generation unit 43 and the pilot symbol generated by the pilot symbol generation unit 44 to subcarriers. A pilot symbol sequence is known in a base station device, and the pilot symbol sequence is known in advance in a user terminal or is notified in advance by the base station on a control channel.

The channel response estimation unit 42 estimates $$\hat{H}_k \qquad \text{[Mathematical Formula 26]}$$

which is an estimated value of a channel response in a subcarrier k.

The multiplication unit 46 multiplies the estimated value of the information symbol generated by the estimated symbol value generation unit 43 and mapped to the subcarrier k by the estimated value of the channel response in the subcarrier k as in the following formula. The multiplication result obtained by the multiplication unit 46 can be referred to as a "received signal replica" in the frequency domain.

$$\hat{H}_k \hat{s}_k^{(i)} \qquad \text{[Mathematical Formula 27]}$$

The IFFT unit 47 performs IFFT on the received signal replica in the frequency domain and converts the received signal replica into $$\hat{y}_n^{(i)} \qquad \text{[Mathematical Formula 28]}$$

which is a received signal replica in the time domain (which may also hereinafter be referred to as a "second time-domain signal").

The phase noise compensation signal generation unit 48 estimates the phase noise by using the received signal and the received signal replica in the time domain (the above-described "second time-domain signal"), and outputs a phase noise compensation signal that is inverse to the estimated phase noise.

For example, $$\hat{z}_n^{(i)} \qquad \text{[Mathematical Formula 29]}$$

which is a signal after decision feedback for the loop count i is expressed by the following Formula (13).

[Mathematical Formula 30]

$$\hat{z}_n^{(i)} = \frac{r_n}{\hat{y}_n^{(i)}} = \frac{y_n}{\hat{y}_n^{(i)}}e^{j\phi_n^{(i)}} + \frac{w_n}{\hat{y}_n^{(i)}} \approx e^{j\phi_k^{(i)}} + \frac{w_n}{\hat{y}_n^{(i)}} \tag{13}$$

As shown in Formula (13), in a case where there are few decoding errors of $$\hat{y}_n^{(i)},$$ [Mathematical Formula 31]

$$\frac{y_n}{\hat{y}_n^{(i)}} \simeq 1.$$ [Mathematical Formula 32]

As shown in Formula (13), $$\hat{z}_n^{(i)}$$ [Mathematical Formula 33]

contains a noise (AWGN) component, and thus the noise component is reduced by averaging processing. From a signal $$\hat{z}_n^{(i)}$$ [Mathematical Formula 34]

for the loop count i obtained by Formula (13), $$\hat{\varphi}_n^{(i)}$$ [Mathematical Formula 35]

which is an estimated value of a phase noise is obtained using the following Formula (14).

[Mathematical Formula 36]

$$\hat{\varphi}_n^{(i)} = \arg \hat{z}_n^{(i)} = \tan^{-1}\left(\frac{\mathrm{Im}\left[\hat{z}_n^{(i)}\right]}{\mathrm{Re}\left[\hat{z}_n^{(i)}\right]}\right) \qquad (14)$$

Since $$\hat{\varphi}_n^{(i)}$$ [Mathematical Formula 37]

which is a phase noise at each sample timing of Formula (13) contains a noise component other than the phase noise, it is necessary to suppress the noise component by averaging values of the phase noise at a plurality of sample timings. On the other hand, when an averaging window width is increased, followability of the phase noise is deteriorated.

The phase noise at each sample timing after averaging is represented by $$\overline{\varphi}_n^{(i)}$$ [Mathematical Formula 38]

$$\overline{\varphi}_n^{(i)}$$ [Mathematical Formula 39]

$$\exp(-j\overline{\varphi}_n^{(i)})$$ [Mathematical Formula 40]

which is a compensation value for the phase noise at each sample timing is calculated by the phase noise compensation signal generation unit 48 and output to the multiplication unit 49.

The multiplication unit 49 multiplies the compensation value for the phase noise at each sample timing by $$\hat{r}_n^{(i)}$$ [Mathematical Formula 41]

which is the received signal including a residual phase noise to compensate for the residual phase noise. The above processing is repeated a predetermined number of times. The number of repetitions may be set in advance. Alternatively, the residual phase noise may be measured, and in a case where the residual phase noise becomes smaller than a preset value, the repetitive processing may be terminated.

Third Example Embodiment

A third example embodiment relates to another example of the radio reception device. Specifically, in the second example embodiment, the estimated symbol value is generated by the hard decision bit obtained by demapping the signal before the error correction decoding (before decoding of channel coding), whereas in the third example embodiment, an estimated symbol number value is generated from a bit after error correction decoding. A basic configuration of the radio reception device according to the third example embodiment is the same as the basic configuration of the radio reception device 20 according to the second example embodiment.

Figure 21:
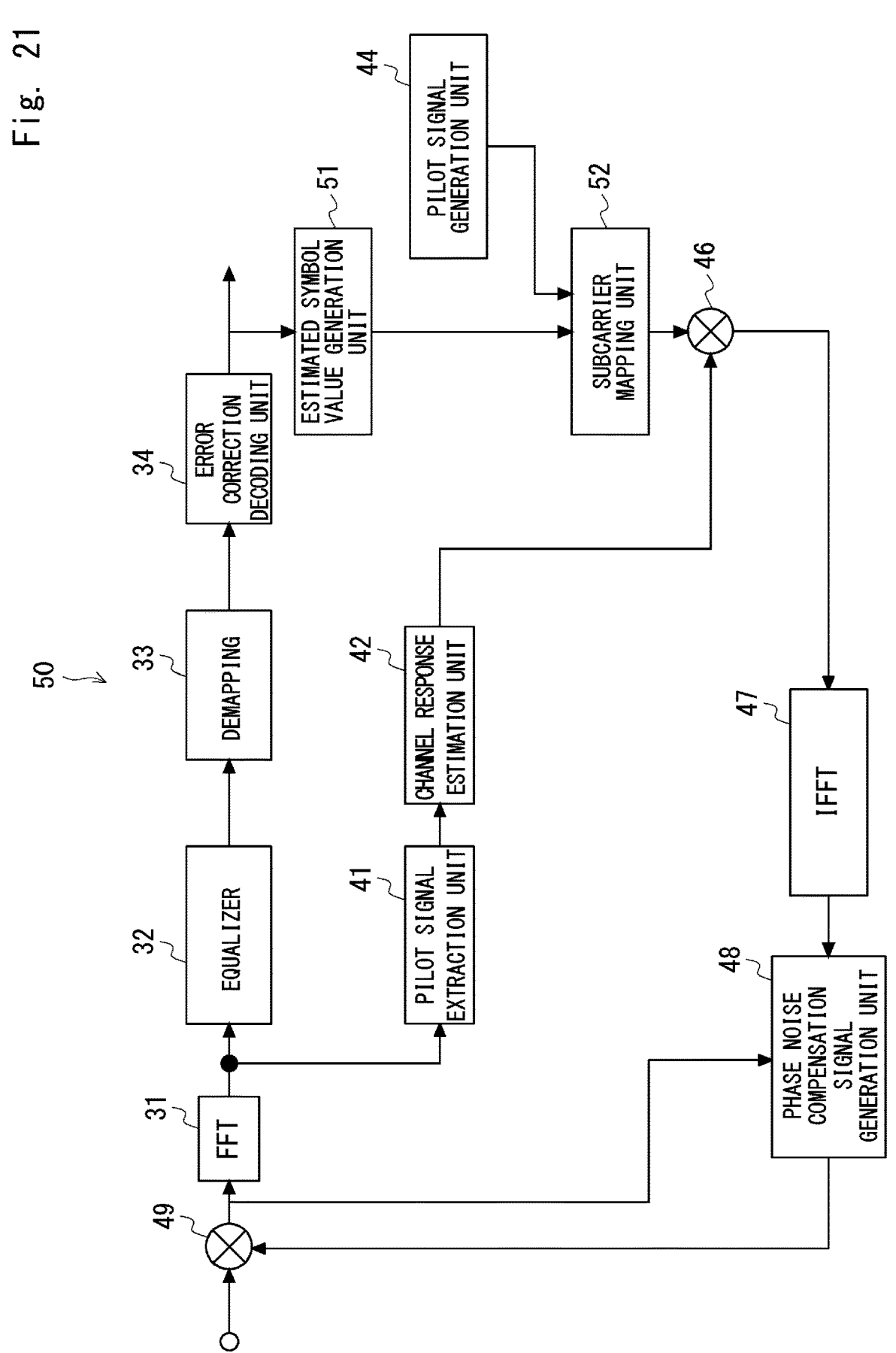
FIG. 21 is a block diagram illustrating an example of a radio reception device according to a third example embodiment.

FIG. 21 is a block diagram illustrating an example of the radio reception device according to the third example embodiment. In FIG. 21, a radio reception device 50 includes an FFT unit 31, an equalizer (coherent detector) 32, a demapping unit 33, and an error correction decoding unit 34. In addition, the radio reception device 50 includes a pilot signal extraction unit 41, a channel response estimation unit 42, an estimated symbol value generation unit 51, a pilot symbol generation unit 44, a subcarrier mapping unit 52, a multiplication unit 46, an IFFT unit 47, a phase noise compensation signal generation unit 48, and a multiplication unit 49. The FFT unit 31 corresponds to the fast Fourier transform (discrete Fourier transform) unit 24 described above. The equalizer (coherent detector) 32 and the demapping unit 33 correspond to the equalization processing unit 25 described above. The error correction decoding unit 34 corresponds to the error correction decoding unit 27. In addition, the pilot signal extraction unit 41, the channel response estimation unit 42, the estimated symbol value generation unit 51, a subcarrier mapping unit 52, the pilot symbol generation unit 44, the multiplication unit 46, the IFFT unit 47, the phase noise compensation signal generation unit 48, and the multiplication unit 49 correspond to the phase noise estimation/compensation unit 26 described above.

The demapping unit 33 in the radio reception device 50 demaps information symbols included in a time-domain signal after equalization processing, and calculates a log-likelihood ratio (LLR) that is a logarithmic value of a ratio of probabilities that each bit in each symbol is "1" or "0 (−1)".

The error correction decoding unit 34 in the radio reception device 50 inputs the reliability information (LLR) of each bit in each symbol obtained by the demapping unit 33 and executes error correction decoding processing. Then, the error correction decoding unit 34 outputs the obtained decoded bit.

For example, the error correction decoding unit 34 deinterleaves the log-likelihood ratio of each bit, inputs the deinterleaved log-likelihood ratio, executes the error correction decoding processing, and performs hard decision on the log-likelihood ratio of each bit with improved reliability to reproduce a transmitted bit. Alternatively, the probability that each bit is "1" or "0 (−1)" is calculated from the LLR of each bit output from an error correction decoder. Assuming that each bit of each symbol (signal point) of signal space arrangement is independent, the probability of the symbol is calculated from the probability that each bit is "1" or "0 (−1)". A soft decision symbol generated in this manner can also be used.

The estimated symbol value generation unit 51 generates an estimated value of the information symbol by mapping the hard decision bit of the transmitted bit reproduced by the error correction decoding unit 34.

The subcarrier mapping unit 52 maps the estimated value of the information symbol obtained by the estimated symbol value generation unit 51 and the pilot symbol generated by the pilot symbol generation unit 44 to subcarriers.

The multiplication unit 46 multiplies the estimated value of the information symbol generated by the estimated symbol value generation unit 51 and mapped to a subcarrier k by the estimated value of the channel response in the subcarrier k.

Fourth Example Embodiment

A fourth example embodiment relates to another example of the radio reception device. In particular, the fourth example embodiment relates to a configuration corresponding to the single-carrier DFT-spread OFDM. That is, the radio reception device according to the fourth example embodiment has a configuration corresponding to the single-carrier DFT-spread OFDM unlike the configuration of the radio reception device 20 corresponding to the multi-carrier OFDM according to the second example embodiment. A basic configuration of the radio reception device according to the fourth example embodiment is the same as the basic configuration of the radio reception device 20 according to the second example embodiment.

Figure 22:
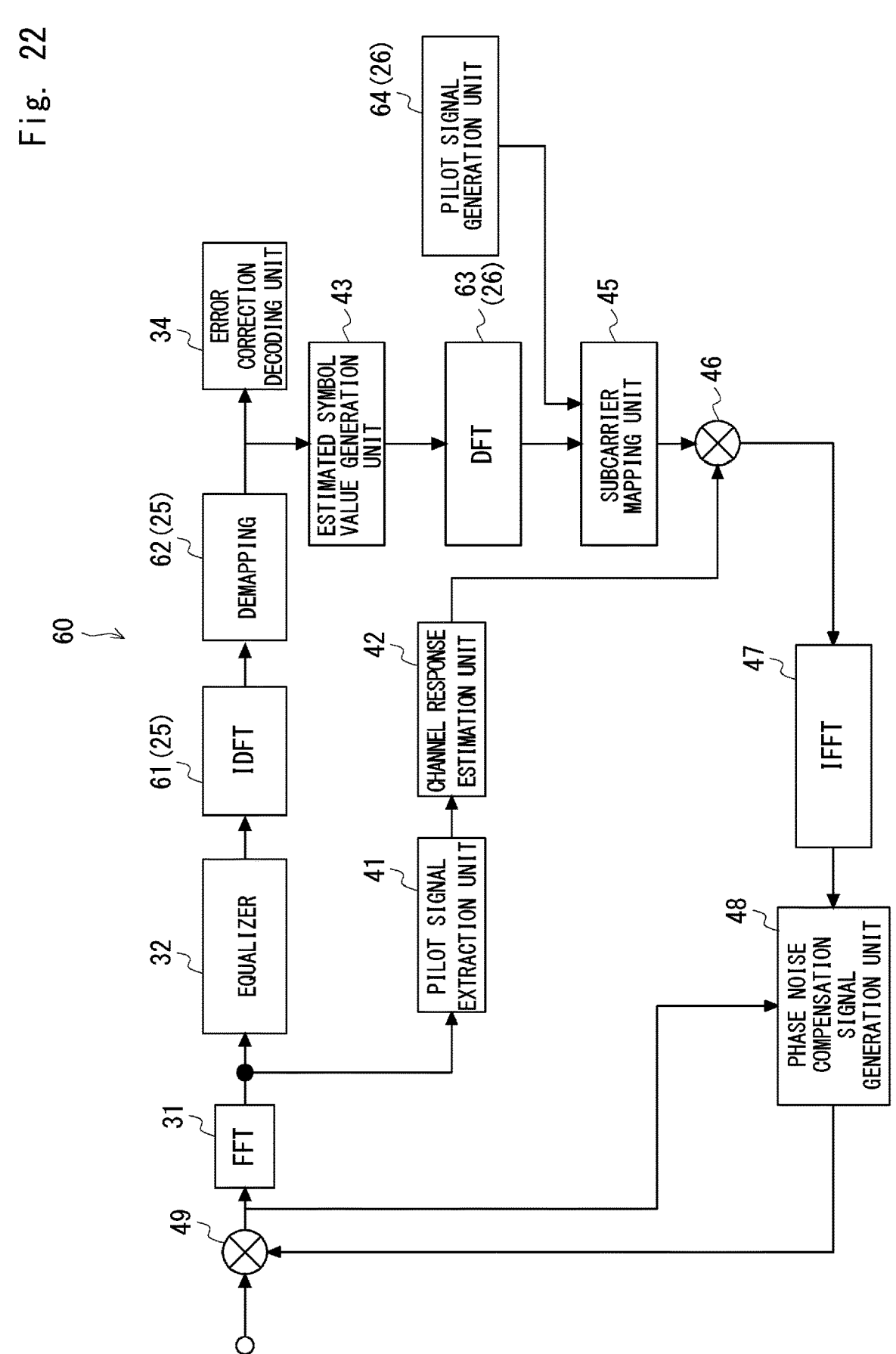
FIG. 22 is a block diagram illustrating an example of a radio reception device according to a fourth example embodiment.

FIG. 22 is a block diagram illustrating an example of the radio reception device according to the fourth example embodiment. In FIG. 22, a radio reception device 60 includes an FFT unit 31, an equalizer 32, an IDFT unit 61, a demapping unit 62, and an error correction decoding unit 34. In addition, the radio reception device 60 includes a pilot signal extraction unit 41, a channel response estimation unit 42, an estimated symbol value generation unit 43, a DFT unit 63, a pilot signal generation unit 64, a subcarrier mapping unit 45, a multiplication unit 46, an IFFT unit 47, a phase noise compensation signal generation unit 48, and a multiplication unit 49. The FFT unit 31 corresponds to the fast Fourier transform (discrete Fourier transform) unit 24 described above. The equalizer 32, the IDFT unit 61, and the demapping unit 62 correspond to the equalization processing unit 25 described above. The error correction decoding unit 34 corresponds to the error correction decoding unit 27. The pilot signal extraction unit 41, the channel response estimation unit 42, the estimated symbol value generation unit 43, the DFT unit 63, the pilot signal generation unit 64, the subcarrier mapping unit 45, the multiplication unit 46, the IFFT unit 47, the phase noise compensation signal generation unit 48, and the multiplication unit 49 correspond to the phase noise estimation/compensation unit 26 described above.

The equalizer 32 in the radio reception device 60 performs waveform equalization on a frequency-domain signal obtained by the FFT unit 31. Usually, an equalization weighting coefficient based on a minimum mean square error (MMSE) algorithm is used.

The IDFT unit 61 converts the frequency-domain signal after equalization into a time-domain signal.

The demapping unit 62 demaps each symbol of an information symbol sequence and reproduces a transmitted bit. In a case of the use for phase noise estimation and compensation, the demapping unit 62 generates a hard decision bit. The demapping unit 62 generates a log-likelihood ratio (LLR) that is a logarithmic value of a ratio of probabilities that each bit is "1" or "0 (−1)" for the error correction decoding unit 34. In a case where the receiver uses antenna diversity reception, output signals of the plurality of antennas, the reception radio unit, and the equalizer (coherent detector) are added independently for an in-phase component and a quadrature component.

The estimated symbol value generation unit 43 maps the hard decision bit of the transmitted bit to generate an estimated value of an information symbol.

The DFT unit 63 converts a plurality of estimated information symbol values generated by the estimated symbol value generation unit 43 into a frequency-domain signal.

The subcarrier mapping unit 45 maps the frequency-domain signal obtained by the DFT unit 63 to a tone. Further, the subcarrier mapping unit 45 multiplexes a pilot signal generated by the pilot signal generation unit 64 to a tone position between tones of the information symbols.

The pilot signal extraction unit 41 extracts the pilot signal included in the frequency-domain signal obtained by the FFT unit 31.

Figure 23:
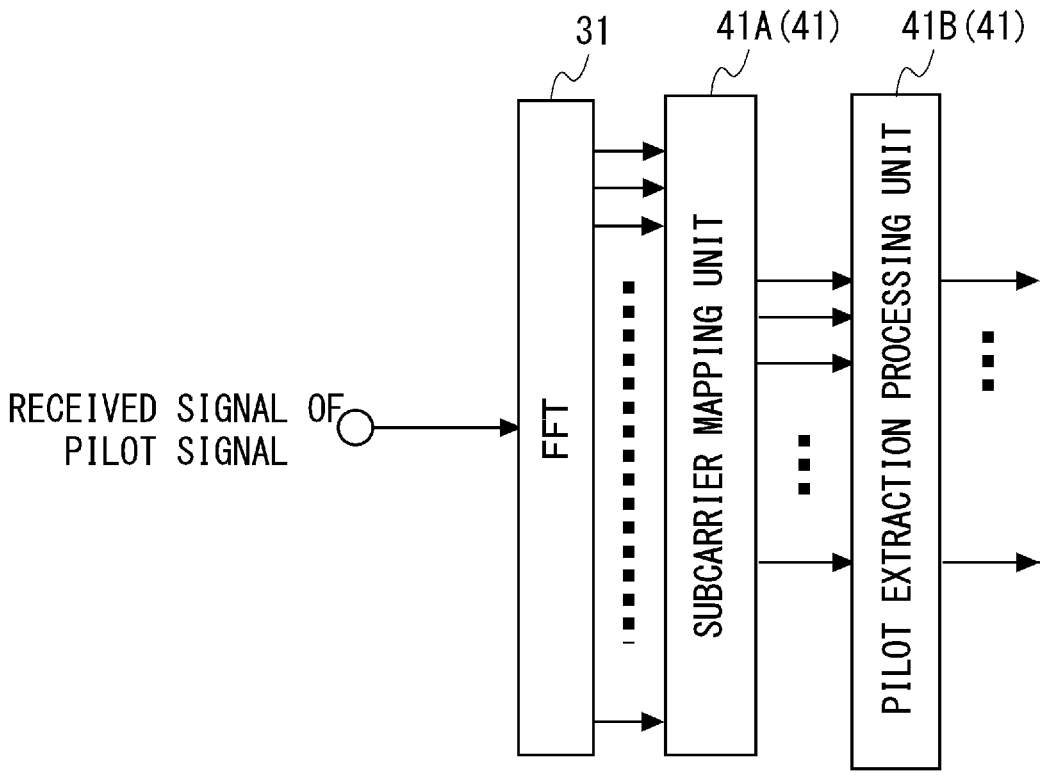
FIG. 23 is a block diagram illustrating an example of a pilot signal extraction unit.
Figure 24:
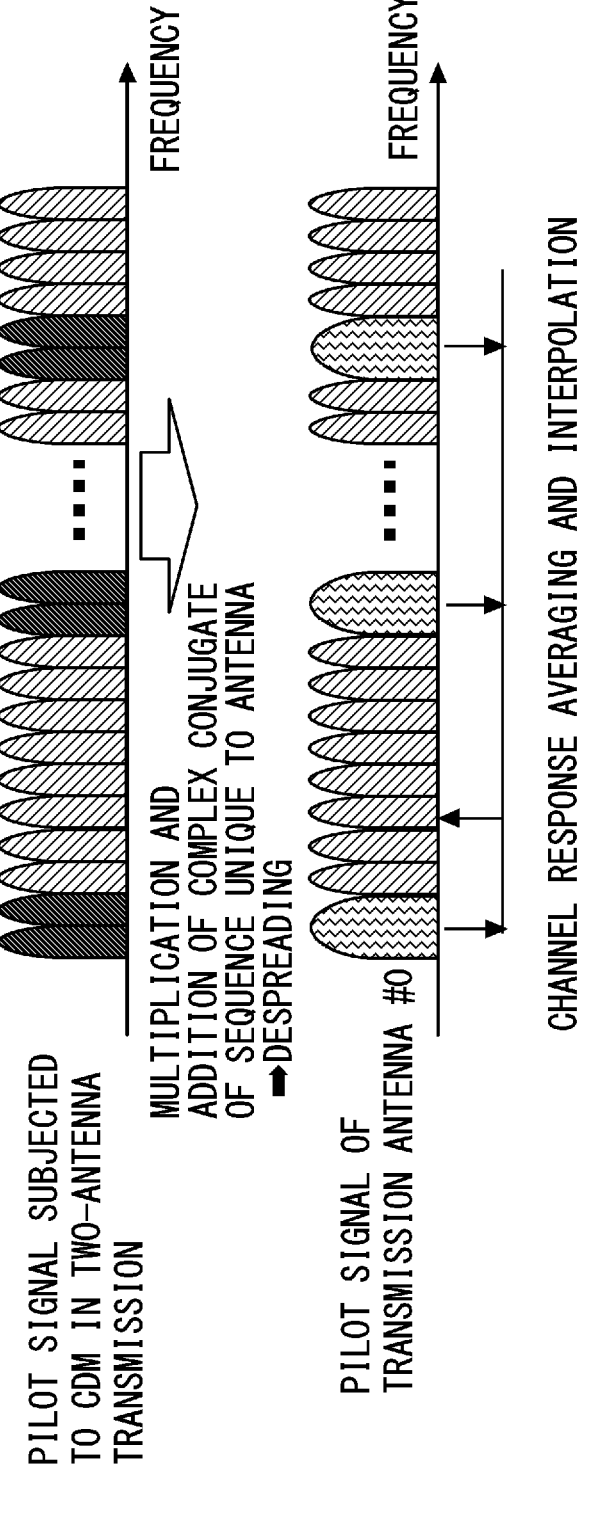
FIG. 24 is a diagram for explaining an example of a processing operation of the pilot signal extraction unit.

FIG. 23 is a block diagram illustrating an example of the pilot signal extraction unit. FIG. 24 is a diagram for explaining an example of a processing operation of the pilot signal extraction unit. Here, extraction of a pilot signal sequence in a case where the pilot signal is transmitted using an orthogonal sequence unique to a transmission antenna by the cyclic shift of the Zadoff-Chu sequence of FIG. 13 will be described.

As illustrated in FIG. 23, the pilot signal extraction unit 41 includes a subcarrier demapping unit 41A and a pilot extraction processing unit 41B.

The subcarrier demapping unit 41A extracts a pilot signal multiplexed onto a tone between the information symbols in the frequency-domain signal obtained by the FFT unit 31.

The pilot extraction processing unit 41B multiplies the pilot signal extracted by the subcarrier demapping unit 41A by a complex conjugate of a cyclic shift sequence of the pilot signal in the frequency domain, and performs in-phase addition on obtained $N_{CS}$ signals (that is, by despreading) to generate (extract) the pilot signal unique to the transmission antenna.

Here, a shift in the time domain corresponds to phase rotation processing in the frequency domain by discrete Fourier transform (fast Fourier transform). With respect to the number $N_{CS}$ of cyclic shifts in the time domain, a phase shift occurs by $2\pi/N_{CS}$ for each tone in the frequency domain. Therefore, since a phase rotation amount is $2\pi$ between the discretely mapped $N_{CS}$ tones, a cross-correlation of codes between the $N_{CS}$ tones is zero.

The channel response estimation unit 42 estimates an estimated value of a channel response in a tone k.

The multiplication unit 46 multiplies the estimated value of the information symbol generated by the estimated symbol value generation unit 43 and mapped to the tone k by the estimated value of the channel response in the tone k.

Fifth Example Embodiment

A fifth example embodiment relates to another example of the radio reception device. Specifically, in the fourth example embodiment, the estimated symbol value is generated by the hard decision bit obtained by demapping the signal before the error correction decoding (before decoding of channel coding), whereas in the fifth example embodiment, an estimated symbol number value is generated from a bit after error correction decoding. A basic configuration of the radio reception device according to the fifth example embodiment is the same as the basic configuration of the radio reception device 20 according to the second example embodiment.

Figure 25:
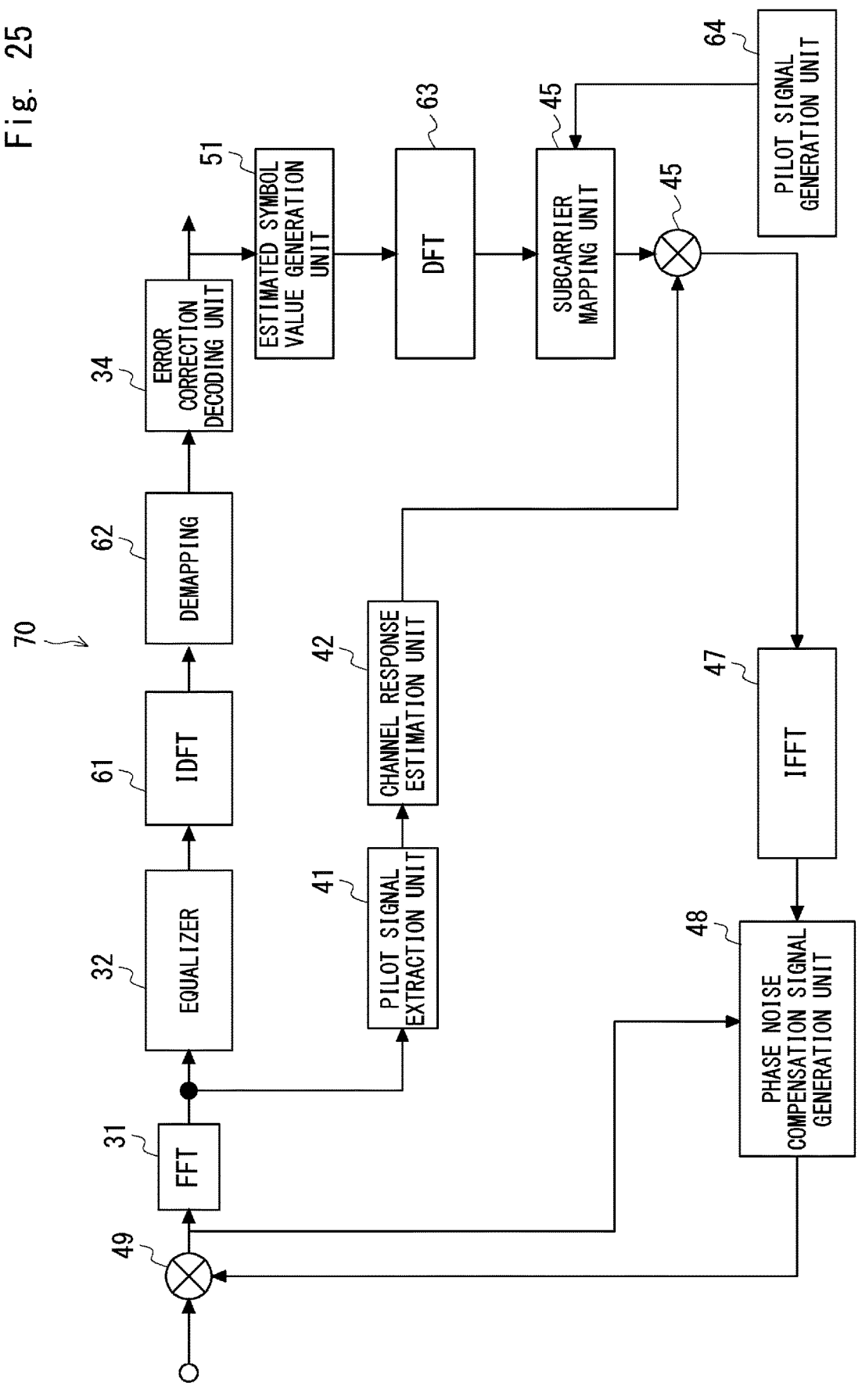
FIG. 25 is a block diagram illustrating an example of a radio reception device according to a fifth example embodiment.

FIG. 25 is a block diagram illustrating an example of the radio reception device according to the fifth example embodiment. In FIG. 25, a radio reception device 70 includes an FFT unit 31, an equalizer 32, an IDFT unit 61, a demapping unit 62, and an error correction decoding unit 34. In addition, the radio reception device 70 includes a pilot signal extraction unit 41, a channel response estimation unit 42, an estimated symbol value generation unit 51, a DFT unit 63, a pilot signal generation unit 64, a subcarrier mapping unit 45, a multiplication unit 46, an IFFT unit 47, a phase noise compensation signal generation unit 48, and a multiplication unit 49. The FFT unit 31 corresponds to the fast Fourier transform (discrete Fourier transform) unit 24 described above. The equalizer 32, the IDFT unit 61, and the demapping unit 62 correspond to the equalization processing unit 25 described above. The error correction decoding unit 34 corresponds to the error correction decoding unit 27. The pilot signal extraction unit 41, the channel response estimation unit 42, the estimated symbol value generation unit 51, the DFT unit 63, the pilot signal generation unit 64, the subcarrier mapping unit 45, the multiplication unit 46, the IFFT unit 47, the phase noise compensation signal generation unit 48, and the multiplication unit 49 correspond to the phase noise estimation/compensation unit 26 described above.

The demapping unit 62 in the radio reception device 70 demaps information symbols included in a time-domain signal after equalization processing, and generates a log-likelihood ratio (LLR) that is a logarithmic value of a ratio of probabilities that each bit in each symbol is "1" or "0 (−1)".

The error correction decoding unit 34 in the radio reception device 70 inputs the log-likelihood ratio (LLR) that is a logarithmic value of a ratio of probabilities that each bit in each symbol obtained by the demapping unit 62 is "1" or "0 (−1)", and performs error correction decoding. Then, the LLR with improved reliability after error correction decoding is output.

The estimated symbol value generation unit 51 in the radio reception device 70 generates an estimated value of an information symbol by mapping a bit obtained by performing hard decision on the log-likelihood ratio (LLR) output from the error correction decoding unit 34.

The DFT unit 63 in the radio reception device 70 converts a plurality of estimated information symbol values generated by the estimated symbol value generation unit 51 into a frequency-domain signal.

The subcarrier mapping unit 45 in the radio reception device 70 maps the frequency-domain signal obtained by the DFT unit 63 and a pilot signal generated by the pilot signal generation unit 64 to the respective tone positions.

The multiplication unit 46 multiplies the estimated value of the information symbol generated by the estimated symbol value generation unit 51 and mapped to the tone k by the estimated value of the channel response in the tone k.

Sixth Example Embodiment

A sixth example embodiment relates to an example of the averaging processing in the phase noise compensation signal generation unit 48 described in the second to fifth example embodiments.

Figure 26:
FIG. 26 is a diagram for explaining an example of averaging processing in a phase noise compensation signal generation unit.
Figure 26:
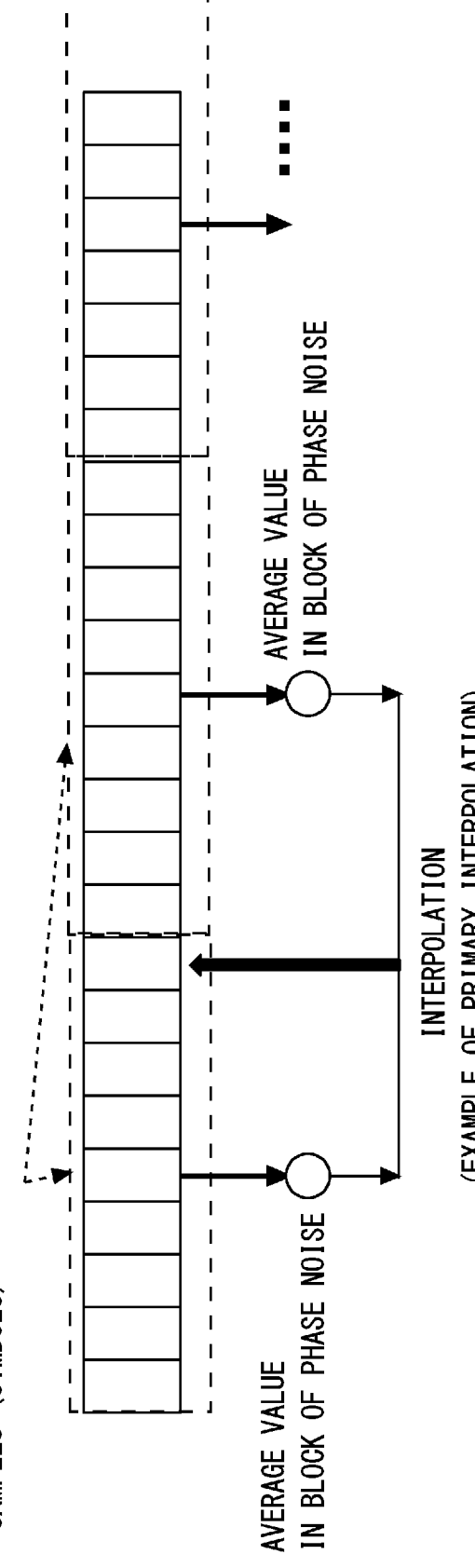

FIG. 26 is a diagram for explaining an example of the averaging processing in the phase noise compensation signal generation unit. Since the averaging processing is processing in units of samples, the averaging processing can be applied to both the OFDM and the DFT-spread OFDM.

$$\overline{\varphi}_t^{(i)}$$ [Mathematical Formula 42]

which is a t-th ($1 \leq t \leq N_{FFT}/N_{WD}$) phase of a signal obtained by performing block averaging on $$\hat{\varphi}_n^{(i)}$$ [Mathematical Formula 43]

is expressed by the following Formula (15).

[Mathematical Formula 44]

$$\overline{\varphi}_t^{(i)} = \frac{1}{N_{WD}} \sum_{k=0}^{N_{WD}} \hat{\varphi}_k^{(i)} \tag{15}$$

In Formula (15), $N_{WD}$ represents an averaging window width (the number of averaged samples). $N_{WD}$ is in a trade-off relationship with an external noise (AWGN) reduction effect (suppression effect) and followability of phase noise estimation. That is, when $N_{WD}$ is increased, the noise component suppression effect is improved, but the followability of the phase noise estimation is deteriorated.

Linear interpolation, quadratic interpolation, or interpolation by a high-order function is performed on $$\overline{\varphi}_t^{(i)}$$ [Mathematical Formula 45]

which is an estimated value of a phase noise at a center position of the continuous averaging window to estimate $$\overline{\varphi}_t^{(i)}$$ [Mathematical Formula 46]

which is a phase noise at a sample timing therebetween.

For example, the phase noise compensation signal generation unit (second phase noise compensation processing unit) 48 independently averages estimated phase noise values of $N_{FFT}/N_{Blk}$ samples of each block obtained by dividing $N_{FFT}$ samples of an OFDM symbol corresponding to an FFT block into $N_{Blk}$ blocks for an in-phase component and a quadrature component. Then, the phase noise compensation signal generation unit (second phase noise compensation processing unit) 48 estimates a phase noise at each sample point by interpolating the obtained average value of the estimated phase noise values of the $N_{Blk}$ blocks by linear interpolation, quadratic interpolation, or interpolation using a high-order function.

Seventh Example Embodiment

A seventh example embodiment relates to another example of the averaging processing in the phase noise compensation signal generation unit 48 described in the second to fifth example embodiments. Although a case of the OFDM will be described below, a case of the single-carrier DFT-spread OFDM can also be implemented by a similar procedure.

A phase shift relative to a phase noise one sample before a phase noise at a sampling timing n is represented by $$\psi_n^*$$ [Mathematical Formula 47]

An error signal $e_n$ between a received signal and an estimated symbol value considering a channel response and the phase noise is expressed by the following Formula (16).

[Mathematical Formula 48]

$$e_n = r_n - \psi_n^* \hat{y}_n \tag{16}$$

The phase noise compensation processing unit (second phase noise compensation processing unit) 48 updates a relative phase shift $\psi_n$ by using the LMS algorithm as expressed in the following Formula (17).

[Mathematical Formula 49]

$$\psi_{n+1}=\psi_n-\mu_\psi \hat{y}_n e_n^*$$ (17)

In Formula (17), $\mu_\psi$ represents a step size.

Eighth Example Embodiment

An eighth example embodiment relates to another example of the radio reception device. In particular, the radio reception device according to the eighth example embodiment relates to phase noise estimation and phase noise compensation using a phase locked loop (PLL) in a case where the OFDM is used. A basic configuration of the radio reception device according to the eighth example embodiment is the same as the basic configuration of the radio reception device 20 according to the second example embodiment.

Figure 27:
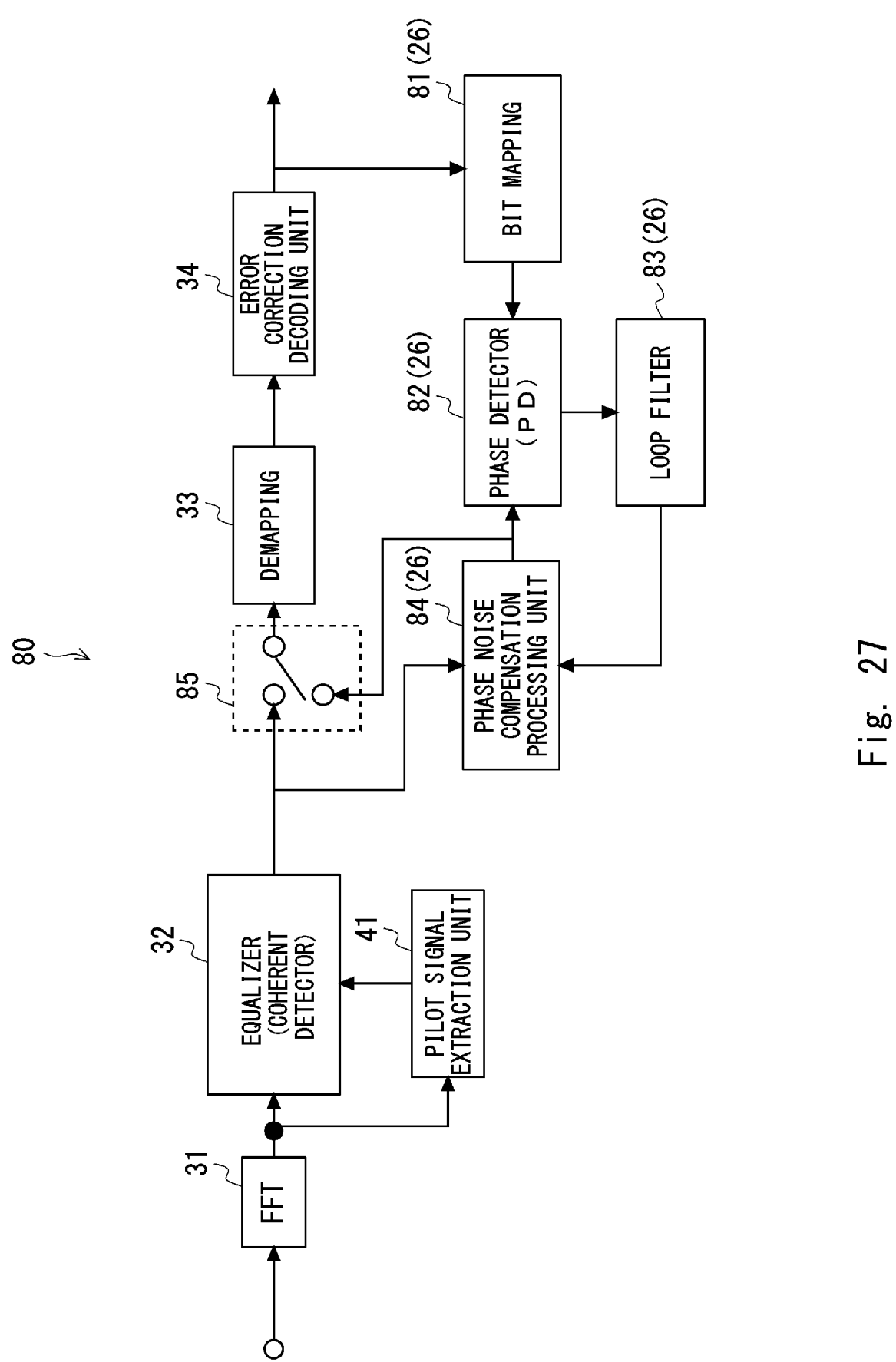
FIG. 27 is a block diagram illustrating an example of a radio reception device according to an eighth example embodiment.

FIG. 27 is a block diagram illustrating an example of the radio reception device according to the eighth example embodiment. In FIG. 27, a radio reception device 80 includes an FFT unit 31, an equalizer (coherent detector) 32, a demapping unit 33, and an error correction decoding unit 34. Further, the radio reception device 80 includes a bit mapping unit 81, a phase detector (PD) 82, a loop filter 83, a phase noise compensation processing unit (second phase noise compensation processing unit) 84, and a switch 85. The FFT unit 31 corresponds to the fast Fourier transform (discrete Fourier transform) unit 24 described above. The equalizer (coherent detector) 32 and the demapping unit 33 correspond to the equalization processing unit 25 described above. The error correction decoding unit 34 corresponds to the error correction decoding unit 27. The bit mapping unit 81, the phase detector (PD) 82, the loop filter 83, and the phase noise compensation processing unit (second phase noise compensation processing unit) 84 correspond to the phase noise estimation/compensation unit 26 described above.

When the equalizer (coherent detector) 32 and the demapping unit 33 are connected by the switch 85, the demapping unit 33 in the radio reception device 80 demaps information symbols included in a time-domain signal after equalization processing, and calculates reliability information (that is, a log-likelihood ratio (LLR)) of each bit in each symbol. In addition, when the phase noise compensation processing unit 84 and the demapping unit 33 are connected by the switch 85, the demapping unit 33 demaps the information symbols included in the time-domain signal after compensation processing, and calculates reliability information of each bit in each symbol.

The error correction decoding unit 34 in the radio reception device 80 inputs the reliability information (LLR) of each bit in each symbol obtained by the demapping unit 33 and executes error correction decoding processing. Then, the error correction decoding unit 34 outputs the log-likelihood ratio (LLR) of each bit with improved reliability.

The bit mapping unit 81 generates an estimated value of the information symbol by remapping a bit obtained by performing hard decision on the log-likelihood ratio (LLR) output from the error correction decoding unit 34.

The phase detector (PD) 82 detects a phase difference between a reference signal (the estimated value of the information symbol generated by the bit mapping unit 81 is used as the reference signal) and a signal obtained by compensating for a phase variation caused by a phase noise for an information symbol of interest of the phase noise compensation processing unit 84.

Since a phase difference signal output from the phase detector (PD) 82 includes a noise (AWGN) component, the loop filter 83 averages the phase difference signal output from the phase detector (PD) 82 to suppress the phase variation caused by noise and generate an estimated value of a residual phase noise.

The phase noise compensation processing unit 84 compensates for the residual phase noise by multiplying an output signal of the equalizer (coherent detector) 32 by a complex conjugate of the estimated value of the residual phase noise output from the loop filter 83. By repeating the PLL in a state where the phase noise compensation processing unit 84 and the demapping unit 33 are connected by the switch 85, the residual phase noise can be suppressed to a low level.

A radio reception device applicable to the DFT-spread OFDM can be implemented by inserting IDFT downstream of the equalizer 32.

Ninth Example Embodiment

A ninth example embodiment relates to another example of the radio reception device. A basic configuration of the radio reception device according to the ninth example embodiment is the same as the basic configuration of the radio reception device 20 according to the second example embodiment.

Figure 28:
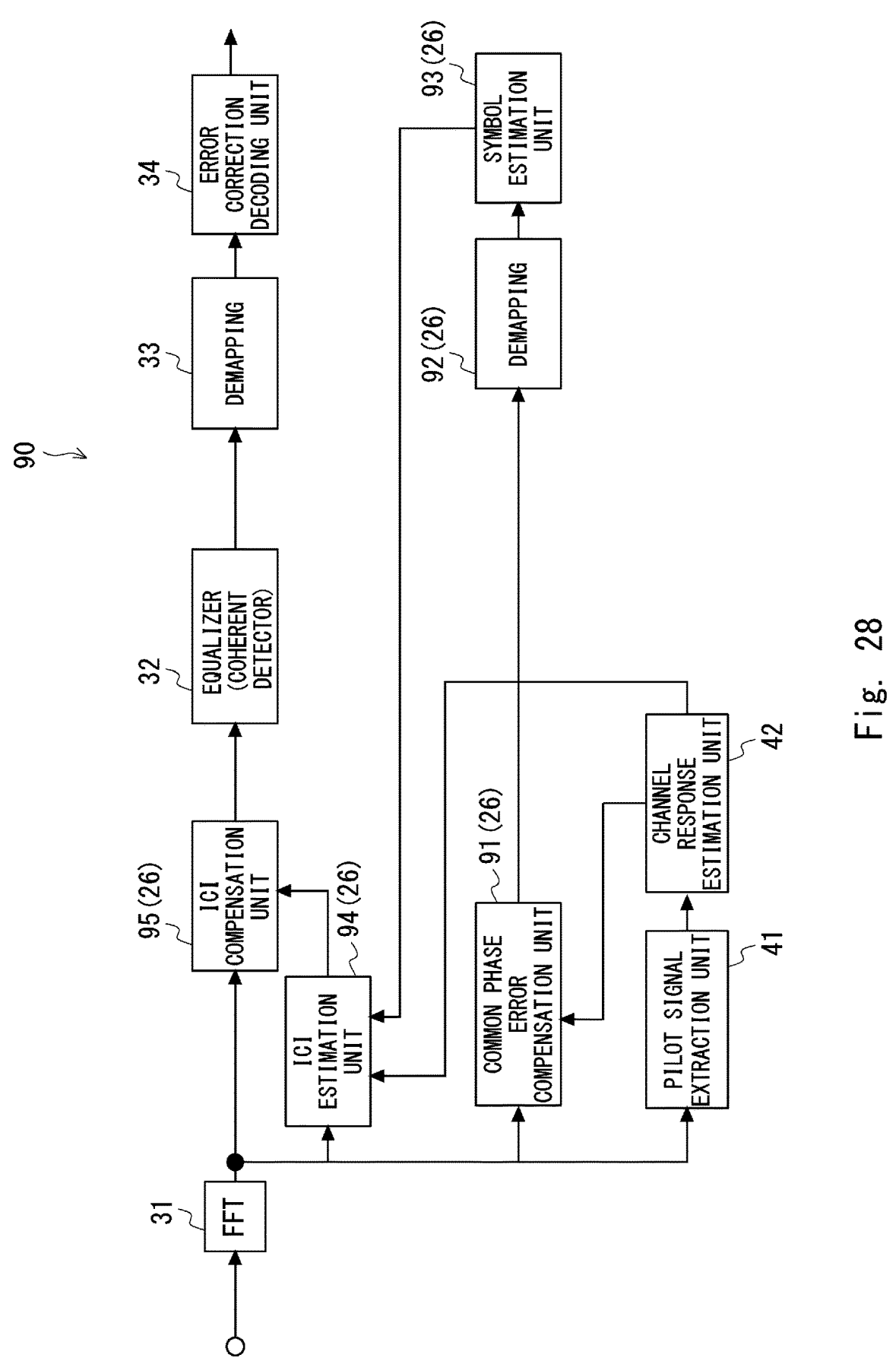
FIG. 28 is a block diagram illustrating an example of a radio reception device in a case where OFDM is used according to a ninth example embodiment.

FIG. 28 is a block diagram illustrating an example of the radio reception device in a case where the OFDM is used according to the ninth example embodiment. In FIG. 28, a radio reception device 90 includes an FFT unit 31, an equalizer (coherent detector) 32, a demapping unit 33, and an error correction decoding unit 34. Further, the radio reception device 90 includes a pilot signal extraction unit 41, a channel response estimation unit 42, a common phase error compensation unit 91, a demapping unit 92, a symbol estimation unit 93, an inter-carrier interference (ICI) estimation unit 94, and an inter-carrier interference (ICI) compensation unit 95. The FFT unit 31 corresponds to the fast Fourier transform (discrete Fourier transform) unit 24 described above. The equalizer (coherent detector) 32 and the demapping unit 33 correspond to the equalization processing unit 25 described above. The error correction decoding unit 34 corresponds to the error correction decoding unit 27. The pilot signal extraction unit 41, the channel response estimation unit 42, the common phase error compensation unit 91, the demapping unit 92, the symbol estimation unit 93, the inter-carrier interference estimation unit 94, and the inter-carrier interference compensation unit 95 correspond to the phase noise estimation/compensation unit 26 described above.

Here, as described above, since a phase noise causes a random phase rotation for a transmitted signal or received signal in the time domain, in the frequency domain, a common phase error (CPE) common to all the subcarriers and inter-subcarrier interference between different subcarriers are caused. The inter-subcarrier interference is simply referred to as inter-carrier interference (ICI). Therefore, the CPE of the symbol after equalization (coherent detection) is compensated for each subcarrier signal after FFT processing of the OFDM. After demapping the symbol after CPE compensation, an estimated symbol value is generated, inter-carrier interference (ICI) is estimated from a received symbol, an estimated symbol value, and an estimated channel response at each subcarrier position, and a weighting coefficient of the minimum mean square error (MMSE) standard, and the ICI is eliminated (compensated) from each symbol.

A received signal in units of blocks in the time domain subjected to multipath fading is expressed by the following Formula (18).

[Mathematical Formula 50]

$$r_n = (x_n \otimes h_n) e^{j\Phi_n} = w_n \qquad (18)$$

In Formula (18), $x_n$ represents a pilot signal or information symbol. $h_n$ represents a channel impulse response. $w_n$ represents a background noise component. A received signal r in a case where the background noise component is not considered is expressed as follows.

$$r = \mathrm{diag}(e^{j\Phi})(x \otimes h) \qquad \text{[Mathematical Formula 51]}$$

Here, $$\otimes \qquad \text{[Mathematical Formula 52]}$$

represents a circular convolution of the vector.
Further, $$\Phi = [\phi_0, \phi_1, \ldots, \phi_{N_{FFT}-1}] \qquad \text{[Mathematical Formula 53]}$$

As disclosed in Non-Patent Literature 9, a frequency-domain signal $R_k$ (k=0, 1, . . . , $N_{FFT}-1$) of the received signal $r_n$ is expressed by the following Formula (19).

[Mathematical Formula 54]

$$R_k = X_k H_k J_0 + \sum_{\substack{l=0 \\ l \neq k}}^{N_{FFT}-1} X_l H_l J_{k-l} + \eta_k = X_k H_k J_0 + \varepsilon_k \qquad (19)$$

In Formula (19), $X_k$, $H_k$, and $\eta_k$ represent an information symbol, a channel response, and a background noise component in a subcarrier k, respectively. $J_k$ represents a frequency-domain signal obtained by performing discrete Fourier transform on the phase noise $$e^{j\phi_n} \qquad \text{[Mathematical Formula 55]}$$

in the time domain as shown in Formula (20).

[Mathematical Formula 56]

$$J_k = \frac{1}{N_{FFT}} \sum_{n=0}^{N_{FFT}-1} e^{-j2\pi nk/N_{FFT}} e^{j\phi_n} \qquad (20)$$

In Formula (20), in particular, a zero frequency component $J_0$ can be expressed by the following Formula (21).

[Mathematical Formula 57]

$$J_0 = \frac{1}{N_{FFT}} \sum_{n=0}^{N_{FFT}-1} e^{j\phi_n} = \frac{1}{N_{FFT}} e^{j\Phi_0} \sum_{n=0}^{N_{FFT}-1} e^{j\Delta\phi_n} \approx e^{j\Phi_0} \qquad (21)$$

In Formula (21), $\Phi_0$ represents an average phase shift between blocks. $\Delta\phi_n$ represents a phase shift from $\Phi_0$ at a sample point. Since $\Delta\phi_n$ is a very small value, the approximation of Formula (21) holds. Since the zero frequency component $J_0$ is a phase rotation common to all the subcarrier positions, it is called a common phase error (CPE) and can be easily estimated. In addition, the second term on the right side of Formula (19) is inter-subcarrier interference (ICI) varying depending on the subcarrier position. As shown in Formula (19), a phase variation caused by the phase noise in the time domain becomes the CPE and the inter-carrier interference (ICI) different for each subcarrier position in the frequency domain. Since estimating the inter-carrier interference $J_k$ for all k increases the computation amount, estimation and compensation are performed up to a certain k-th order inter-carrier interference.

$\varepsilon_k$ shown in Formula (19) is the sum of the term of residual ICI that is not compensated and external noise and is modeled by Gaussian noise that has an average of 0, and a variance of $$\sigma_\varepsilon^2. \qquad \text{[Mathematical Formula 58]}$$

$J_0$ is obtained using the pilot signal by the minimum mean square error standard as shown in the following Formula (22).

[Mathematical Formula 59]

$$J_0 = \min_{J_0} \sum_{k=0}^{N_{FFT}-1} |R_k - J_0 X_k H_k|^2 \qquad (22)$$

In Formula (22), $X_k$ and $R_k$ are a complex signal of a pilot symbol and the frequency-domain signal of the received signal for the complex signal, respectively.

In Formula (22), $$\hat{J}_0 \qquad \text{[Mathematical Formula 60]}$$

is expressed by the following Formula (23).

[Mathematical Formula 61]

$$\hat{J}_0 = \frac{\sum_{k=0}^{N_{FFT}-1} R_k X_k^* H_k^*}{\sum_{k=0}^{N_{FFT}-1} |X_k H_k|^2} \qquad (23)$$

The common phase error compensation unit 91 of the radio reception device 90 illustrated in FIG. 28 estimates the common phase error (CPE) according to Formula (23) using, for example, the pilot signal.

An equalization weight of the MMSE is given using the CPE estimated by Formula (23) by the following Formula (24).

[Mathematical Formula 62]

$$C_k^{MMSE} = \frac{J_0^* H_k^*}{|J_0 H_k|^2 + \frac{\sigma_\varepsilon^2}{E_x}} \qquad (24)$$

In Formula (24), $$J_0 = \hat{J}_0. \qquad \text{[Mathematical Formula 63]}$$

$E_x$ represents signal power per symbol of a desired wave signal. Further, $$\sigma_\varepsilon^2 = \frac{1}{N_{FFT}} \sum_{k=0}^{N_{FFT}-1} |R_k|^2. \qquad \text{[Mathematical Formula 64]}$$

A maximal ratio combining (MRC) weight is given using the CPE estimated by Formula (23) by the following Formula (25).

[Mathematical Formula 65]

$$C_k^{MRC} = J_0{}^* H_k{}^*$$ (25)

The channel response estimation unit 42 estimates an estimated value of the channel response in the subcarrier k, and outputs the estimated value to the common phase error compensation unit 91 and the ICI estimation unit 94.

The common phase error compensation unit 91 compensates for the CPE by, for example, multiplying the received signal in the frequency domain (the OFDM signal in the frequency domain) by an equalization weighting coefficient calculated according to Formula (25).

The demapping unit 92 demaps each symbol of a symbol sequence for which the CPE is compensated, and reproduces a transmitted bit.

The symbol estimation unit 93 remaps a hard decision bit of the transmitted bit to generate an estimated value of the information symbol.

As described above, the phase noise causes inter-subcarrier interference (ICI) with respect to a plurality of subcarriers in the frequency domain. Subsequently, the inter-carrier interference (ICI) is estimated using each symbol after FFT processing of the received signal, an estimation value of each symbol, and an estimation value of the channel response at each symbol position. In an actual system, if second-order ICI is compensated, accuracy in estimation of a phase noise close to a variation of a phase noise which changes over time can be obtained.

A subset of $$l = \{0, 1, \dots, N_{FFT}-1\}$$ [Mathematical Formula 66]

which is a subcarrier index 1 is defined as $$L = \{l_1, l_2, \dots, l_k\}.$$ [Mathematical Formula 67]

A received signal R in the frequency domain for the subset L of subcarriers is expressed by $$R = (R_{l_1}, R_{l_2}, R_{l_3}, \dots, R_{l_k})^T.$$ [Mathematical Formula 68]

$$R$$ [Mathematical Formula 69]

can be expressed by the following Formula (26).

[Mathematical Formula 70]

$$\begin{bmatrix} R_{l_1} \\ R_{l_2} \\ \dots \\ R_{l_k} \end{bmatrix} = \begin{bmatrix} A_{l_1} & A_{l_2-1} & \dots & A_{l_1+u} \\ A_{l_2} & A_{l_2-1} & \dots & A_{l_2+u} \\ \vdots & \vdots & & \vdots \\ A_{l_k} & A_{l_k-1} & \dots & A_{l_k+u} \end{bmatrix} \begin{bmatrix} J_0 \\ J_1 \\ J_{-1} \\ \dots \\ J_u \\ J_{-u} \end{bmatrix} + \begin{bmatrix} \zeta_{ICI,l_1} \\ \zeta_{ICI,l_2} \\ \vdots \\ \zeta_{ICI,l_k} \end{bmatrix} + \begin{bmatrix} \eta_{l_1} \\ \eta_{l_2} \\ \vdots \\ \eta_{l_k} \end{bmatrix}$$ (26)

In Formula (26), $$A_k = H_k X_k.$$ [Mathematical Formula 71]

In addition, $J_k$ represents a frequency spectrum component of the phase noise. Further, $$\zeta_{ICI,k}$$ [Mathematical Formula 72]

is the ICI. In addition, $\eta_k$ represents a noise component. When Formula (26) is expressed as matrix notation, and $$R = AJ + \varepsilon$$ [Mathematical Formula 73]

is notated, an estimated value of J that is the minimum mean square error (MMSE) can be calculated by the following Formula (27):

[Mathematical Formula 74]

$$\hat{J} = MR$$ (27).

Here, a component of ε, which is the sum of higher-order residual inter-carrier interference that are not compensated and background noise, is expressed as $$\zeta_{ICI,k} + \eta_k.$$ [Mathematical Formula 75]

A matrix M can be obtained by the following Formula (28).

[Mathematical Formula 76]

$$M = \frac{R_{JJ}A^H}{AR_{JJ}A^H + R_{\varepsilon\varepsilon}}$$ (28)

In Formula (28), $$R_{JJ}$$ [Mathematical Formula 77]

is a correlation matrix of J.

$$R_{\varepsilon\varepsilon}$$ [Mathematical Formula 78]

is a correlation matrix of ε.

These can be obtained by decision feedback processing using a pilot signal or an information symbol of an FFT block previous to an FFT block of interest.

The inter-carrier interference estimation unit 94 calculates an estimated value of the inter-carrier interference by using, for example, Formulas (27) and (28).

The inter-carrier interference compensation unit 95 subtracts the inter-carrier interference estimated by the inter-carrier interference estimation unit 94 from each symbol of an output signal of the FFT unit 31 to generate a symbol for which the inter-carrier interference is compensated.

Tenth Example Embodiment

A tenth example embodiment relates to another example of the radio reception device. Specifically, in the ninth example embodiment, the estimated symbol value is generated by the hard decision bit obtained by demapping the signal before the error correction decoding (before decoding of channel coding), whereas in the tenth example embodiment, an estimated symbol number value is generated from a decoded bit after error correction decoding. A basic configuration of the radio reception device according to the tenth example embodiment is the same as the basic configuration of the radio reception device 20 according to the second example embodiment.

Figure 29:
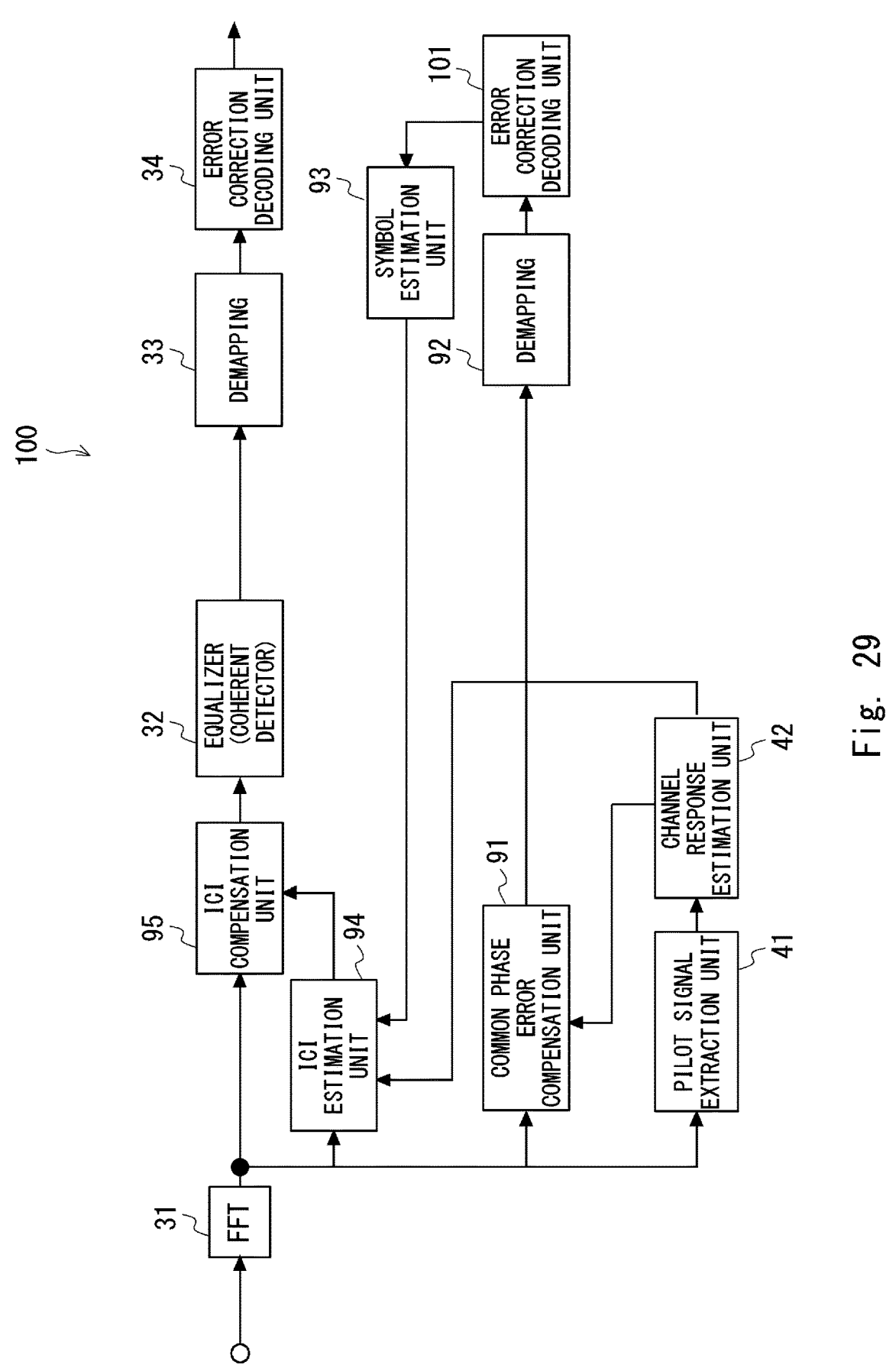
FIG. 29 is a block diagram illustrating an example of a radio reception device according to a tenth example embodiment.

FIG. 29 is a block diagram illustrating an example of the radio reception device according to the tenth example embodiment. In FIG. 29, a radio reception device 100 includes an FFT unit 31, an equalizer (coherent detector) 32, a demapping unit 33, and an error correction decoding unit 34. Further, the radio reception device 100 includes a pilot signal extraction unit 41, a channel response estimation unit 42, a common phase error compensation unit 91, a demapping unit 92, an error correction decoding unit 101, a symbol estimation unit 93, an inter-carrier interference estimation unit 94, and an inter-carrier interference compensation unit 95. The FFT unit 31 corresponds to the fast Fourier transform (discrete Fourier transform) unit 24 described above. The equalizer (coherent detector) 32 and the demapping unit 33 correspond to the equalization processing unit 25 described above. The error correction decoding unit 34 corresponds to the error correction decoding unit 27. The pilot signal extraction unit 41, the channel response estimation unit 42, the common phase error compensation unit 91, the demapping unit 92, the error correction decoding unit 101, the symbol estimation unit 93, the inter-carrier interference estimation unit 94, and the inter-carrier interference compensation unit 95 correspond to the phase noise estimation/compensation unit 26 described above.

The demapping unit 92 in the radio reception device 100 demaps a symbol after common phase error (CPE) compensation, and calculates a log-likelihood ratio (LLR) that is a logarithmic value of a ratio of probabilities that each bit in each symbol is "1" or "0 (−1)".

The error correction decoding unit 101 in the radio reception device 100 deinterleaves the log-likelihood ratio of each bit in each symbol obtained by the demapping unit 92, and then inputs the deinterleaved log-likelihood ratio to perform error correction decoding. Then, the error correction decoding unit 101 outputs a decoded bit with improved reliability.

The symbol estimation unit 93 in the radio reception device 100 generates an estimated value of an information symbol by mapping a hard decision bit of a transmitted bit reproduced by the error correction decoding unit 101.

Eleventh Example Embodiment

An eleventh example embodiment relates to another example of the radio reception device. In particular, the eleventh example embodiment relates to a configuration corresponding to the single-carrier DFT-spread OFDM. That is, the radio reception device according to the eleventh example embodiment has a configuration corresponding to the single-carrier DFT-spread OFDM unlike the configuration of the radio reception device 90 corresponding to the multi-carrier OFDM according to the ninth example embodiment. A basic configuration of the radio reception device according to the eleventh example embodiment is the same as the basic configuration of the radio reception device 20 according to the second example embodiment.

Figure 30:
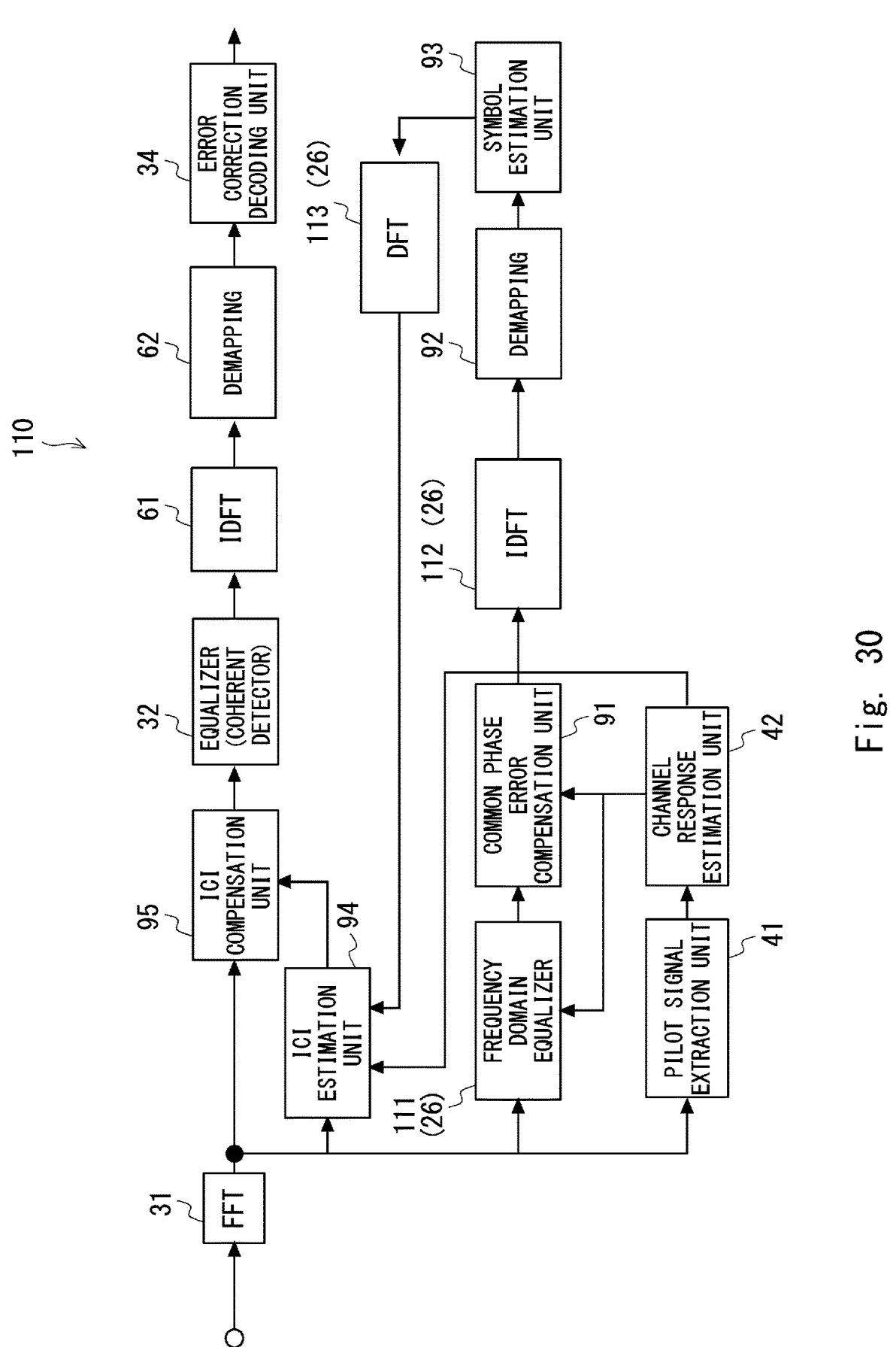
FIG. 30 is a block diagram illustrating an example of a radio reception device according to an eleventh example embodiment.

FIG. 30 is a block diagram illustrating an example of the radio reception device according to the eleventh example embodiment. In FIG. 30, a radio reception device 110 includes an FFT unit 31, an equalizer 32, an IDFT unit 61, a demapping unit 62, and an error correction decoding unit 34. Further, the radio reception device 110 includes a pilot signal extraction unit 41, a channel response estimation unit 42, a frequency domain equalizer (FDE) 111, a common phase error compensation unit 91, an IDFT unit 112, a demapping unit 92, a symbol estimation unit 93, a DFT unit 113, an inter-carrier interference estimation unit 94, and an inter-carrier interference compensation unit 95. The FFT unit 31 corresponds to the fast Fourier transform (discrete Fourier transform) unit 24 described above. The frequency domain equalizer (FDE) 32, the IDFT unit 61, and the demapping unit 62 correspond to the equalization processing unit 25 described above. The error correction decoding unit 34 corresponds to the error correction decoding unit 27. The pilot signal extraction unit 41, the channel response estimation unit 42, the frequency domain equalizer (FDE) 111, the common phase error compensation unit 91, the IDFT unit 112, the demapping unit 92, the symbol estimation unit 93, the DFT unit 113, the inter-carrier interference estimation unit 94, and the inter-carrier interference compensation unit 95 correspond to the phase noise estimation/compensation unit 26 described above.

In the radio reception device 110, the frequency domain equalizer (FDE) 111 and the common phase error compensation unit 91 perform equalization by, for example, multiplying a single-carrier received signal in the frequency domain by an equalization weighting coefficient calculated according to Formula (24). The equalization processing for compensating for an amplitude variation and a phase variation of a propagation path and CPE compensation are simultaneously performed.

In the radio reception device 110, the IDFT unit 112 converts a frequency-domain signal after the equalization and the CPE compensation into a time-domain signal (a single-carrier symbol string).

The demapping unit 92 demaps each single-carrier symbol and reproduces a transmitted bit.

The symbol estimation unit 93 remaps a hard decision bit to generate an estimated value of an information symbol.

The DFT unit 113 converts a plurality of estimated information symbol values generated by the symbol estimation unit 93 into a frequency-domain signal.

Twelfth Example Embodiment

A twelfth example embodiment relates to another example of the radio reception device. Specifically, in the eleventh example embodiment, the estimated symbol value is generated by the hard decision bit obtained by demapping the symbol before the error correction decoding (before decoding of channel coding), whereas in the twelfth example embodiment, an estimated symbol number value is generated from a bit after error correction decoding. A basic configuration of the radio reception device according to the twelfth example embodiment is the same as the basic configuration of the radio reception device 20 according to the second example embodiment.

Figure 31:
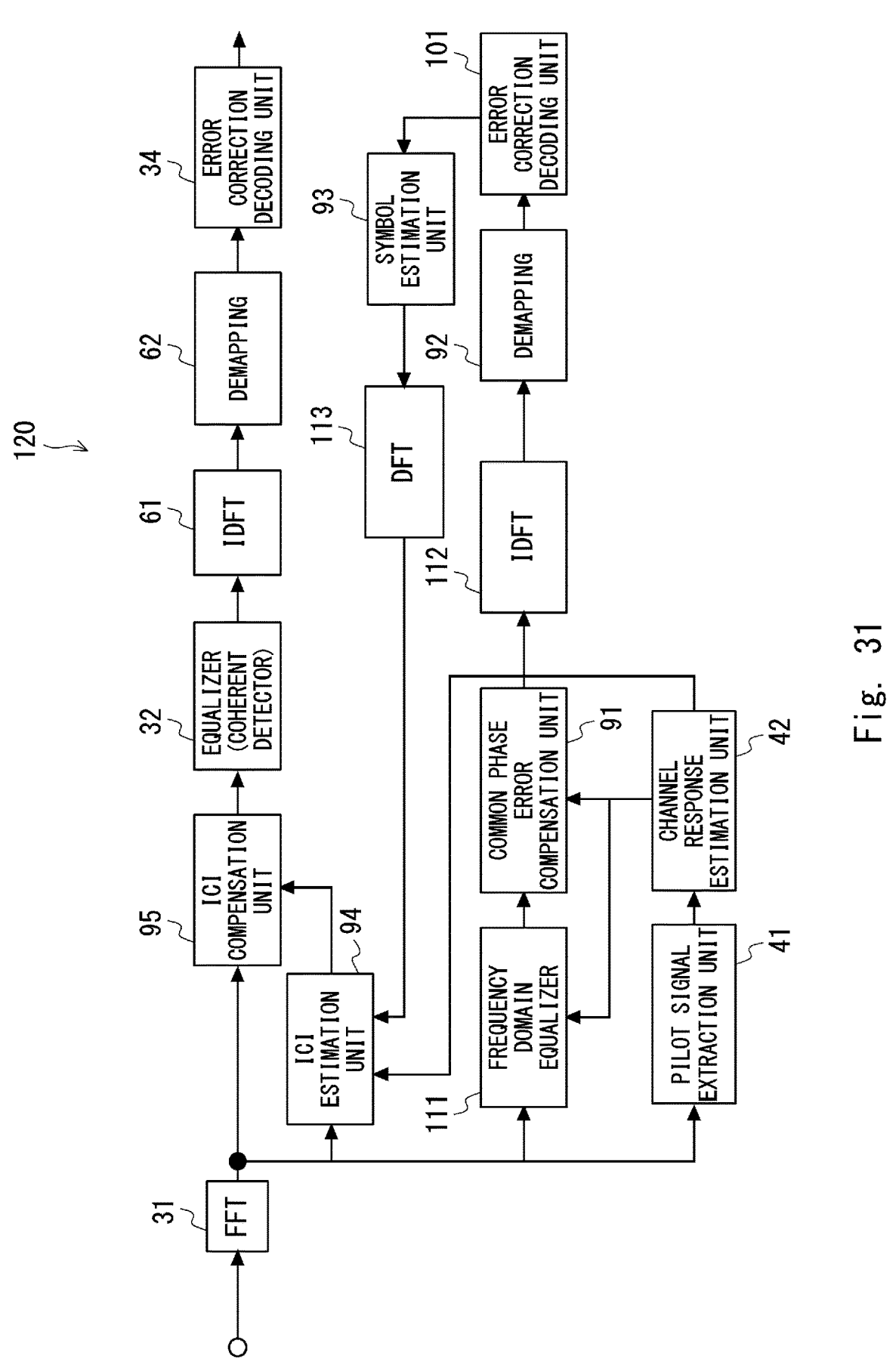
FIG. 31 is a block diagram illustrating an example of a radio reception device according to a twelfth example embodiment.

FIG. 31 is a block diagram illustrating an example of the radio reception device according to the twelfth example embodiment. In FIG. 31, a radio reception device 120 includes an FFT unit 31, a frequency domain equalizer 32, an IDFT unit 61, a demapping unit 62, and an error correction decoding unit 34. Further, the radio reception device 120 includes a pilot signal extraction unit 41, a channel response estimation unit 42, a frequency domain equalizer 111, a common phase error compensation unit 91, an IDFT unit 112, a demapping unit 92, an error correction decoding unit 101, a symbol estimation unit 93, a DFT unit 113, an inter-carrier interference estimation unit 94, and an inter-carrier interference compensation unit 95. The FFT unit 31 corresponds to the fast Fourier transform (discrete Fourier transform) unit 24 described above. The frequency domain equalizer 32, the IDFT unit 61, and the demapping unit 62 correspond to the equalization processing unit 25 described above. The error correction decoding unit 34 corresponds to the error correction decoding unit 27. The pilot signal extraction unit 41, the channel response estimation unit 42, the frequency domain equalizer 111, the common phase error compensation unit 91, the IDFT unit 112, the demapping unit 92, the error correction decoding unit 101, the symbol estimation unit 93, the DFT unit 113, the inter-carrier interference estimation unit 94, and the inter-carrier interference compensation unit 95 correspond to the phase noise estimation/compensation unit 26 described above.

In the radio reception device 120, the IDFT unit 112 converts a frequency-domain signal after the equalization and the common phase error (CPE) compensation into a single carrier signal in the time domain.

The demapping unit 92 demaps an information symbol in the time domain after the equalization and the common phase error (CPE) compensation, and calculates a log-likelihood ratio (LLR) that is a logarithmic value of a ratio of probabilities that each bit in each symbol is "1" or "0 (−1)".

The error correction decoding unit 101 deinterleaves the log-likelihood ratio of each bit in each symbol obtained by the demapping unit 92 and then inputs the deinterleaved log-likelihood ratio to perform error correction decoding. Then, the error correction decoding unit 101 outputs a decoded bit with improved reliability.

The symbol estimation unit 93 generates an estimated value of the information symbol by mapping the hard decision bit of the transmitted bit reproduced by the error correction decoding unit 101.

The DFT unit 113 converts estimated single-carrier information symbol values generated by the symbol estimation unit 93 into a frequency-domain signal.

Other Example Embodiments

Figure 32:
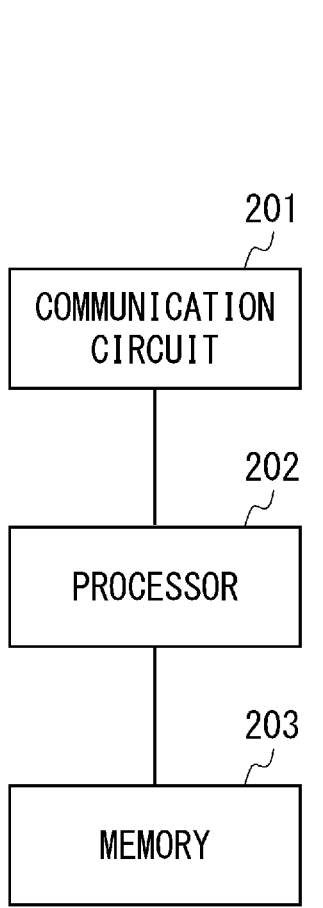
FIG. 32 is a diagram illustrating an example of a hardware configuration of a radio transmission device.

FIG. 32 is a diagram illustrating an example of a hardware configuration of a radio transmission device. In FIG. 32, a radio transmission device 200 includes a communication circuit 201, a processor 202, and a memory 203. The processor 202 may be, for example, a microprocessor, a micro processing unit (MPU), or a central processing unit (CPU). The processor 202 may include a plurality of processors. The memory 203 is implemented by a combination of a volatile memory and a nonvolatile memory. The memory 203 may include a storage located away from the processor 202. In this case, the processor 202 may access the memory 203 through an input/output (I/O) interface (not illustrated).

The radio transmission device 10 according to the first example embodiment can have the hardware configuration illustrated in FIG. 32. The information symbol output unit 11, the pilot signal output unit 12, and the OFDM signal forming unit 13 of the radio transmission device 10 according to the first example embodiment may be implemented by the processor 202 reading and executing a program stored in the memory 203. The transmission radio unit 14 may be implemented by the communication circuit 201. The program can be stored using various types of non-transitory computer readable media and supplied to the radio transmission device 10. Examples of the non-transitory computer readable media include magnetic recording media (for example, flexible disks, magnetic tapes, or hard disk drives), magneto-optical recording media (for example, magneto-optical disks). Other examples of the non-transitory computer readable media include a read only memory (CD-ROM), a CD-R, and a CD-R/W. Yet other examples of the non-transitory computer readable media include semiconductor memory. Examples of the semiconductor memory include a mask ROM, a programmable ROM (PROM), an erasable PROM (EPROM), a flash ROM, and a random access memory (RAM). In addition, the program may be supplied to the radio transmission device 10 by various types of transitory computer readable media. Examples of the transitory computer readable media include electric signals, optical signals, and electromagnetic waves. The transitory computer readable media can provide the program to the radio transmission device 10 via a wired communication line such as an electric wire and optical fibers or a radio communication line.

Figure 33:
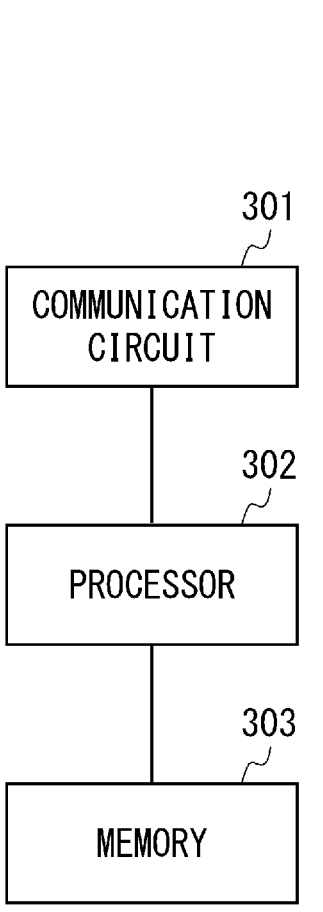
FIG. 33 is a diagram illustrating an example of a hardware configuration of a radio reception device.

FIG. 33 is a diagram illustrating an example of a hardware configuration of a radio reception device. In FIG. 33, a radio reception device 300 includes a communication circuit 301, a processor 302, and a memory 303. The processor 302 may be, for example, a microprocessor, a micro processing unit (MPU), or a central processing unit (CPU). The processor 302 may include a plurality of processors. The memory 303 is implemented by a combination of a volatile memory and a nonvolatile memory. The memory 303 may include a storage located away from the processor 302. In this case, the processor 302 may access the memory 303 through an input/output (I/O) interface (not illustrated).

Each of the radio reception devices 20, 50, 60, 70, 80, 90, 100, 110, and 120 according to the second to twelfth example embodiments can have the hardware configuration illustrated in FIG. 33. The signal processing unit 22 of each of the radio reception devices 20, 50, 60, 70, 80, 90, 100, 110, and 120 according to the second to twelfth example embodiments may be implemented by the processor 302 reading and executing a program stored in the memory 303. The reception radio unit 21 may be implemented by the communication circuit 301. The program can be stored using various types of non-transitory computer readable media and supplied to the radio reception devices 20, 50, 60, 70, 80, 90, 100, 110, and 120. Examples of the non-transitory computer readable media include magnetic recording media (for example, flexible disks, magnetic tapes, or hard disk drives), magneto-optical recording media (for example, magneto-optical disks). Other examples of the non-transitory computer readable media include a read only memory (CD-ROM), a CD-R, and a CD-R/W. Yet other examples of the non-transitory computer readable media include semiconductor memory. Examples of the semiconductor memory include a mask ROM, a programmable ROM (PROM), an erasable PROM (EPROM), a flash ROM, and a random access memory (RAM). In addition, the program may be supplied to the radio reception devices 20, 50, 60, 70, 80, 90, 100, 110, and 120 by various types of transitory computer readable media. Examples of the transitory computer readable media include electric signals, optical signals, and electromagnetic waves. The transitory computer readable media can provide the program to the radio reception devices 20, 50, 60, 70, 80, 90, 100, 110, and 120 via a wired communication line such as an electric wire and optical fibers or a wireless communication line.

The first to twelfth embodiments can be combined as desirable by one of ordinary skill in the art.

According to the present disclosure, it is possible to provide a wireless transmission device and a wireless reception device capable of suppressing deterioration of an error rate.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the exemplary embodiments disclosed above can be described as, but not limited to, the following supplementary notes.

(Supplementary Note 1)

A radio transmission device including:

a signal forming unit configured to form an orthogonal frequency division multiplexing (OFDM) signal including pilot signals; and a transmission radio unit configured to form a radio signal from the formed OFDM signal, wherein the signal forming unit arranges the pilot signals according to a pilot arrangement pattern, the pilot arrangement pattern arranging the pilot signals in a plurality of pilot arrangement subcarriers with an $N_{Pilot\_Freq}$-subcarrier interval among all subcarriers for the OFDM signal, arranging the pilot signals in all resource elements each of which is defined by a combination of a subcarrier and an OFDM symbol, in a plurality of first pilot arrangement subcarriers with an $N_{Pilot\_SPA}$-subcarrier interval among the plurality of pilot arrangement subcarriers, and arranging the pilot signals in a cycle of $N_{Pilot\_Time}$ resource elements in a time domain, in a plurality of second pilot arrangement subcarriers excluding the plurality of first pilot arrangement subcarriers among the plurality of pilot arrangement subcarriers.

(Supplementary Note 2)

The radio transmission device according to Supplementary Note 1, wherein the OFDM signal is a discrete Fourier transformation (DFT) spread OFDM signal, and the signal forming unit includes:

a transform unit configured to convert pilot symbol blocks obtained by blocking pilot symbols in the time domain into a frequency-domain signal by discrete Fourier transform;

a mapping unit configured to map the frequency-domain signal to the pilot arrangement subcarrier; and an inverse transform unit configured to convert the mapped frequency-domain signal into a time-domain signal by inverse discrete Fourier transform.

(Supplementary Note 3)

The radio transmission device according to Supplementary Note 1, further including a plurality of antennas including a first antenna and a second antenna, wherein the signal forming unit arranges the pilot signals according to the pilot arrangement pattern in an OFDM signal transmitted by the first antenna, and arranges the pilot signals according to the same pattern as the pilot arrangement pattern in a plurality of pilot arrangement subcarriers shifted from the plurality of pilot arrangement subcarriers of the pilot arrangement pattern by one subcarrier in a frequency direction, in an OFDM signal transmitted by the second antenna.

(Supplementary Note 4)

A radio transmission device including:

$N_{Tx\_Ant}$ transmission antennas;

a signal forming unit configured to form an orthogonal frequency division multiplexing (OFDM) signal including pilot signals; and a transmission radio unit configured to form a radio signal from the formed OFDM signal, wherein the signal forming unit arranges the pilot signals according to a pilot arrangement pattern, the pilot arrangement pattern arranging the pilot signals in a plurality of pilot arrangement subcarrier sets each including $N_{Tx\_Ant}$ consecutive subcarriers and an interval between two adjacent sets being $N_{Pilot\_Freq}$ subcarriers among all subcarriers for the OFDM signal, arranging the pilot signals in all resource elements each of which is defined by a combination of a subcarrier and an OFDM symbol, in a plurality of first pilot arrangement subcarrier sets with an $N_{Pilot\_SPA}$-subcarrier interval among the plurality of pilot arrangement subcarrier sets, and arranging the pilot signals in a cycle of $N_{Pilot\_Time}$ resource elements in a time domain, in a plurality of second pilot arrangement subcarrier sets excluding the plurality of first pilot arrangement subcarrier sets among the plurality of pilot arrangement subcarrier sets, and a plurality of the pilot signals respectively transmitted from the $N_{Tx\_Ant}$ transmission antennas are spread by spreading sequences unique to different transmission antennas.

(Supplementary Note 5)

A radio transmission device including:

a signal forming unit configured to form an orthogonal frequency division multiplexing (OFDM) signal including pilot signals; and a transmission radio unit configured to form a radio signal from the formed OFDM signal, wherein the signal forming unit arranges the pilot signals according to a pilot arrangement pattern, the pilot arrangement pattern arranging the pilot signals in a plurality of pilot arrangement subcarriers with an $N_{Pilot\_Freq}$-subcarrier interval among all subcarriers for the OFDM signal, arranging the pilot signals in a cycle of $N_{Pilot\_Time}$ resource elements in a time domain in the respective pilot arrangement subcarriers, and arranging the pilot signals in such a way that the resource elements in which the pilot signals are arranged do not overlap in the time domain in two adjacent pilot arrangement subcarriers.

(Supplementary Note 6)

The radio transmission device according to Supplementary Note 5, wherein, for a first pilot arrangement subcarrier and a second pilot arrangement subcarrier arranged in a frequency direction among the two adjacent pilot arrangement subcarriers, the signal forming unit arranges the pilot signals in such a way that a time domain position of a first resource element in which the pilot signal is arranged in the second pilot arrangement subcarrier is adjacent to a time domain position of a first resource element in which the pilot signal is arranged in the first pilot arrangement subcarrier in the time domain.

(Supplementary Note 7)

The radio transmission device according to Supplementary Note 5, further including a plurality of antennas including a first antenna and a second antenna, wherein the signal forming unit arranges the pilot signals according to the pilot arrangement pattern in an OFDM signal transmitted by the first antenna, and arranges the pilot signals according to the same pattern as the pilot arrangement pattern in a plurality of pilot arrangement subcarriers shifted from the plurality of pilot arrangement subcarriers of the pilot arrangement pattern by one subcarrier in a frequency direction, in an OFDM signal transmitted by the second antenna.

(Supplementary Note 8)

A radio transmission device including:

$N_{Tx\_Ant}$ transmission antennas;

a signal forming unit configured to form an orthogonal frequency division multiplexing (OFDM) signal including pilot signals; and a transmission radio unit configured to form a radio signal from the formed OFDM signal, wherein the signal forming unit arranges the pilot signals according to a pilot arrangement pattern, the pilot arrangement pattern arranging the pilot signals in a plurality of pilot arrangement subcarrier sets each including $N_{Tx\_Ant}$ consecutive subcarriers and an interval between two adjacent sets being $N_{Pilot\_Freq}$ subcarriers among all subcarriers for the OFDM signal, arranging the pilot signals in a cycle of $N_{Pilot\_Time}$ resource elements in a time domain in the respective pilot arrangement subcarrier sets, and arranging the pilot signals in such a way that the resource elements in which the pilot signals are arranged do not overlap in the time domain in two adjacent pilot arrangement subcarrier sets, and a plurality of the pilot signals respectively transmitted from the $N_{Tx\_Ant}$ transmission antennas are spread by spreading sequences unique to different transmission antennas.

(Supplementary Note 9)

The radio transmission device according to Supplementary Note 8, wherein the signal forming unit arranges the pilot signals in such a way that the resource elements in which the pilot signals are arranged temporally overlap in respective pilot arrangement subcarriers in each pilot arrangement subcarrier set, and for a first pilot arrangement subcarrier set and a second pilot arrangement subcarrier set arranged in a frequency direction among the two adjacent pilot arrangement subcarrier sets, arranges the pilot signals in such a way that a time domain position of a first resource element in which the pilot signal is arranged in the second pilot arrangement subcarrier set is adjacent to a time domain position of a first resource element in which the pilot signal is arranged in the first pilot arrangement subcarrier set in the time domain.

(Supplementary Note 10)

A radio reception device including:

a signal processing unit configured to execute signal processing on an orthogonal frequency division multiplexing (OFDM) signal, wherein the signal processing unit includes:

a phase noise compensation unit configured to estimate a phase noise of a received OFDM signal based on a pilot signal included in the received OFDM signal and compensate for the phase noise of the received OFDM signal;

a transform unit configured to receive a first time-domain signal and convert the received first time-domain signal into a frequency-domain signal;

an equalization unit configured to execute equalization processing on the frequency-domain signal obtained by the transform unit;

a demapping unit configured to demap an information symbol included in the frequency-domain signal after the equalization processing and reproduce an information bit;

an extraction unit configured to extract a pilot signal included in the frequency-domain signal obtained by the transform unit;

a channel estimation unit configured to estimate a channel response by using the extracted pilot signal;

a symbol estimation unit configured to map the reproduced information bit to a symbol to obtain a reproduced symbol;

a first multiplication unit configured to multiply the obtained reproduced symbol by the estimated channel response;

an inverse transform unit configured to convert the reproduced symbol multiplied by the channel response into a second time-domain signal;

a phase noise compensation signal generation unit configured to estimate a phase noise by using the first time-domain signal and the second time-domain signal obtained by the inverse transform unit and output an inverse characteristic for the estimated phase noise; and a second multiplication unit disposed at an input stage of the transform unit and configured to compensate for the phase noise of the received OFDM signal after the phase noise compensation by the phase noise compensation unit by multiplying the received OFDM signal after the phase noise compensation by the phase noise compensation unit by the output inverse characteristic for the phase noise and output the received OFDM signal after the phase noise compensation to the transform unit as the first time-domain signal.

(Supplementary Note 11)

A radio reception device including:

a signal processing unit configured to execute signal processing on an orthogonal frequency division multiplexing (OFDM) signal, wherein the signal processing unit includes:

a phase noise compensation unit configured to estimate a phase noise of a received OFDM signal based on a pilot signal included in the received OFDM signal and compensate for the phase noise of the OFDM signal;

a transform unit configured to receive a first time-domain signal and convert the received first time-domain signal into a frequency-domain signal;

an equalization unit configured to execute equalization processing on the frequency-domain signal obtained by the transform unit;

a demapping unit configured to demap an information symbol included in the frequency-domain signal after the equalization processing and calculate reliability information of each bit in each symbol;

a decoding unit configured to execute error correction decoding processing by using the reliability information of each bit and output an obtained decoded bit;

an extraction unit configured to extract a pilot signal included in the frequency-domain signal obtained by the transform unit;

a channel estimation unit configured to estimate a channel response by using the extracted pilot signal;

a symbol estimation unit configured to map the decoded bit output from the decoding unit to a symbol to obtain a reproduced symbol;

a first multiplication unit configured to multiply the obtained reproduced symbol by the estimated channel response;

an inverse transform unit configured to convert the reproduced symbol multiplied by the channel response into a second time-domain signal;

a phase noise compensation signal generation unit configured to estimate a phase noise by using the first time-domain signal and the second time-domain signal obtained by the inverse transform unit and output an inverse characteristic for the estimated phase noise; and a second multiplication unit disposed at an input stage of the transform unit and configured to compensate for the phase noise of the received OFDM signal after the phase noise compensation by the phase noise compensation unit by multiplying the received OFDM signal after the phase noise compensation by the phase noise compensation unit by the output inverse characteristic for the phase noise and output the received OFDM signal after the phase noise compensation to the transform unit as the first time-domain signal.

(Supplementary Note 12)

A radio reception device including:

a signal processing unit configured to execute signal processing on an orthogonal frequency division multiplexing (OFDM) signal, wherein the signal processing unit includes:

a phase noise compensation unit configured to estimate a phase noise of a received OFDM signal based on a pilot signal included in the received OFDM signal and compensate for the phase noise of the received OFDM signal;

a first transform unit configured to receive a first time-domain signal and convert the received first time-domain signal into a first frequency-domain signal;

an equalization unit configured to execute equalization processing on the first frequency-domain signal obtained by the first transform unit;

a first inverse transform unit configured to convert the frequency-domain signal after the equalization processing into an information symbol that is a second time-domain signal;

a demapping unit configured to demap the information symbol and reproduce an information bit;

an extraction unit configured to extract a pilot signal included in the first frequency-domain signal obtained by the first transform unit;

a channel estimation unit configured to estimate a channel response by using the extracted pilot signal;

a symbol estimation unit configured to map the reproduced information bit to a symbol to obtain a reproduced symbol;

a second transform unit configured to convert the reproduced symbol into a symbol that is a second frequency-domain signal;

a mapping unit configured to map the symbol that is the second frequency-domain signal to a subcarrier;

a first multiplication unit configured to multiply the symbol mapped to the subcarrier by the estimated channel response;

a second inverse transform unit configured to convert the symbol multiplied by the channel response into a third time-domain signal;

a phase noise compensation signal generation unit configured to estimate a phase noise by using the first time-domain signal and the third time-domain signal obtained by the second inverse transform unit and output an inverse characteristic for the estimated phase noise; and a second multiplication unit disposed at an input stage of the first transform unit and configured to compensate for the phase noise of the received OFDM signal after the phase noise compensation by the phase noise compensation unit by multiplying the received OFDM signal after the phase noise compensation by the phase noise compensation unit by the output inverse characteristic for the phase noise and output the received OFDM signal after the phase noise compensation to the first transform unit as the first time-domain signal.

(Supplementary Note 13)

A radio reception device including:

a signal processing unit configured to execute signal processing on an orthogonal frequency division multiplexing (OFDM) signal, wherein the signal processing unit includes:

a phase noise compensation unit configured to estimate a phase noise of a received OFDM signal based on a pilot signal included in the received OFDM signal and compensate for the phase noise of the received OFDM signal;

a first transform unit configured to receive a first time-domain signal and convert the received first time-domain signal into a first frequency-domain signal;

an equalization unit configured to execute equalization processing on the first frequency-domain signal obtained by the first transform unit;

a first inverse transform unit configured to convert the frequency-domain signal after the equalization processing into an information symbol that is a second time-domain signal;

a demapping unit configured to demap the information symbol and calculate reliability information of each bit in each symbol;

a decoding unit configured to execute error correction decoding processing by using the reliability information of each bit and output an obtained decoded bit;

an extraction unit configured to extract a pilot signal included in the first frequency-domain signal obtained by the first transform unit;

a channel estimation unit configured to estimate a channel response by using the extracted pilot signal;

a symbol estimation unit configured to map the decoded bit output from the decoding unit to a symbol to obtain a reproduced symbol;

a second transform unit configured to convert the reproduced symbol into a symbol that is a second frequency-domain signal;

a mapping unit configured to map the symbol that is the second frequency-domain signal to a subcarrier;

a first multiplication unit configured to multiply the symbol mapped to the subcarrier by the estimated channel response;

a second inverse transform unit configured to convert the symbol multiplied by the channel response into a third time-domain signal;

a phase noise compensation signal generation unit configured to estimate a phase noise by using the first time-domain signal and the third time-domain signal obtained by the second inverse transform unit and output an inverse characteristic for the estimated phase noise; and a second multiplication unit disposed at an input stage of the first transform unit and configured to compensate for the phase noise of the received OFDM signal after the phase noise compensation by the phase noise compensation unit by multiplying the received OFDM signal after the phase noise compensation by the phase noise compensation unit by the output inverse characteristic for the phase noise and output the received OFDM signal after the phase noise compensation to the first transform unit as the first time-domain signal.

(Supplementary Note 14)

The radio reception device according to Supplementary Note 10, wherein the phase noise compensation unit includes:

an output unit configured to output a plurality of basis functions;

a weight generation unit configured to calculate a mean square error of a linear sum of the phase noise included in the received OFDM signal and a multiplication result obtained by multiplying each basis function by a weighting coefficient by using the pilot signal included in the received OFDM signal and the plurality of basis functions, and generate the weighting coefficient of each basis function in such a way as to minimize the calculated mean square error; and a phase noise calculation unit configured to calculate the phase noise by obtaining a linear sum of the basis functions using the generated weighting coefficient.

(Supplementary Note 15)

The radio reception device according to Supplementary Note 10, wherein the phase noise compensation signal generation unit estimates the phase noise at each sample point by independently averaging estimated phase noise values of $N_{FFT}/N_{Blk}$ samples of each block obtained by dividing $N_{FFT}$ samples of an OFDM symbol corresponding to an FFT block into $N_{Blk}$ blocks for an in-phase component and a quadrature component, and interpolating an obtained average value of the estimated phase noise values of the $N_{Blk}$ blocks by linear interpolation, quadratic interpolation, or interpolation using a high-order function.

(Supplementary Note 16)

The radio reception device according to Supplementary Note 10, wherein the phase noise compensation signal generation unit includes:

means for estimating phase noises at $N_{FFT}$ sample positions of the OFDM symbol corresponding to the FFT block by using the first time-domain signal and the second time-domain signal obtained by the inverse transform unit; and means for averaging the estimated phase noises of the respective samples over the OFDM symbol by an adaptive algorithm using a minimum mean square error standard.

(Supplementary Note 17)

A radio reception device including:

a signal processing unit configured to execute signal processing on an orthogonal frequency division multiplexing (OFDM) signal, wherein the signal processing unit includes:

a phase noise compensation unit configured to estimate a phase noise of a received OFDM signal based on a pilot signal included in the received OFDM signal and compensate for the phase noise of the received OFDM signal;

a transform unit configured to receive the received OFDM signal after the phase noise compensation by the phase noise compensation unit and convert the received OFDM signal into a frequency-domain signal;

an equalization unit configured to execute equalization processing on the frequency-domain signal obtained by the transform unit;

a demapping unit configured to demap an information symbol included in the frequency-domain signal after the equalization processing and calculate reliability information of each bit in each symbol;

a decoding unit configured to execute error correction decoding processing by using the reliability information of each bit and output an obtained decoded bit;

a detection unit configured to detect a phase difference between the frequency-domain signal after the equalization processing and a reference signal;

a loop filter configured to output a phase difference obtained by reducing a noise component of the detected phase difference;

a phase noise compensation processing unit disposed at an input stage of the demapping unit and configured to compensate for a phase noise of the frequency-domain signal after the equalization processing by using the output phase difference; and a symbol estimation unit configured to map the decoded bit to a symbol to obtain a reproduced symbol and output the reproduced symbol as the reference signal.

(Supplementary Note 18)

A radio reception device including:

a signal processing unit configured to execute signal processing on an orthogonal frequency division multiplexing (OFDM) signal, in which the signal processing unit includes:

a phase noise compensation unit configured to estimate a phase noise of a received OFDM signal based on a pilot signal included in the received OFDM signal and compensate for the phase noise of the received OFDM signal;

a transform unit configured to receive the received OFDM signal after the phase noise compensation by the phase noise compensation unit and convert the received OFDM signal into a frequency-domain signal;

an equalization unit configured to execute equalization processing on the frequency-domain signal obtained by the transform unit;

an extraction unit configured to extract a pilot signal included in the frequency-domain signal obtained by the transform unit;

a channel estimation unit configured to estimate a channel response by using the extracted pilot signal;

a demapping unit configured to demap an information symbol included in the frequency-domain signal obtained by the transform unit and reproduce an information bit;

a symbol estimation unit configured to map the reproduced information bit to a symbol to obtain a reproduced symbol;

a calculation unit configured to calculate a discrete Fourier transform coefficient for a phase noise by a minimum mean square error standard based on the information symbol included in the frequency-domain signal obtained by the transform unit, the estimated channel response, and the reproduced symbol; and an inter-carrier interference compensation unit disposed at an input stage of the equalization unit and configured to execute convolution processing by using the frequency-domain signal obtained by the transform unit and the calculated discrete Fourier transform coefficient to compensate for the phase noise of the received OFDM signal after the phase noise compensation by the phase noise compensation unit.

What is claimed is:

1. A radio transmission device including:

a communication circuit;

at least one memory storing instructions; and at least one processor configured to execute the instructions to form an orthogonal frequency division multiplexing (OFDM) signal including pilot signals, wherein the communication circuit is configured to form a radio signal from the formed OFDM signal, and the at least one processor is configured to arrange the pilot signals according to a pilot arrangement pattern, the pilot arrangement pattern:

arranging the pilot signals in a plurality of pilot arrangement subcarriers with an NPilot_Freq-subcarrier interval among all subcarriers for the OFDM signal, arranging the pilot signals in all resource elements each of which is defined by a combination of a subcarrier and an OFDM symbol, in a plurality of first pilot arrangement subcarriers with an NPilot_SPA-subcarrier interval among the plurality of pilot arrangement subcarriers, and arranging the pilot signals in a cycle of NPilot_Time resource elements in a time domain, in a plurality of second pilot arrangement subcarriers excluding the plurality of first pilot arrangement subcarriers among the plurality of pilot arrangement subcarriers.

2. The radio transmission device according to claim 1, wherein the OFDM signal is a discrete Fourier transformation (DFT) spread OFDM signal, and the at least one processor is further configured to:

convert pilot symbol blocks obtained by blocking pilot symbols in the time domain into a frequency-domain signal by discrete Fourier transform;

map the frequency-domain signal to the pilot arrangement subcarrier; and convert the mapped frequency-domain signal into a time-domain signal by inverse discrete Fourier transform.

3. The radio transmission device according to claim 1, further including a plurality of antennas including a first antenna and a second antenna, wherein the at least one processor is further configured to;

arrange the pilot signals according to the pilot arrangement pattern in an OFDM signal transmitted by the first antenna, and arrange the pilot signals according to the same pattern as the pilot arrangement pattern in a plurality of pilot arrangement subcarriers shifted from the plurality of pilot arrangement subcarriers of the pilot arrangement pattern by one subcarrier in a frequency direction, in an OFDM signal transmitted by the second antenna.

4. A radio transmission device including:

a communication circuit;

at least one memory storing instructions; and at least one processor configured to execute the instructions to form an orthogonal frequency division multiplexing (OFDM) signal including pilot signals, wherein the communication circuit is configured to form a radio signal from the formed OFDM signal, and wherein the at least one processor is further configured to arrange the pilot signals according to a pilot arrangement pattern, the pilot arrangement pattern:

arranging the pilot signals in a plurality of pilot arrangement subcarriers with an NPilot_Freq-subcarrier interval among all subcarriers for the OFDM signal, arranging the pilot signals in a cycle of NPilot_Time resource elements in a time domain in the respective pilot arrangement subcarriers, and arranging the pilot signals in such a way that the resource elements in which the pilot signals are arranged do not overlap in the time domain in two adjacent pilot arrangement subcarriers, wherein, for a first pilot arrangement subcarrier and a second pilot arrangement subcarrier arranged in a frequency direction among the two adjacent pilot arrangement subcarriers, the at least one processor is configured to arrange the pilot signals in such a way that a time domain position of a first resource element in which the pilot signal is arranged in the second pilot arrangement subcarrier is adjacent to a time domain position of a first resource element in which the pilot signal is arranged in the first pilot arrangement subcarrier in the time domain.

5. A radio transmission device including:

a communication circuit;

a plurality of antennas including a first antenna and a second antenna at least one memory storing instructions; and at least one processor configured to execute the instructions to form an orthogonal frequency division multiplexing (OFDM) signal including pilot signals, wherein the communication circuit is configured to form a radio signal from the formed OFDM signal, wherein the at least one processor is further configured to arrange the pilot signals according to a pilot arrangement pattern, the pilot arrangement pattern:

arranging the pilot signals in a plurality of pilot arrangement subcarriers with an NPilot_Freq-subcarrier interval among all subcarriers for the OFDM signal, arranging the pilot signals in a cycle of NPilot_Time resource elements in a time domain in the respective pilot arrangement subcarriers, and arranging the pilot signals in such a way that the resource elements in which the pilot signals are arranged do not overlap in the time domain in two adjacent pilot arrangement subcarriers, and wherein the at least one processor is further configured to:

arrange the pilot signals according to the pilot arrangement pattern in an OFDM signal transmitted by the first antenna, and arrange the pilot signals according to the same pattern as the pilot arrangement pattern in a plurality of pilot arrangement subcarriers shifted from the plurality of pilot arrangement subcarriers of the pilot arrangement pattern by one subcarrier in a frequency direction, in an OFDM signal transmitted by the second antenna.

6. A radio reception device including:

hardware including at least one processor and at least one memory;

a signal processing unit implemented at least by the hardware and configured to execute signal processing on an orthogonal frequency division multiplexing (OFDM) signal, wherein the signal processing unit includes:

a phase noise compensation unit implemented at least by the hardware and configured to estimate a phase noise of a received OFDM signal based on a pilot signal included in the received OFDM signal and compensate for the phase noise of the received OFDM signal;

a transform unit implemented at least by the hardware and configured to receive a first time-domain signal and convert the received first time-domain signal into a frequency-domain signal;

an equalization unit implemented at least by the hardware and configured to execute equalization processing on the frequency-domain signal obtained by the transform unit;

a demapping unit implemented at least by the hardware and configured to demap an information symbol included in the frequency-domain signal after the equalization processing and reproduce an information bit;

an extraction unit implemented at least by the hardware and configured to extract a pilot signal included in the frequency-domain signal obtained by the transform unit;

a channel estimation unit implemented at least by the hardware and configured to estimate a channel response by using the extracted pilot signal;

a symbol estimation unit implemented at least by the hardware and configured to map the reproduced information bit to a symbol to obtain a reproduced symbol;

a first multiplication unit implemented at least by the hardware and configured to multiply the obtained reproduced symbol by the estimated channel response;

an inverse transform unit implemented at least by the hardware and configured to convert the reproduced symbol multiplied by the channel response into a second time-domain signal;

a phase noise compensation signal generation unit implemented at least by the hardware and configured to estimate a phase noise by using the first time-domain signal and the second time-domain signal obtained by the inverse transform unit and output an inverse characteristic for the estimated phase noise; and a second multiplication unit implemented at least by the hardware and disposed at an input stage of the transform unit and configured to compensate for the phase noise of the received OFDM signal after the phase noise compensation by the phase noise compensation unit by multiplying the received OFDM signal after the phase noise compensation by the phase noise compensation unit by the output inverse characteristic for the phase noise and output the received OFDM signal after the phase noise compensation to the transform unit as the first time-domain signal.

* * * * *